US008158220B2

(12) United States Patent
Nagura et al.

(10) Patent No.: US 8,158,220 B2
(45) Date of Patent: Apr. 17, 2012

(54) CELLULOSE ACYLATE FILM, RETARDATION FILM, POLARIZER AND LIQUID CRYSTAL DISPLAY DEVICE

(75) Inventors: Masato Nagura, Minami-ashigara (JP); Takayasu Yasuda, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 0 days.

(21) Appl. No.: 12/893,378

(22) Filed: Sep. 29, 2010

(65) Prior Publication Data

US 2011/0076423 A1 Mar. 31, 2011

(30) Foreign Application Priority Data

Sep. 29, 2009 (JP) ................................ 2009-225478

(51) Int. Cl.
*C09K 19/00* (2006.01)

(52) U.S. Cl. ...... 428/1.3; 359/489.07; 349/75; 349/117; 106/170.1

(58) Field of Classification Search .................. 428/1.1, 428/1.3; 349/75, 117, 118; 359/489.07; 106/170.1; 544/194, 204
See application file for complete search history.

(56) References Cited

U.S. PATENT DOCUMENTS

| | | | | |
|---|---|---|---|---|
| 6,630,973 | B1 * | 10/2003 | Matsuoka et al. | 349/117 |
| 2005/0142304 | A1 * | 6/2005 | Kawanishi et al. | 428/1.31 |
| 2008/0088065 | A1 * | 4/2008 | Ueda | 264/405 |

FOREIGN PATENT DOCUMENTS

| | | | |
|---|---|---|---|
| JP | 2001-166144 | A | 6/2001 |
| JP | 2003-344655 | A | 12/2002 |
| JP | 2003-344655 | A | 12/2003 |
| JP | 2004-109410 | A | 4/2004 |

OTHER PUBLICATIONS

STIC search report.*
Yasuda et al., U.S. Appl. No. 12/893,406, entitled "*Humidity Dependence Improver for Polymer Film Polymer Film, Protective Film for Polarizer, Retardation Film, Polarizer, and Liquid Crystal Display Device*", filed Sep. 29, 2010.

* cited by examiner

*Primary Examiner* — Angela Ortiz
*Assistant Examiner* — Ruiyun Zhang
(74) *Attorney, Agent, or Firm* — Buchanan Ingersoll & Rooney PC

(57) ABSTRACT

A cellulose acylate film comprising a cellulose acylate resin satisfying the formulae (i)-(iii) and a compound capable of forming a hydrogen bond satisfying conditions (A)-(C):

(A) the compound has both a hydrogen bond donor moiety and a hydrogen bond acceptor moiety in the molecule, (B) the value obtained by dividing the molecular weight of the compound by the total of the number of the hydrogen bond donor moiety and the number of the hydrogen bond acceptor moiety is from 30 to 65, (C) the number of aromatic ring structures is from 1 to 3, $$0.5 \leqq A+B \leqq 2.7, \quad \text{(i)}$$

$$0.0 \leqq A \leqq 2.5, \text{ and} \quad \text{(ii)}$$

$$0.1 \leqq B \leqq 2.0, \quad \text{(iii)}$$

wherein A means the degree of substitution with an acetyl group, and B means a total of the degree of substitution with a propionyl group and the degree of substitution with a butyryl group.

20 Claims, 1 Drawing Sheet

CELLULOSE ACYLATE FILM, RETARDATION FILM, POLARIZER AND LIQUID CRYSTAL DISPLAY DEVICE

CROSS-REFERENCE TO RELATED APPLICATIONS

BACKGROUND OF THE INVENTION

The present application claims the benefit of priority from Japanese Patent Application No. 225478/2009, filed on Sep. 29, 2009, the contents of which are herein incorporated by reference in their entirety.

1. Field of the Invention

The present invention relates to a cellulose acylate film, a retardation film, a polarizer containing the film and a liquid crystal display device, especially a VA (vertical aligned)-mode liquid crystal display device.

2. Description of the Related Art

The display characteristics of liquid crystal display devices are being improved more and more these days, and in particular, it is known that, in a VA-mode liquid crystal display devices that is hopeful for large-sized TVs, two polarizers are arranged on the panel side and the backlight side of the liquid crystal display in such a manner that their absorption axes are perpendicular to each other, and in addition, an optically biaxial retardation film is arranged between each polarizer and the liquid crystal cell, thereby realizing a broader viewing angle, or that is, enhancing the display characteristics of the device.

As the retardation film of the type, recently, a cellulose acylate film capable of expressing excellent optical properties, concretely an in-plane retardation Re (nm) and a thickness-direction retardation Rth (nm) has become specifically noted and used as a retardation film in liquid crystal display devices. Among the cellulose acylate film, a cellulose acetate film is widely used.

As a compound that may be added to such a cellulose acetate film so as to increase Rth of the film, a retardation enhancer having a specific structure is disclosed (see JP-A 2004-109410). The retardation enhancer disclosed in this reference is a compound containing a keto-enol tautomerizable compound as its constitutive element and capable of forming a molecular complex; and as one example thereof, the reference discloses a compound having a 1,3,5-triazine ring-containing structure, especially a guanamine skeleton-having compound. As other compounds capable of being added to a cellulose acetate film to increase Rth of the film, disclosed are a retardation enhancer of a discotic compound (see JP-A 2001-166144, 2003-344655). The retardation enhancer disclosed in these references are discotic compounds and compounds having a structure containing a 1,3,5-triazine ring or porphyrin skeleton are exemplified therefor.

SUMMARY OF THE INVENTION

On the other hand, the present inventors have investigated the other characteristics of the cellulose acetate film containing such a retardation enhancer, and have found that Re and Rth of the film greatly fluctuate depending on the change in the humidity of the usage environment, or that is, the humidity dependence of Re and Rth of the film is high. Accordingly, for the purpose of solving the problems, the inventors have tried using any other substrate than cellulose acetate. During this, the inventors have found that some of the retardation enhancers described in JP-A 2004-109410 and 2001-166144 could not be effective for retardation enhancement for some other substrates. In other words, the inventors' finding is that the effect of additives varies depending on the substrate to which they are added.

Based on this finding, the inventors have further investigated the influence of various additives on typically cellulose acylate propionate substrates, and have found that, when a compound capable of forming a hydrogen bond satisfying the following conditions (A) to (C) is added to a cellulose acylate propionate substrate, then the humidity dependence of Re and Rth of the substrate can be significantly improved and the stability of the optical properties of the substrate to environmental humidity change is thereby bettered. Accordingly, the inventors have made further studies for the purpose of obtaining a compound which, when added to a cellulose acylate propionate substrate, can significantly retard the fluctuation of Re and Rth of the substrate in usage environment humidity change.

(A) the compound has both a hydrogen bond donor moiety and a hydrogen bond acceptor moiety in the molecule, (B) the value obtained by dividing the molecular weight of the compound by the total of the number of the hydrogen bond donor moiety and the number of the hydrogen bond acceptor moiety is from 30 to 65, and (C) the number of aromatic ring structures is from 1 to 3.

Specifically, an object of the invention is to provide a cellulose acylate film of which the fluctuation of Re and Rth in usage environment humidity change is retarded. Another object of the invention is to provide a retardation film comprising the cellulose acylate film, and a polarizer and a liquid crystal display device comprising the cellulose acylate film or the retardation film.

For the purpose of solving the above-mentioned problems, the inventors of the present invention have investigated the substituents that heterocyclic rings can have, and as a result, have found that a compound having a substituent falling within a range of a specific substituent group can improve the humidity dependence of the substrate, and have completed the present invention.

In particular, the compound having a specific substituent on the 1,3,5-triazine ring, which is selected in the invention, differs from the compounds in JP-A 2001-166144 in which the compounds were found to have the ability to increase Rth based on the discotic configuration (or planarity) thereof, in point of the range selected from among the compounds having a 1,3,5-triazine ring. Concretely, in the present invention, the inventors have found that specific 1,3,5-triazine ring-having compounds having a specific 1,3,5-triazine ring configuration and having a specific type of substituent on the ring, which are selected from a large number of 1,3,5-triazine ring-having compounds, can exhibit a novel effect of retarding the fluctuation of Re and Rth of cellulose acylate film. Therefore, in the invention, the 1,3,5-triazine ring-having compounds are not limited to those having a discotic form as a whole.

Concretely, the means for solving the above-mentioned problems of the invention are as follows:

[1] A cellulose acylate film comprising a cellulose acylate resin having a degree of acyl substitution satisfying all the following formulae (i), (ii) and (iii) and a compound capable of forming a hydrogen bond satisfying all the following conditions (A), (B) and (C):

(A) the compound has both a hydrogen bond donor moiety and a hydrogen bond acceptor moiety in the molecule, (B) the value obtained by dividing the molecular weight of the compound by the total of the number of the hydrogen bond donor moiety and the number of the hydrogen bond acceptor moiety is from 30 to 65, (C) the number of aromatic ring structures is from 1 to 3, $$0.5 \leqq A+B \leqq 2.7, \quad (i)$$

$$0.0 \leqq A \leqq 2.5, \text{ and} \quad (ii)$$

$$0.1 \leqq B \leqq 2.0, \quad (iii)$$

where, in the formulae (i), (ii) and (iii), A means the degree of substitution with an acetyl group, and B means a total of the degree of substitution with a propionyl group and the degree of substitution with a butyryl group.

[2] The cellulose acylate film of [1], wherein the degree of substitution with an acyl group of the cellulose acylate satisfies all the following formulae (iv), (v) and (vi):

$$1.0 \leqq A+B \leqq 2.5, \quad (iv)$$

$$0.1 \leqq A \leqq 2.0, \text{ and} \quad (v)$$

$$0.1 \leqq B \leqq 1.8, \quad (vi)$$

where, in the formulae (iv), (v) and (vi), A means the degree of substitution with an acetyl group, and B means a total of the degree of substitution with a propionyl group and the degree of substitution with a butyryl group.

[3] The cellulose acylate film of [1] or [2], wherein the compound capable of forming a hydrogen bond is represented by the following formula (A-1):

(A-1)

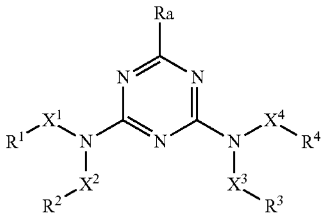

wherein Ra represents an alkyl group, an alkenyl group, an alkynyl group, a heterocyclic group or an aryl group; $X^1$, $X^2$, $X^3$ and $X^4$ each independently represent a single bond or a divalent linking group; and $R^1$, $R^2$, $R^3$ and $R^4$ each independently represent a hydrogen atom, an alkyl group, an alkenyl group, an alkynyl group, an aryl group or a heterocyclic group.

[4] The cellulose acylate film of [1] or [2], wherein the compound capable of forming a hydrogen bond is represented by the following formula (B-1):

(B-1)

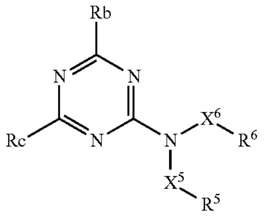

wherein Rb and Rc each independently represent an alkyl group, an alkenyl group, an alkynyl group, a heterocyclic group or an aryl group; $X^5$ and $X^6$ each independently represent a single bond or a divalent linking group; $R^5$ and $R^6$ each independently represent a hydrogen atom, an alkyl group, an alkenyl group, an alkynyl group, an aryl group or a heterocyclic group.

[5] The cellulose acylate film of [3] or [4], wherein $X^1$, $X^2$, $X^3$ and $X^4$ in the formula (A-1) and $X^5$ and $X^6$ in the formula (B-1) each independently represent any one selected from a single bond and the group of divalent linking groups of the following formula (P):

(P)

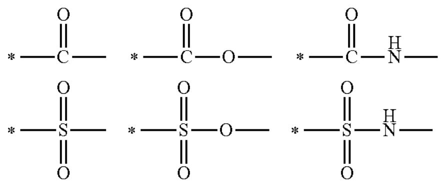

wherein the side * is the linking site to the N atom that bonds to the 1,3,5-triazine ring in the compound of the formula (A-1) or (B-1).

[6] The cellulose acylate film of [1] or [2], wherein the compound capable of forming a hydrogen bond is represented by the following formula (C-1):

(C-1)

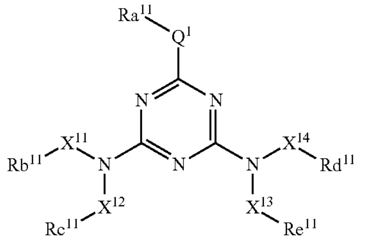

wherein $Ra^{11}$ represents an alkyl group, an alkenyl group, an alkynyl group, a heterocyclic group or an aryl group; $Rb^{11}$, $Rc^{11}$, $Rd^{11}$ and $Re^{11}$ each independently represent a hydrogen atom, an alkyl group, an alkenyl group, an alkynyl group, a heterocyclic group or an aryl group; $Q^1$ represents —O—, —S— or —NRf-; Rf represents a hydrogen atom, an alkyl group, an alkenyl group, an alkynyl group, a heterocyclic group or an aryl group, and may be taken together with $Ra^{11}$ to form a ring; $X^{11}$, $X^{12}$ and $X^{13}$ each independently represent a single bond or a divalent linking group; and $X^{14}$ represents any one selected from the group of divalent linking groups of the following formula (P):

(P)

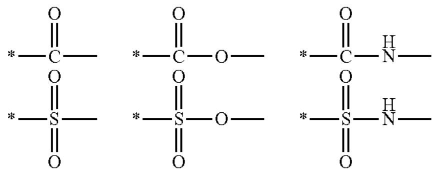

wherein the side * is the linking site to the N atom that bonds to the 1,3,5-triazine ring in the compound of the formula (C-1).

[7] The cellulose acylate film of [1] or [2], wherein the compound capable of forming a hydrogen bond is represented by the following formula (D-1):

(D-1)

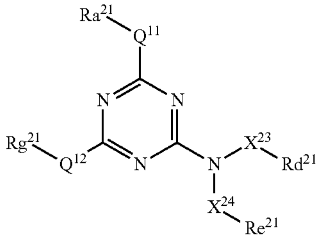

wherein $Ra^{21}$ and $Rg^{21}$ each independently represent an alkyl group, an alkenyl group, an alkynyl group, a heterocyclic group or an aryl group; $Rd^{21}$ and $Re^{21}$ each independently represent a hydrogen atom, an alkyl group, an alkenyl group, an alkynyl group, a heterocyclic group or an aryl group; $Q^{11}$ represents —O—, —S— or —NRf-; Rf represents a hydrogen atom, an alkyl group, an alkenyl group, an alkynyl group, a heterocyclic group or an aryl group, and may be taken together with $Ra^{21}$ to form a ring; $Q^{12}$ represents —O—, —S— or —NRh-; Rh represents a hydrogen atom, an alkyl group, an alkenyl group, an alkynyl group, a heterocyclic group or an aryl group, and may be taken together with $Rg^{21}$ to form a ring; $X^{23}$ represents a single bond or a divalent linking group; and $X^{24}$ represents any one selected from the group of divalent linking groups of the following formula (P):

(P)

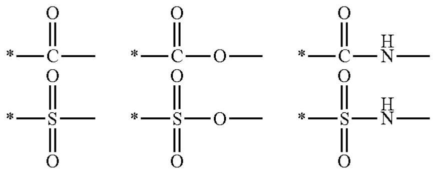

wherein the side * is the linking site to the N atom that bonds to the 1,3,5-triazine ring in the compound of the formula (D-1).

[8] The cellulose acylate film of [1] or [2], wherein the compound capable of forming a hydrogen bond is represented by the following formula (E-1):

(E-1)

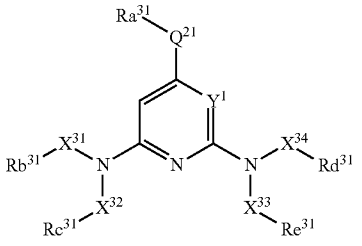

wherein $Y^1$ represents a methine group or —N—; $Ra^{31}$ represents an alkyl group, an alkenyl group, an alkynyl group, a heterocyclic group or an aryl group; $Rb^{31}$, $Rc^{31}$, $Rd^{31}$ and $Re^{31}$ each independently represent a hydrogen atom, an alkyl group, an alkenyl group, an alkynyl group, a heterocyclic group or an aryl group; $Q^{21}$ represents a single bond, —O—, —S— or —NRf-; Rf represents a hydrogen atom, an alkyl group, an alkenyl group, an alkynyl group, a heterocyclic group or an aryl group, and may be taken together with $Ra^{31}$ to form a ring; $X^{31}$, $X^{32}$ and $X^{33}$ each independently represent a single bond or a divalent linking group; and $X^{34}$ represents any one selected from the group of divalent linking groups of the following formula (Q):

(Q)

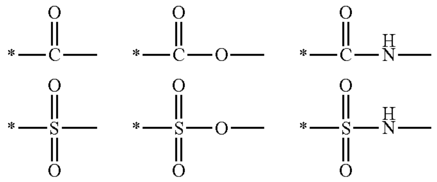

wherein the side * is the linking site to the N atom that bonds to the heterocyclic ring in the compound of the formula (E-1).

[9] The cellulose acylate film of [1] or [2], wherein the compound capable of forming a hydrogen bond is represented by the following formula (F-1):

(F-1)

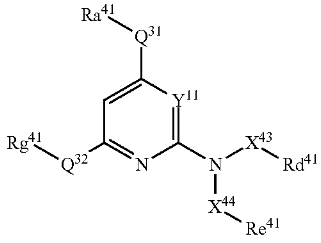

wherein $Y^{11}$ represents a methine group or —N—; $Ra^{41}$ and $Rg^{41}$ each independently represent an alkyl group, an alkenyl group, an alkynyl group, a heterocyclic group or an aryl group; $Rd^{41}$ and $Re^{41}$ each independently represent a hydrogen atom, an alkyl group, an alkenyl group, an alkynyl group, a heterocyclic group or an aryl group; $Q^{31}$ represents —O—, —S— or —NRf-; Rf represents a hydrogen atom, an alkyl group, an alkenyl group, an alkynyl group, a heterocyclic group or an aryl group, and may be taken together with $Ra^{41}$ to form a ring; $Q^{32}$ represents —O—, —S— or —NRh-; Rh represents a hydrogen atom, an alkyl group, an alkenyl group, an alkynyl group, a heterocyclic group or an aryl group, and may be taken together with $Rg^{41}$ to form a ring; $X^{43}$ represents a single bond or a divalent linking group; and $X^{44}$ represents any one selected from the group of divalent linking groups of the following formula (P):

(P)

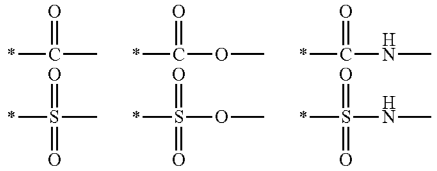

wherein the side * is the linking site to the N atom that bonds to the heterocyclic ring in the compound of the formula (F-1).

[10] The cellulose acylate film of [1] or [2], wherein the compound capable of forming a hydrogen bond is represented by the following formula (G-1):

(G-1)

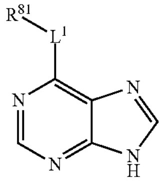

wherein $L^1$ represents a single bond or a divalent linking group having a hetero atom; and $R^{81}$ represents a hydrogen atom, an alkyl group having from 1 to 20 carbon atoms, an alkenyl group having from 2 to 20 carbon atoms, an alkynyl group having from 2 to 20 carbon atoms, an aryl group having from 6 to 20 carbon atoms or an arylalkyl group having from 7 to 20 carbon atoms.

[11] The cellulose acylate film of [1] or [2], wherein the compound capable of forming a hydrogen bond is represented by the following formula (H-1):

(H-1)

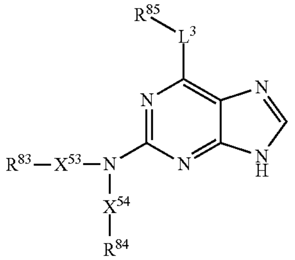

wherein $L^3$ represents a single bond or a divalent linking group having a hetero atom; and $R^{85}$ represents an alkyl group having from 1 to 20 carbon atoms, an alkenyl group having from 2 to 20 carbon atoms, an alkynyl group having from 2 to 20 carbon atoms, an aryl group having from 6 to 20 carbon atoms or an arylalkyl group having from 7 to 20 carbon atoms; $R^{83}$ and $R^{84}$ each independently represent a hydrogen atom, an alkyl group, an alkenyl group, an alkynyl group, a heterocyclic group or an aryl group; and $X^{53}$ and $X^{54}$ each independently represent any one selected from the group of divalent linking groups of the following formula (P):

(P)

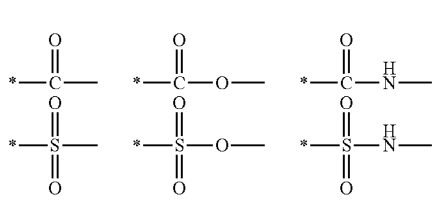

wherein the side * is the linking site to the N atom that bonds to the heterocyclic ring in the compound of the formula (H-1).

[12] The cellulose acylate film of any one of [1] to [11], wherein the compound capable of forming a hydrogen bond has a molecular weight of from 100 to 1000.

[13] The cellulose acylate film of any one of [1] to [12], wherein the content of the compound capable of forming a hydrogen bond is 30% by mass or less relative to the content of the cellulose acylate resin.

[14] A retardation film comprising the cellulose acylate film of any one of [1] to [13].

[15] A polarizer comprising the cellulose acylate film of any one of [1] to [13] or the retardation film of [14].

[16] A liquid crystal display device comprising the cellulose acylate film of any one of [1] to [13], the retardation film of [14] or the polarizer of [15].

The cellulose acylate film of the invention is capable of effectively retarding the fluctuation of Re and Rth in humidity change in the usage environment. It can be therefore preferably applicable to a retardation film, a polarizer and particularly preferably a liquid crystal display device of the invention.

Figure 1:
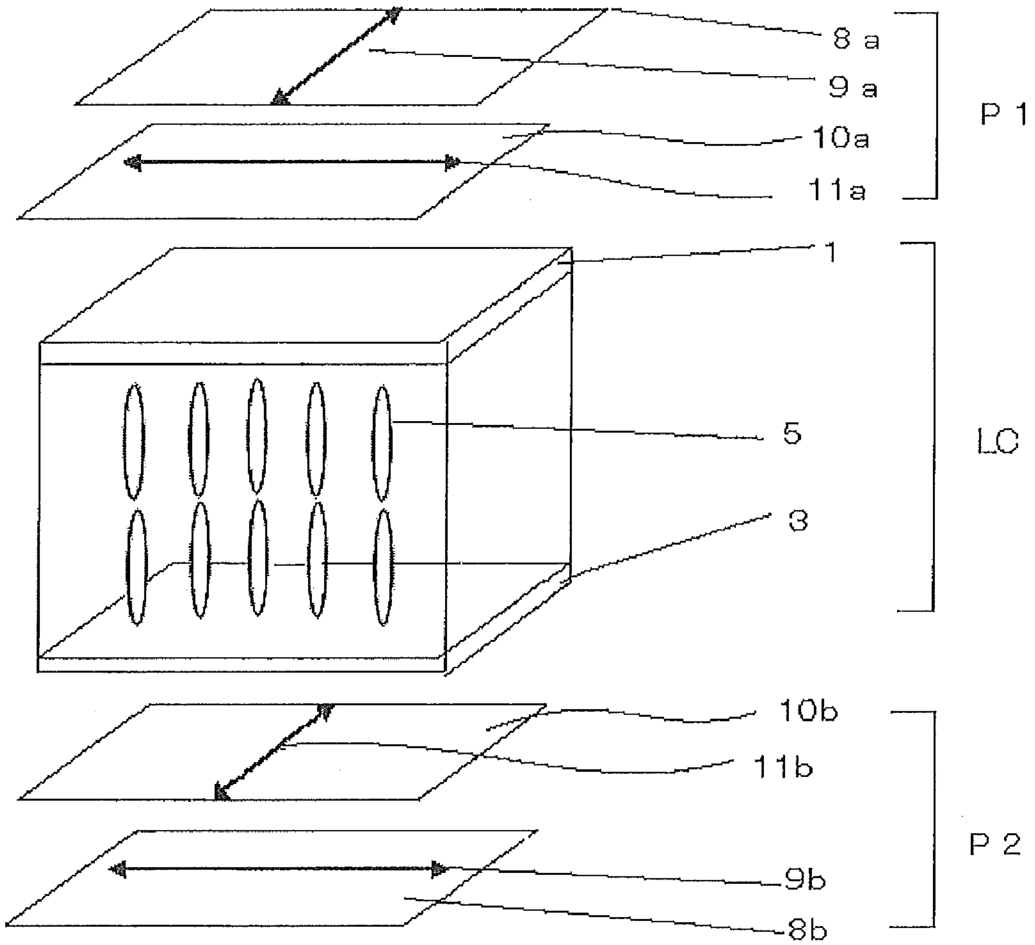
FIG. 1 is a schematic view showing the constitution of one example of the liquid crystal display device of the invention.

In the drawing, 1 is an upper substrate of liquid crystal cell, 3 is a lower substrate of liquid crystal cell, 5 is a liquid crystal layer (liquid crystal molecule), 8*a* and 8*b* each are protective film for polarizer, 9*a* and 9*b* each are the absorption axis of the protective film for polarizer, 10*a* and 10*b* each are a retardation film (cellulose acylate film of the invention), 11*a* and 11*b* each are the absorption axis of the retardation film (cellulose acylate film of the invention), P1 and P2 each are a polarizer, and LC is a liquid crystal cell.

BEST MODE FOR CARRYING OUT THE INVENTION

Description will now be made in detail of the invention. Although the following description of its structural features may often be made on the basis of typical embodiments of the invention, it is to be understood that the invention is not limited to any such embodiment. It is also to be noted that every numerical range as herein expressed by employing the words "from" and "to", or simply the word "to", or the symbol "-" is supposed to include the lower and upper limits thereof as defined by such words or symbol, unless otherwise noted. In the invention, "mass %" means equal to "weight %", and "% by mass" means equal to "% by weight".

First of all, the definition of the terms used in this specification is described below.

(Retardation (Re(λ) and Rth(λ))

In this specification, Re(λ) and Rth(λ) are retardation in plane (nm) and retardation along the thickness direction (nm), respectively, at a wavelength of λ. Re(λ) is measured by applying light having a wavelength of λ nm to a film in the normal direction of the film, using KOBRA 21ADH or WR (by Oji Scientific Instruments).

When a film to be analyze by a monoaxial or biaxial index ellipsoid, Rth(λ) of the film is calculated as follows.

Rth(λ) is calculated by KOBRA 21ADH or WR based on six Re(λ) values which are measured for incoming light of a wavelength λ nm in six directions which are decided by a 10° step rotation from 0° to 50° with respect to the normal direction of a sample film using an in-plane slow axis, which is decided by KOBRA 21ADH, as an inclination axis (a rotation axis; defined in an arbitrary in-plane direction if the film has no slow axis in plane); a value of hypothetical mean refractive index; and a value entered as a thickness value of the film.

In the above, when the film to be analyzed has a direction in which the retardation value is zero at a certain inclination angle, around the in-plane slow axis from the normal direction as the rotation axis, then the retardation value at the inclination angle larger than the inclination angle to give a zero retardation is changed to negative data, and then the Rth(λ) of the film is calculated by KOBRA 21ADH or WR.

Around the slow axis as the inclination angle (rotation angle) of the film (when the film does not have a slow axis, then its rotation axis may be in any in-plane direction of the film), the retardation values are measured in any desired inclined two directions, and based on the data, and the estimated value of the mean refractive index and the inputted film thickness value, Rth may be calculated according to the following formulae (X) and (XI):

$$Re(\theta)=\left[nx-\frac{(ny\times nz)}{\left(\sqrt{\left\{ny\sin\left(\sin^{-1}\left(\frac{\sin(-\theta)}{nx}\right)\right)\right\}^2+\left\{nz\cos\left(\sin^{-1}\left(\frac{\sin(-\theta)}{nx}\right)\right)\right\}^2}\right)}\right]\times\frac{d}{\cos\left\{\sin^{-1}\left(\frac{\sin(-\theta)}{nx}\right)\right\}} \quad \text{Formula (X)}$$

$$Rth=\left(\frac{nx+ny}{2}-nz\right)\times d \quad \text{Formula (XI)}$$

wherein Re(θ) represents a retardation value in the direction inclined by an angle θ from the normal direction; nx represents a refractive index in the in-plane slow axis direction; ny represents a refractive index in the in-plane direction perpendicular to nx; and nz represents a refractive index in the direction perpendicular to nx and ny. And "d" is a thickness of the sample.

When the film to be analyzed is not expressed by a monoaxial or biaxial index ellipsoid, or that is, when the film does not have an optical axis, then Rth(λ) of the film may be calculated as follows.

Re(λ) of the film is measured around the slow axis (judged by KOBRA 21ADH or WR) as the in-plane inclination axis (rotation axis), relative to the normal direction of the film from −50 degrees up to +50 degrees at intervals of 10 degrees, in 11 points in all with a light having a wavelength of λ nm applied in the inclined direction; and based on the thus-measured retardation values, the estimated value of the mean refractive index and the inputted film thickness value, Rth(λ) of the film may be calculated by KOBRA 21ADH or WR.

In the above measurement, as the estimated value of the mean refractive index, values in Polymer Handbook (by John Wiley & Sons, Inc.) or those in polymer film catalogues may be used. Materials of which the mean refractive index is unknown may be analyzed with an Abbe's refractiometer to determine their data. For example, the mean refractive index values of some optical films are as follows:

cellulose acylate (1.48), cycloolefin polymer (1.52), polycarbonate (1.59), polymethylmethacrylate (1.49) and polystyrene (1.59).

By inputting the value of these average refraction indices and thickness, KOBRA 21ADH or WR computes nx, ny, nz. From the computed nx, ny, nz, Nz=(nx−nz)/(nx−ny) is computed further.

In the invention, "slow axis" of retardation films and others means the direction in which the refractive index is the largest. "Visible light region" means from 380 nm to 780 nm. Unless otherwise specifically indicated, the refractive index is one measured at λ=589 nm in the visible light region.

In this specification, the numerical data, the numerical range and the qualitative expression (for example, "equivalent", "same", etc.) indicating the optical properties of constitutive components such as retardation film, liquid crystal layer and others should be so interpreted as to indicate the numerical data, the numerical range and the qualitative expression that include the error range generally acceptable for liquid crystal display devices and their constitutive components.

1. Cellulose Acylate Film

The cellulose acylate film of the invention (hereinafter referred to as a film of the invention) is characterized by containing a cellulose acylate resin satisfying all the above formulae (i) to (iii) for the degree of acyl substitution and a compound of formula (A-1) or formula (B-1). The preferred embodiment of the film in the invention is descried in detail hereinunder.

(1-1) Cellulose Acylate Resin

The film of the invention includes a cellulose acylate resin satisfying all the above formulae (i) to (iii) for the degree of acyl substitution. Also, the film of the invention preferably includes as a main component a cellulose acylate resin satisfying all the above formulae (i) to (iii) for the degree of acyl substitution. Here, the term "includes as a main component" means the cellulose acylate resin when one kind of cellulose acylate resin is used as a material of the cellulose acylate film, and means the cellulose acylate resin contained in a highest ratio when plural kinds of cellulose acylate resins are used as a material of the film. A cellulose has free hydroxyl groups at 2-position, 3-position and 6-position per a unit of glucose having a β-1,4 bonding. As the material of the cellulose acylate film in the invention, the cellulose acylate resin that the three hydroxyl groups are substituted on an acetyl group and a propionyl group and/or a butyryl group is at least used. Concretely, cellulose acetate/propionate, cellulose acetate/butylate or cellulose acetate/propionate/butylate are preferably used.

The starting cellulose for cellulose acylate includes cotton linter, wood pulp (hardwood pulp, softwood pulp), etc.; and any cellulose acylate resin starting from any type of cellulose is usable herein, and as the case may be, plural types of cellulose acylate resins may be mixed for use here. The starting cellulose is described in detail, for example, in Marusawa & Uda's "Plastic Material Course (17), Cellulose Resin" by Nikkan Kogyo Shinbun (issued 1970), and Hatsumei Kyokai Disclosure Bulletin No. 2001-1745 (pp. 7-8); and various types of cellulose disclosed in these are usable here with no specific limitation thereon for use for the cellulose acylate film in the invention.

The cellulose acylate film of the invention is characterized by containing a cellulose acylate satisfying all the following formulae (i) to (iii):

$$0.5\leqq A+B\leqq 2.7, \quad (i)$$

$$0.0\leqq A\leqq 2.5, \quad (ii)$$

$$0.1\leqq B\leqq 2.0. \quad (iii)$$

In the formulae (i) to (iii), A means the degree of substitution with an acetyl group, and B means a total of the degree of substitution with a propionyl group and the degree of substitution with a butyryl group.

When a cellulose acylate resin satisfying the formulae (i) to (iii) is used, the hydrophilicity of the resin is lowered in some degree and therefore the resin could easily dissolve in methylene chloride and alcoholic solvent (including methanol, ethanol and butanol) that is favorably used as the solvent for dissolving the cellulose acylate resin, and the film could be stable in an ordinary humidity condition. Further, the compound capable of forming a hydrogen bond is more effective. Moreover, the cellulose acylate resin satisfying the formulae (i) to (iii) can be produced inexpensively, and its superiority in point of the production cost in providing optical films for industrial use is great.

The cellulose acylate resin also satisfying B≦2.0 can be produced inexpensively, and its superiority in point of the production cost in providing optical films for industrial More preferably, the degree of acyl substitution in the cellulose acylate resin for the cellulose acylate film of the invention satisfies all the following formulae (iv) to (vi):

$$1.0 \leqq A+B \leqq 2.5, \quad \text{(iv)}$$

$$0.1 \leqq A \leqq 2.0, \quad \text{(v)}$$

$$0.1 \leqq B \leqq 1.8. \quad \text{(vi)}$$

In the formulae (iv) to (vi), A means the degree of substitution with an acetyl group, and B means a total of the degree of substitution with a propionyl group and the degree of substitution with a butyryl group.

Even more preferably, 1.2≦A+B≦2.5, 0.1≦A≦1.9, and 0.5≦B≦1.8.

The degree of acetyl substitution, the degree of propionyl substitution and the degree of butyryl substitution in the cellulose acylate resin each mean the degree of acetylation and the degree of propionylation and/or butyrylation, respectively, of the three hydroxyl groups existing in the constitutive unit ((β-1,4-glycoside bonding glucose) in cellulose. In this description, the degree of substitution with an acetyl group, a propionyl group and a butyryl group in the cellulose acylate resin may be computed by measuring the amount of the bonding fatty acid per the constitutive unit mass of cellulose. The measurement may be attained according to "ASTM D817-91".

Preferably, the cellulose acylate resin has a mass-average degree of polymerization of from 350 to 800, more preferably a mass-average degree of polymerization of from 370 to 600. Also preferably, the cellulose acylate resin for use in the invention has a number-average molecular weight of from 70000 to 230000, more preferably a number-average molecular weight of from 75000 to 230000, even more preferably a number-average molecular weight of from 78000 to 120000.

The cellulose acylate resin may be produced, using an acid anhydride or an acid chloride as the acylating agent. A most popular production method on an industrial scale is as follows: Cellulose obtained from cotton linter or wood pulp is esterified with a mixed organic acid component containing an organic acid (acetic acid, propionic acid, butyric acid) corresponding to the intended acetyl group and the propionyl group and/or the butyryl group or its acid anhydride (acetic anhydride, propionic anhydride, butyric anhydride) thereby producing the intended cellulose acylate resin.

(1-2) Compound Capable of Forming a Hydrogen Bond

The compound capable of forming a hydrogen bond used in the invention satisfies the following conditions (A), (B) and (C):

(A) the compound has both a hydrogen bond donor moiety and a hydrogen bond acceptor moiety in the molecule, (B) the value obtained by dividing the molecular weight of the compound by the total of the number of the hydrogen bond donor moiety and the number of the hydrogen bond acceptor moiety is from 30 to 65, and (C) the number of aromatic ring structures is from 1 to 3.

First, the condition (A) is described.

Examples of the functional groups that function as the hydrogen bond donor moiety or the hydrogen bond acceptor moiety in the compound capable of forming a hydrogen bond used in the invention are described in for example Table 2 on page 15 of "Introduction to Hydrogen Bonding" written by Jeffrey, George A. published by Oxford UP, which is herein incorporated by reference. In this specification, the total of the number of the hydrogen bond donor moiety and the number of the hydrogen bond acceptor moiety is the total number of the functional groups described in the Table contained in the compound capable of forming a hydrogen bond.

The compound capable of forming a hydrogen bond used in the invention has both a hydrogen bond donor moiety and a hydrogen bond acceptor moiety in the molecule and therefore it forms a strong hydrogen bond to water whereby it can prevent water from coordinating the carbonyl group in cellulose acylate.

The number of atoms linking the hydrogen bond donor moiety to the hydrogen bond acceptor moiety is preferably from 0 to 3, more preferably 1 or 2 from the viewpoint of formation of hydrogen bond to water.

Nest, the condition (B) is described.

In the compound capable of forming a hydrogen bond used in the invention, the value obtained by dividing the molecular weight of the compound by the total of the number of the hydrogen bond donor moiety and the number of the hydrogen bond acceptor moiety is more preferably from 35 to 60. In the case where the value obtained by dividing the molecular weight of the compound by the total of the number of the hydrogen bond donor moiety and the number of the hydrogen bond acceptor moiety is too high, the compound capable of forming a hydrogen bond is less accessible to the cellulose acylate to lessen its effect of retarding the fluctuation of retardation through an environmental change. In the case where the value obtained by dividing the molecular weight of the compound by the total of the number of the hydrogen bond donor moiety and the number of the hydrogen bond acceptor moiety is too low, interaction among the compounds capable of forming a hydrogen bond is excessively strong to cause undesirable state where solubility to a solvent and compatibility to the cellulose acylate are insufficient.

Nest, the condition (C) is described.

The number of aromatic ring structure contained in the compound capable of forming a hydrogen bond used in the invention is from 1 to 3. The aromatic ring structure used in the specification includes heteroaromatic rings as well as aromatic hydrocarbon rings. A fused ring consisting of two or more fused aromatic rings counts as one structure. Two aromatic rings bonding to each other through a linking group count as two structures. For example, a naphthalene ring having ten carbon atoms counts as one aromatic structure. In the case where the number of aromatic ring structure is 4 or more, the size of the molecule of the compound capable of forming a hydrogen bond is excessively large and thereby it is less accessible to the carbonyl group in the cellulose acylate to lessen its effect to retard the fluctuation of optical properties in humidity change in the environment.

The compound capable of forming a hydrogen bond used in the invention preferably has at least one heteroaromatic ring. When the compound has a heteroaromatic ring, the hetero atom in the heteroaromatic ring and other acceptor capable of forming a hydrogen bond or donor capable of forming a hydrogen bond in the compound capable of forming a hydrogen bond can preferably form a cyclic hydrogen bond to water easily.

(Hydrophilicity and Hydrophobicity of the Compound Capable of Forming a Hydrogen Bond)

The hydrophilicity and hydrophobicity of the compound capable of forming a hydrogen bond used in the invention are preferably controlled within a specific range. In the case where additives are excessively hydrophobic, the rate of the additives existing near the cellulose acylate decreases due to insufficient compatibility to the cellulose acylate. In the case where additives are excessively hydrophilic, their solubility to a solvent of the dope is insufficient.

—C Log P Value—

Octanol-water partition coefficients (log P values) can be generally measured by the shake flask method described in Japan Industrial Standards (JIS) Z7260-107 (2000). The octanol-water partition coefficients (log P values) can be estimated by a calculative chemical method or experiential method instead of actual measurement. Known examples of the calculative methods include Crippen's fragmentation method (J. Chem. Inf. Comput. Sci., 27, 21 (1987)), Viswanadhan's fragmentation method (J. Chem. Inf. Comput. Sci., 29, 163 (1989)), and Broto's fragmentation method (Eur. J. Med. Chem.-Chim. Theor., 19, 71 (1984)). The Crippen's fragmentation method (J. Chem. Inf. Comput. Sci., 27, 21 (1987)) is used in the invention.

The "C log P value" is a calculated common logarithm (log P) of an octanol-water partition coefficient P. Known methods and softwares can be used to calculate the C log P value. In the invention, the CLOGP program installed in PCModels that is a system of Daylight Chemical Information Systems is used. When C log P value of a compound measured by some method differs from C log P value of the compound calculated by some calculation method, the Crippen's fragmentation method is used to determine if the compound is included in the invention.

The hydrophilicity and hydrophobicity of the compound capable of forming a hydrogen bond can be expressed as an octanol-water partition coefficient (that may be referred to as log P hereinafter). The hydrophilicity of the compound capable of forming a hydrogen bond is characterized by being controlled so that C log P value of the octanol-water partition coefficient should be within the range of from 0 to 5.5. The C log P value of the compound capable of forming a hydrogen bond is preferably from 1.0 to 5.0, more preferably from 2.0 to 4.5.

The structures of the compound capable of forming a hydrogen bond are concretely described hereinafter.

The compound capable of forming a hydrogen bond used in the invention is preferably represented by the formulae (A-1) to (H-1). Each structure thereof is described below.

(A) Compound of Formula (A-1)

First described is the compound of the formula (A-1). In this specification, the hydrocarbon group such as an alkyl group or the like may be linear or branched, not contradictory to the scope of the sprit of the invention.

(A-1)

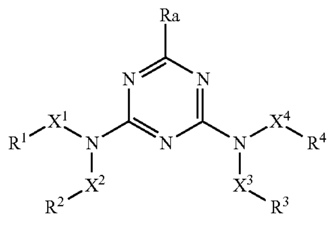

In the formula (A-1), Ra represents an alkyl group, an alkenyl group, an alkynyl group, a heterocyclic group or an aryl group; $X^1$, $X^2$, $X^3$ and $X^4$ each independently represent a single bond or a divalent linking group; $R^1$, $R^2$, $R^3$ and $R^4$ each independently represent a hydrogen atom, an alkyl group, an alkenyl group, an alkynyl group, an aryl group or a heterocyclic group.

Ra represents an alkyl group, an alkenyl group, an alkynyl group, a heterocyclic group or an aryl group, and is preferably an alkyl group or an aryl group.

When Ra is an alkyl group, preferably, it has from 1 to 20 carbon atoms, more preferably from 3 to 15 carbon atoms, even more preferably from 6 to 12 carbon atoms.

When Ra is an alkenyl group, preferably, it has from 2 to 20 carbon atoms, more preferably from 3 to 15 carbon atoms, even more preferably from 6 to 12 carbon atoms.

When Ra is an alkynyl group, preferably, it has from 2 to 20 carbon atoms, more preferably from 3 to 15 carbon atoms, even more preferably from 6 to 12 carbon atoms.

When Ra is an aryl group, preferably, it has from 6 to 24 carbon atoms, more preferably from 6 to 18 carbon atoms.

When Ra is a heterocyclic group, preferably, it has from 5 to 23 carbon atoms, more preferably from 5 to 17 carbon atoms.

Ra may further have a substituent or may have no substituent. Ra preferably has no substituent from the viewpoint of improvement of the humidity dependence.

The following substituent T is exemplified as the substituent that Ra may have. Examples of the substituent T include an alkyl group (including, preferably, 1-20 carbon atoms, more preferably 1-12 carbon atoms, particularly preferably 1-8 carbon atoms, such as a methyl group, an ethyl group, an isopropyl group, a tert-butyl group, a n-octyl group, a n-decyl group, a n-hexadecyl group, a cyclopropyl group, a cyclopentyl group and a cyclohexyl group), an alkenyl group (including, preferably, 2-20 carbon atoms, more preferably 2-12 carbon atoms, particularly preferably 2-8 carbon atoms, such as a vinyl group, an allyl group, a 2-butenyl group and a 3-pentenyl group), an alkynyl group (including, preferably, 2-20 carbon atoms, more preferably 2-12 carbon atoms, particularly preferably 2-8 carbon atoms, such as a propagyl group and a 3-pentynyl group), an aryl group (including, preferably, 6-30 carbon atoms, more preferably 6-20 carbon atoms, particularly preferably 6-12 carbon atoms, such as a phenyl group, a p-methylphenyl group and a naphthyl group), amino group (including, preferably, 0-20 carbon atoms, more preferably 0-10 carbon atoms, particularly preferably 0-6 carbon atoms, such as an amino group, a methylamino group, a dimethylamino group, a diethylamino group and a dibenzylamino group), an alkoxy group (including, preferably, 1-20 carbon atoms, more preferably 1-12 carbon atoms, particularly preferably 1-8 carbon atoms, such as a methoxy group, an ethoxy group and a butoxy group), an aryloxy group (including, preferably, 6-20 carbon atoms, more preferably 6-16 carbon atoms, particularly preferably 6-12 carbon atoms, such as a phenyloxy group and a 2-naphthyloxy group), an acyl group (including, preferably, 1-20 carbon atoms, more preferably 1-16 carbon atoms, particularly preferably 1-12 carbon atoms, such as an acetyl group, a benzoyl group, a formyl group and a pivaloyl group), an alkoxycarbonyl group (including, preferably, 2-20 carbon atoms, more preferably 2-16 carbon atoms, particularly preferably 2-12 carbon atoms, such as a methoxycarbonyl group and an ethoxycarbonyl group), an aryloxycarbonyl group (including, preferably, 7-20 carbon atoms, more preferably 7-16 carbon atoms, and particularly preferably 7-10 carbon atoms, such as a phenyloxycarbonyl group), an acyloxy group (including, preferably, 2-20 carbon atoms, more preferably 2-16 carbon atoms, particularly preferably 2-10 carbon atoms, such as an acetoxy group and a benzoyloxy group), an acylamino group (including, preferably, 2-20 carbon atoms, more preferably 2-16 carbon atoms, particularly preferably 2-10 carbon atoms, such as an acetylamino group and a benzoylamino group), an alkoxycarbonylamino group (including, preferably, 2-20 carbon atoms, more preferably 2-16 carbon atoms, particularly preferably 2-12 carbon atoms, such as a methoxycarbonylamino group), an aryloxycarbonylamino group (including, preferably, 7-20 carbon atoms, more preferably 7-16 carbon atoms, particularly preferably 7-12 carbon atoms, such as a phenyloxycarbonylamino group), a sulfonylamino group (including, preferably, 1-20 carbon atoms, more preferably 1-16 carbon atoms, particularly preferably 1-12 carbon atoms, such as a methanesulfonylamino group and a benzenesulfonylamino group), a sulfamoyl group (including, preferably, 0-20 carbon atoms, more preferably 0-16 carbon atoms, particularly preferably 0-12 carbon atoms, such as a sulfamoyl group, a methylsulfamoyl group, a dimethylsulfamoyl group and a phenylsulfamoyl group), a carbamoyl group (including, preferably, 1-20 carbon atoms, more preferably 1-16 carbon atoms, particularly preferably 1-12 carbon atoms, such as a carbamoyl group, a methylcarbamoyl group, a diethylcarbamoyl group and a phenylcarbamoyl group), an alkylthio group (including, preferably, 1-20 carbon atoms, more preferably 1-16 carbon atoms, particularly preferably 1-12 carbon atoms, such as a methylthio group and an ethylthio group), an arylthio group (including, preferably, 6-20 carbon atoms, more preferably 6-16 carbon atoms, particularly preferably 6-12 carbon atoms, such as a phenylthio group), a sulfonyl group (including, preferably, 1-20 carbon atoms, more preferably 1-16 carbon atoms, particularly preferably 1-12 carbon atoms, such as a mesyl group and a tosyl group), a sulfinyl group (including, preferably, 1-20 carbon atoms, more preferably 1-16 carbon atoms, particularly preferably 1-12 carbon atoms, such as a methanesulfinyl group and a benzenesulfinyl group), an ureide group (including, preferably, 1-20 carbon atoms, more preferably 1-16 carbon atoms, and particularly preferably 1-12 carbon atoms, such as an ureide group, a methylureide group and a phenylureide group), a phosphoric amide group (including, preferably, 1-20 carbon atoms, more preferably 1-16 carbon atoms, particularly preferably 1-12 carbon atoms, such as a diethylphosphoric amide group and a phenylphosphoric amide group), a hydroxyl group, a mercapto group, a halogen atom (such as a fluorine atom, a chlorine atom, a bromine atom, an iodine atom and etc.), a cyano group, a sulfo group, a carboxyl group, a nitro group, a hydroxamic acid group, a sulfino group, a hydrazino group, an imino group, a heteroring group (including, preferably, 1-30 carbon atoms, more preferably 1-12 carbon atoms, wherein examples of the hetero atom include a nitrogen atom, an oxygen atom and a sulfur atom, and specific examples include an imidazolyl group, a pyridyl group, a quinolyl group, a furyl group, a piperidyl group, a morphorino group, a benzoxysazolyl group, a benzimidazolyl group and a benzothiazolyl group), and a silyl group (including, preferably, 3-40 carbon atoms, more preferably 3-30 carbon atoms, particularly preferably 3-24 carbon atoms, such as a trimethylsilyl group and a triphenylsilyl group). These substituents may further have a substituent. When there are two substituents or more, they may be same with or different from each other. Further, when possible, they may be linked with each other to form a ring.

$X^1$, $X^2$, $X^3$ and $X^4$ each independently represent a single bond or a divalent linking group, and preferably each is independently a single bond, more preferably all are single bonds.

The divalent linking group which $X^1$, $X^2$, $X^3$ and $X^4$ each independently represent includes, for example, a divalent linking group represented by the following formula (3), an alkylene group (preferably having from 1 to 30 carbon atoms, more preferably from 1 to 3 carbon atoms, even more preferably 2 carbon atoms), and an arylene group (preferably having from 6 to 30 carbon atoms, more preferably from 6 to 10 carbon atoms). Of those, preferred is a divalent linking group represented by the following formula (P), and more preferred is a carbonyl group.

(P)

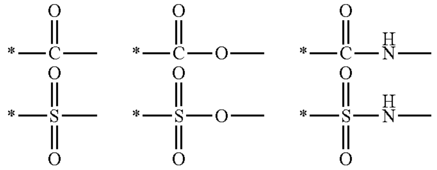

In the formula (P), the side * is the linking site to the N atom that bonds to the 1,3,5-triazine ring in the compound of the formula (A-1).

$R^1$, $R^2$, $R^3$ and $R^4$ each independently represent a hydrogen atom, an alkyl group, an alkenyl group, an alkynyl group, an aryl group or a heterocyclic group, preferably a hydrogen atom, an alkyl group, an aryl group or a heterocyclic group, more preferably a hydrogen atom, an alkyl group or a heterocyclic group, even more preferably a hydrogen atom or an alkyl group. Preferably, at least one of $R^1$ or $R^2$ is a hydrogen atom; and also preferably at least one of $R^3$ or $R^4$ is a hydrogen atom.

In the case where $R^1$, $R^2$, $R^3$ and $R^4$ each are an alkyl group, the group preferably has from 1 to 12 carbon atoms, more preferably from 1 to 6 carbon atoms, even more preferably from 1 to 4 carbon atoms. From the view point of the humidity dependence improvability of the compound, preferred are the compounds where $R^1$ is an alkyl group, $X^1$ is —C(═O)—, $R^2$ is an alkyl group, $X^2$ is —C(═O)—, $R^3$ is an alkyl group, $X^3$ is —C(═O)—, $R^4$ is an alkyl group, and $X^4$ is —C(═O)—.

$R^1$, $R^2$, $R^3$ and $R^4$ can represent an alkyl group, an alkenyl group, an alkynyl group, an aryl group or a heterocyclic group, more preferably substituted or unsubstituted aryl group. Preferred substituents the aryl group may have are the same as the scope of $R^{31}$ to $R^{34}$, that is a halogen atom, a hydroxyl group, a carbamoyl group, sulfamoyl group, an alkyl group having from 1 to 8 carbon atoms, an alkoxy group having from 1 to 8 carbon atoms, an alkylamino group having from 1 to 8 carbon atoms and a dialkylamino group having from 1 to 8 carbon atoms.

In the case where $R^1$, $R^2$, $R^3$ and $R^4$ each are an alkenyl group, the group preferably has from 2 to 12 carbon atoms, more preferably from 2 to 6 carbon atoms, even more preferably from 2 to 4 carbon atoms.

In the case where $R^1$, $R^2$, $R^3$ and $R^4$ each are an alkynyl group, the group preferably has from 2 to 12 carbon atoms, more preferably from 2 to 6 carbon atoms, even more preferably from 2 to 4 carbon atoms.

In the case where $R^1$, $R^2$, $R^3$ and $R^4$ each are an aryl group, the group preferably has from 6 to 18 carbon atoms, more preferably from 6 to 12 carbon atoms, even more preferably 6 carbon atoms from the viewpoint of the humidity dependence improvability of the compound.

$R^1$, $R^2$, $R^3$ and $R^4$ each may have or may not have an additional substituent, and the substituent includes the above-mentioned substituent group T.

The compound of the formula (A-1) is particularly preferably represented by the following formula (A-2):

(A-2)

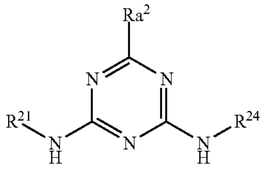

wherein $Ra^2$ represents an alkyl group, an alkenyl group, an alkynyl group or an aryl group. The preferred range is the same as that of Ra described above.

$R^{21}$ and $R^{24}$ each independently represent a hydrogen atom, an alkyl group, an alkenyl group, an alkynyl group, an aryl group or a heterocyclic group. The preferred range is the same as that of $R^1$, $R^2$, $R^3$ and $R^4$ described above.

The compound of the formula (A-1) is particularly preferably represented by the following formula (A-3):

(A-3)

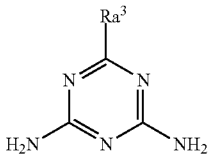

wherein $Ra^3$ represents an alkyl group, an alkenyl group, an alkynyl group or an aryl group.

$Ra^3$ represents an alkyl group, an alkenyl group, an alkynyl group or an aryl group. The preferred range is the same as that of Ra described above.

In the cellulose acylate film of the invention, $Ra^3$ is preferably an alkyl group, more preferably unsubstituted alkyl group in order to improve the humidity dependence of retardation while Rth is reduced.

The compound of the formula (A-1) is particularly preferably represented by the following formula (A-4):

(A-4)

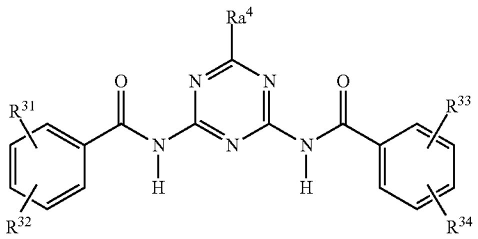

wherein $R^{31}$, $R^{32}$, $R^{33}$ and $R^{34}$ each independently represent a hydrogen atom, a halogen atom, a hydroxyl group, a carbamoyl group, a sulfamoyl group, an alkyl group having from 1 to 8 carbon atoms, an alkoxy group having from 1 to 8 carbon atoms, an alkylamino group having from 1 to 8 carbon atoms, a dialkylamino group having from 1 to 8 carbon atoms. $R^4$ represents an alkyl group, an alkenyl group, an alkynyl group or an aryl group. The preferred range is the same as that of Ra described above.

(B) Compound of Formula (B-1)

Next described is the compound of the formula (B-1).

(B-1)

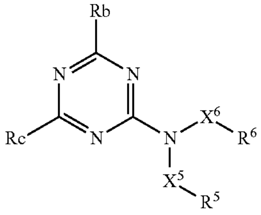

wherein Rb and Rc each independently represent an alkyl group, an alkenyl group, an alkynyl group, a heterocyclic group or an aryl group; $X^5$ and $X^6$ each independently represent a single bond or a divalent linking group; $R^5$ and $R^6$ each independently represent a hydrogen atom, an alkyl group, an alkenyl group, an alkynyl group, an aryl group or a heterocyclic group.

Rb and Rc each independently represent an alkyl group, an alkenyl group, an alkynyl group, a heterocyclic group or an aryl group. The preferred range is the same as that of Ra described above.

$X^5$ and $X^6$ each independently represent a single bond or a divalent linking group. The preferred range is the same as that of $X^1$, $X^2$, $X^3$ and $X^4$ described above.

$R^5$ and $R^6$ each independently represent a hydrogen atom, an alkyl group, an alkenyl group, an alkynyl group, an aryl group or a heterocyclic group. The preferred range is the same as that of $R^1$, $R^2$, $R^3$ and $R^4$ described above.

The compound of the formula (B-1) is particularly preferably represented by the following formula (B-2):

(B-2)

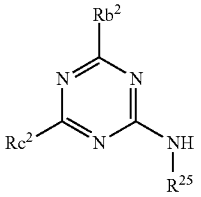

wherein $Rb^2$ and $Rc^2$ each independently represent an alkyl group, an alkenyl group, an alkynyl group or an aryl group. The preferred range is the same as that of Ra described above.

$R^{25}$ represents a hydrogen atom, an alkyl group, an alkenyl group, an alkynyl group, an aryl group or a heterocyclic group. The preferred range is the same as that of $R^{21}$ and $R^{24}$ described above.

The compound of the formula (B-1) is particularly preferably represented by the following formula (B-3):

(B-3)

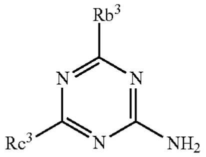

wherein $Rb^3$ and $Rc^3$ each independently represent an alkyl group, an alkenyl group, an alkynyl group or an aryl group. The preferred range is the same as that of Ra described above.

The compound of the formula (B-1) is particularly preferably represented by the following formula (B-4):

(B-4)

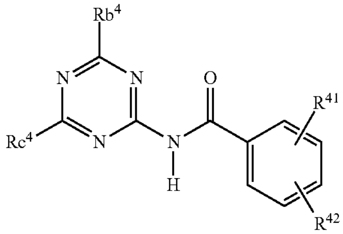

wherein $Rb^4$ and $Rc^4$ each independently represent an alkyl group, an alkenyl group, an alkynyl group or an aryl group.

In the cellulose acylate film of the invention, $Rb^3$ and $Rc^3$ are preferably an alkyl group, more preferably unsubstituted alkyl group in order to improve the humidity dependence of retardation while Rth is reduced. From the same viewpoint, $Rb^4$ and $Rc^4$ are preferably an alkyl group.

$R^{41}$ and $R^{42}$ each independently represent a hydrogen atom, an alkyl group, an alkenyl group, an alkynyl group, an aryl group or a heterocyclic group. The preferred range is the same as that of $R^{21}$ and $R^{24}$ described above.

Specific examples of the compounds of the formula (A-1) or (B-1) are mentioned below, to which, however, the invention should not be limited.

(A-11)

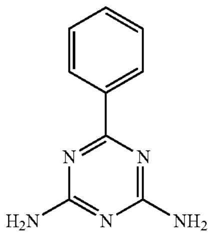

(A-12)

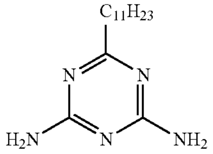

(A-13)

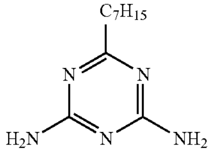

(A-14)

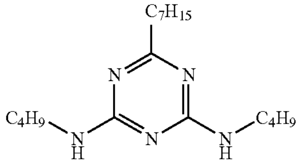

-continued (A-15)

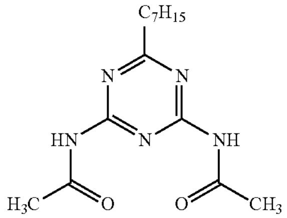

(A-16)

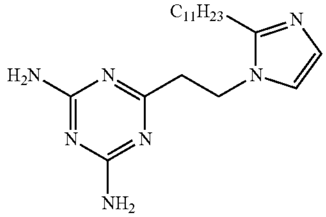

(A-18)

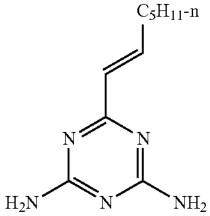

(A-19)

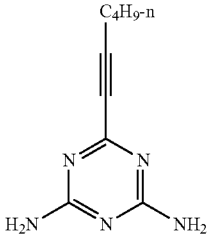

(A-20)

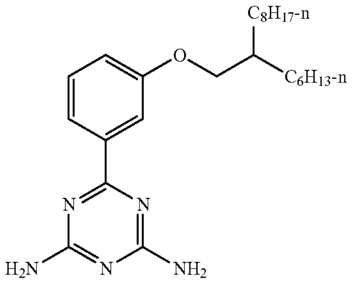

(A-21)

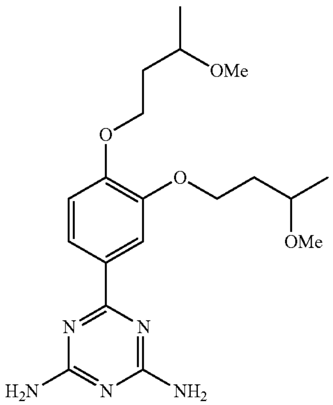

-continued
(A-22)
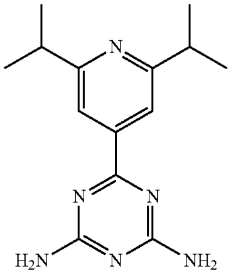
(A-23)
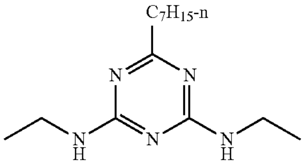
(A-24)
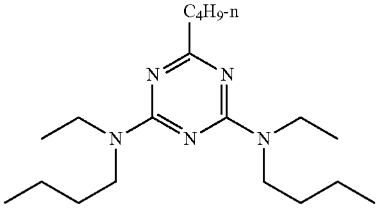
(A-25)
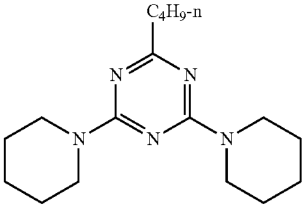
(A-26)
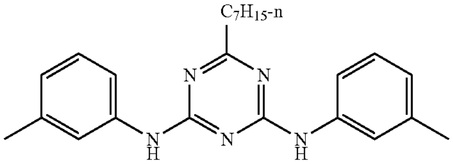
(A-27)
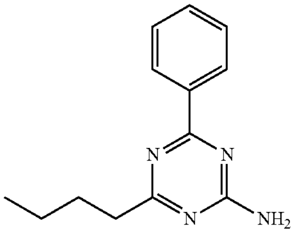
(A-31)
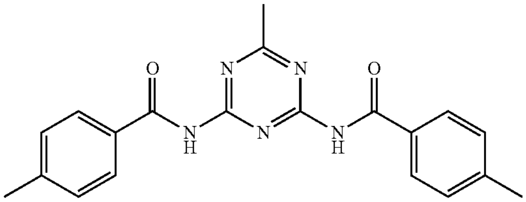
-continued
(A-32)
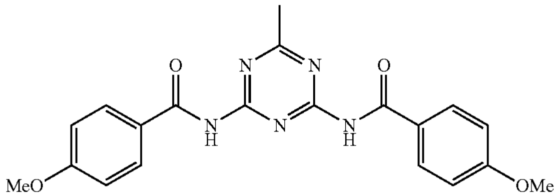
(A-33)
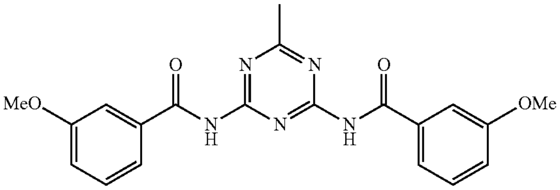
(A-34)
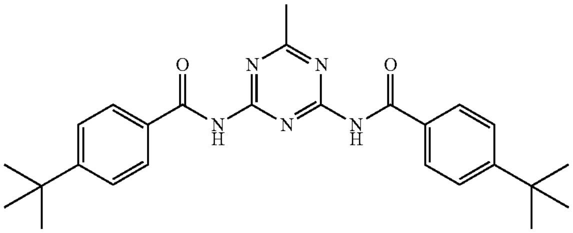
(A-35)
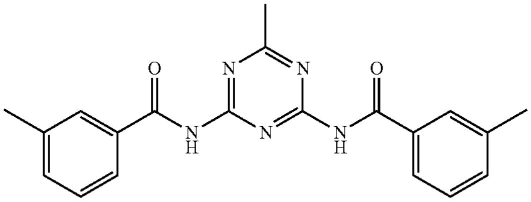
(A-36)
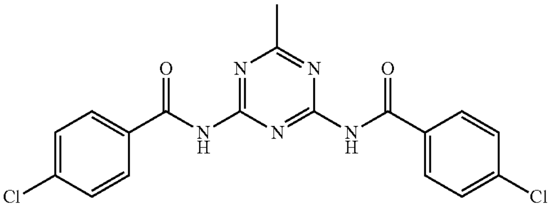
(A-37)
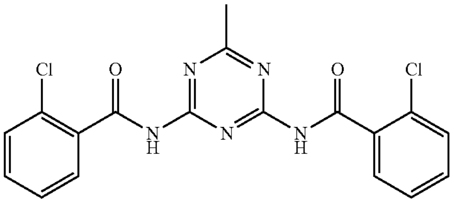
(A-38)
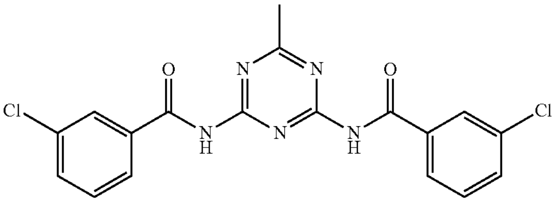

-continued (A-39)

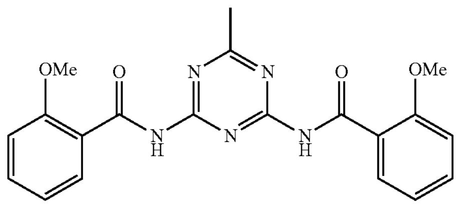

(A-40)

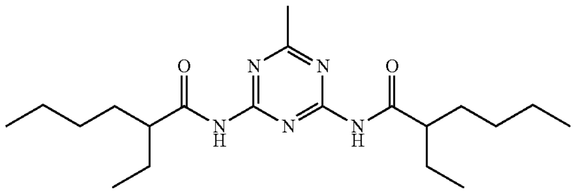

(A-41)

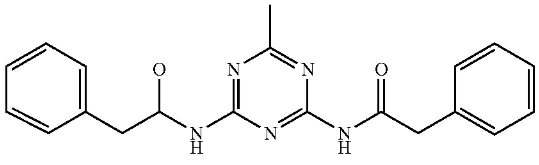

(A-42)

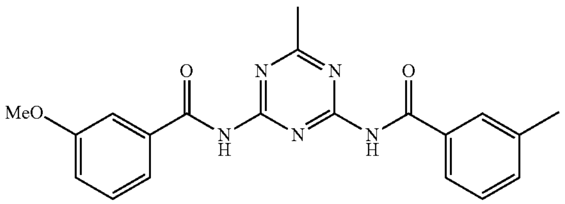

(Production Method for Compound of Formula (A-1) or (B-1))

The production method for the compound of the formula (A-1) or (B-1) to be contained in the compound capable of forming a hydrogen bond is not specifically defined; and the compound may be produced according to a known method. Preferred production method which can be used in the invention are for example a method of heating dicyanodiamide and a nitrile compound in an alcohol in the presence of an inorganic base such as potassium hydroxide to form a triazine ring as descrieed in U.S. Pat. No. 3,478,026 and Chem. Eur. J. 2005, 11, 6616-6628; a method of subjecting cyanuric chloride as a raw material to a substitution reaction with a Grignard reagent and then an amine compound as described in Tetrahedron 2000, 56, 9705-9711; and a method of reacting an imidoyl guanidine with a carboxylic chloride or an ester to give a monoamino-di-substituted-s-triazine compound as described in Journal of Synthetic Organic Chemistry, 1967, vol. 25 (11), 1048-1051.

The compounds of the formula (A-1) or (B-1) may be commercially available.

(C) Compound of Formula (C-1)

Next described is the compound of the formula (C-1).

(C-1)

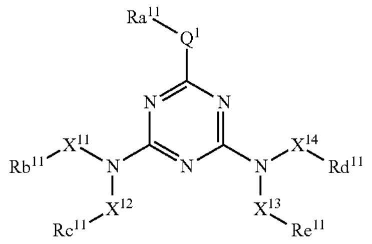

wherein $Ra^{11}$ represents an alkyl group, an alkenyl group, an alkynyl group, a heterocyclic group or an aryl group; $Rb^{11}$, $Rc^{11}$, $Rd^{11}$ and $Re^{11}$ each independently represent a hydrogen atom, an alkyl group, an alkenyl group, an alkynyl group, a heterocyclic group or an aryl group; $Q^1$ represents —O—, —S— or —NRf-; Rf represents a hydrogen atom, an alkyl group, an alkenyl group, an alkynyl group, a heterocyclic group or an aryl group, and may be taken together with $Ra^{11}$ to form a ring; $X^{12}$ and $X^{13}$ each independently represent a single bond or a divalent linking group; and $X^{14}$ represents any one selected from the group of divalent linking groups of the formula (P) described above.

The compound of the formula (C-1) is particularly preferably represented by the following formula (C-2):

(C-2)

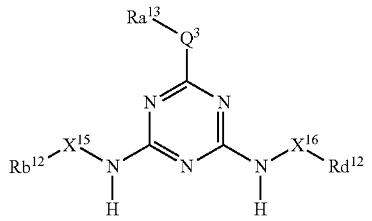

wherein $Ra^{12}$ represents an alkyl group, an alkenyl group, an alkynyl group, a heterocyclic group or an aryl group; $Rb^{12}$ and $Rd^{12}$ each independently represent a hydrogen atom, an alkyl group, an alkenyl group, an alkynyl group, a heterocyclic group or an aryl group; $Q^2$ represents —O—, —S— or —NRf-; Rf represents a hydrogen atom, an alkyl group, an alkenyl group, an alkynyl group, a heterocyclic group or an aryl group, and may be taken together with $Ra^{12}$ to form a ring; $X^{11}$, $X^{12}$ and $X^{13}$ each independently represent a single bond or a divalent linking group; and $X^{14}$ represents any one selected from the group of divalent linking groups of the formula (P) described above.

The compound of the formula (C-1) is particularly preferably represented by the following formula (C-3):

(C-3)

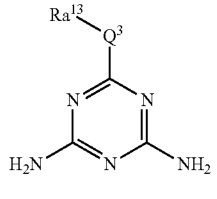

wherein $Ra^{13}$ represents an alkyl group, an alkenyl group, an alkynyl group, a heterocyclic group or an aryl group; and $Q^3$ represents —O—, —S— or —NRf-; Rf represents a hydrogen atom, an alkyl group, an alkenyl group, an alkynyl group, a heterocyclic group or an aryl group, and may be taken together with $Ra^{13}$ to form a ring.

The compound of the formula (C-1) is particularly preferably represented by the following formula (C-4):

(C-4)

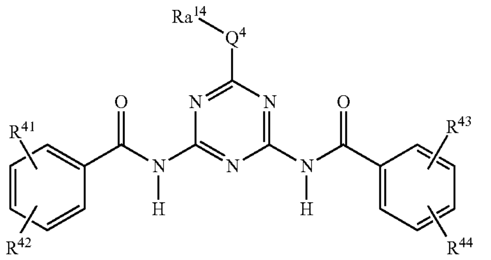

wherein $R^{41}$, $R^{42}$, $R^{43}$ and $R^{44}$ each independently represent a hydrogen atom, a halogen atom, a hydroxyl group, a carbamoyl group, a sulfamoyl group, an alkyl group having from 1 to 8 carbon atoms, an alkoxy group having from 1 to 8 carbon atoms, an alkylamino group having from 1 to 8 carbon atoms, a dialkylamino group having from 1 to 8 carbon atoms; $R^{14}$ represents an alkyl group, an alkenyl group, an alkynyl group or an aryl group; $Q^4$ represents —O—, —S— or —NRf-; and Rf represents a hydrogen atom, an alkyl group, an alkenyl group, an alkynyl group, a heterocyclic group or an aryl group, and may be taken together with $Ra^{14}$ to form a ring.

(D) Compound of Formula (D-1)

Next described is the compound of the formula (D-1).

(D-1)

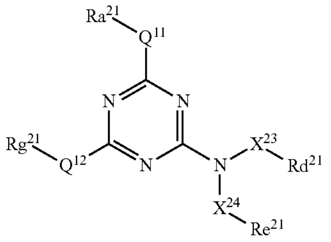

wherein $Ra^{21}$ and $Rg^{21}$ each independently represent an alkyl group, an alkenyl group, an alkynyl group, a heterocyclic group or an aryl group; $Rd^{21}$ and $Re^{21}$ each independently represent a hydrogen atom, an alkyl group, an alkenyl group, an alkynyl group, a heterocyclic group or an aryl group; $Q^{11}$ represents —O—, —S— or —NRf-; Rf represents a hydrogen atom, an alkyl group, an alkenyl group, an alkynyl group, a heterocyclic group or an aryl group, and may be taken together with $Ra^{21}$ to form a ring; $Q^{12}$ represents —O—, —S— or —NRh-; Rh represents a hydrogen atom, an alkyl group, an alkenyl group, an alkynyl group, a heterocyclic group or an aryl group, and may be taken together with $Rg^{21}$ to form a ring; $X^{23}$ represents a single bond or a divalent linking group; and $X^{24}$ represents any one selected from the group of divalent linking groups of the formula (P) described above.

The compound of the formula (D-1) is particularly preferably represented by the following formula (D-2):

(D-2)

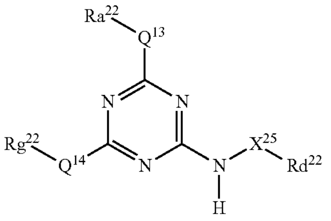

wherein $Ra^{22}$ and $Rg^{22}$ each independently represent an alkyl group, an alkenyl group, an alkynyl group, a heterocyclic group or an aryl group; $Rd^{22}$ represents a hydrogen atom, an alkyl group, an alkenyl group, an alkynyl group, a heterocyclic group or an aryl group; $Q^{13}$ represents —O—, —S— or —NRf-; Rf represents a hydrogen atom, an alkyl group, an alkenyl group, an alkynyl group, a heterocyclic group or an aryl group, and may be taken together with $Ra^{22}$ to form a ring; $Q^{14}$ represents —O—, —S— or —NRh-; Rh represents a hydrogen atom, an alkyl group, an alkenyl group, an alkynyl group, a heterocyclic group or an aryl group, and may be taken together with $Rg^{22}$ to form a ring; and $X^{25}$ represents any one selected from the group of divalent linking groups of the formula (P) described above.

The compound of the formula (D-1) is particularly preferably represented by the following formula (D-3):

(D-3)

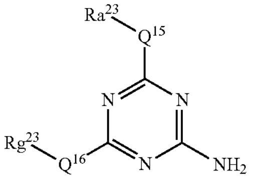

wherein $Ra^{23}$ and $Rg^{23}$ each independently represent an alkyl group, an alkenyl group, an alkynyl group, a heterocyclic group or an aryl group; $Q^{15}$ represents —O—, —S— or —NRf-; Rf represents a hydrogen atom, an alkyl group, an alkenyl group, an alkynyl group, a heterocyclic group or an aryl group, and may be taken together with $Ra^{23}$ to form a ring; $Q^{16}$ represents —O—, —S— or —NRh-; and Rh represents a hydrogen atom, an alkyl group, an alkenyl group, an alkynyl group, a heterocyclic group or an aryl group, and may be taken together with $Rg^{23}$ to form a ring.

The compound of the formula (D-1) is particularly preferably represented by the following formula (D-4):

(D-4)

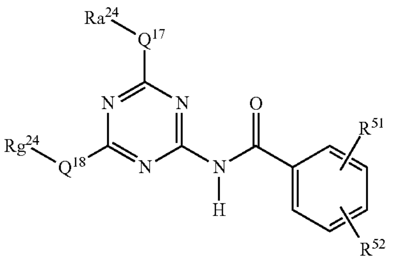

wherein $Ra^{51}$ and $Rg^{52}$ each independently represent a hydrogen atom, a halogen atom, a hydroxyl group, a carbamoyl group, a sulfamoyl group, an alkyl group having from 1 to 8 carbon atoms, an alkoxy group having from 1 to 8 carbon atoms, an alkylamino group having from 1 to 8 carbon atoms, a dialkylamino group having from 1 to 8 carbon atoms; $Ra^{24}$ and $Rg^{24}$ each independently represent an alkyl group, an alkenyl group, an alkynyl group or an aryl group; $Q^{17}$ represents —O—, —S— or —NRf-; and Rf represents a hydrogen atom, an alkyl group, an alkenyl group, an alkynyl group, a heterocyclic group or an aryl group, and may be taken together with $Ra^{24}$ to form a ring; $Q^{18}$ represents —O—, —S— or —NRh-; and Rh represents a hydrogen atom, an alkyl group, an alkenyl group, an alkynyl group or an aryl group, and may be taken together with $Rg^{24}$ to form a ring.

Specific examples of the compounds of the formula (C-1) or (D-1) are mentioned below, to which, however, the invention should not be limited.

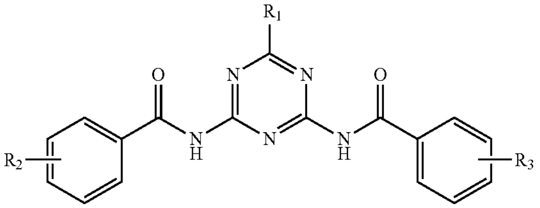

| Compound | R1 | R2 | R3 |
|---|---|---|---|
| C-101 | 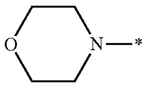 | H | H |
| C-102 | | o-Me | o-Me |
| C-103 | | m-Me | m-Me |
| C-104 | | p-Me | p-Me |
| C-105 | | o-OMe | o-OMe |
| C-106 | | m-OMe | m-OMe |
| C-107 | | p-OMe | p-OMe |
| C-108 | | p-t-Bu | p-t-Bu |
| C-109 | | m-Cl | m-Cl |
| C-110 | | m-F | m-F |
| C-111 | 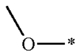 | H | H |
| C-112 | | o-Me | o-Me |
| C-113 | | m-Me | m-Me |
| C-114 | | p-Me | p-Me |
| C-115 | | o-OMe | o-OMe |
| C-116 | | m-OMe | m-OMe |
| C-117 | | p-OMe | p-OMe |
| C-118 | | p-t-Bu | p-t-Bu |
| C-119 | | m-Cl | m-Cl |
| C-120 | | m-F | m-F |
| C-121 | 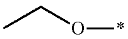 | H | H |
| C-122 | | o-Me | o-Me |
| C-123 | | m-Me | m-Me |
| C-124 | | p-Me | p-Me |
| C-125 | | o-OMe | o-OMe |
| C-126 | | m-OMe | m-OMe |
| C-127 | | p-OMe | p-OMe |
| C-128 | | p-t-Bu | p-t-Bu |
| C-129 | | m-Cl | m-Cl |
| C-130 | | m-F | m-F |
| C-131 | 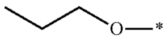 | H | H |
| C-132 | | o-Me | o-Me |
| C-133 | | m-Me | m-Me |
| C-134 | | p-Me | p-Me |
| C-135 | | o-OMe | o-OMe |
| C-136 | | m-OMe | m-OMe |
| C-137 | | p-OMe | p-OMe |
| C-138 | | p-t-Bu | p-t-Bu |
| C-139 | | m-Cl | m-Cl |
| C-140 | | m-F | m-F |

-continued

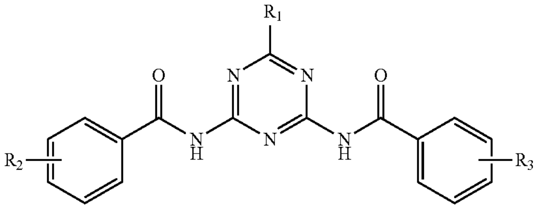

| Compound | R1 | R2 | R3 |
|---|---|---|---|
| C-141 | $H_2N$—* | H | H |
| C-142 | | o-Me | o-Me |
| C-143 | | m-Me | m-Me |
| C-144 | | p-Me | p-Me |
| C-145 | | o-OMe | o-OMe |
| C-146 | | m-OMe | m-OMe |
| C-147 | | p-OMe | p-OMe |
| C-148 | | p-t-Bu | p-t-Bu |
| C-149 | | m-Cl | m-Cl |
| C-150 | | m-F | m-F |
| C-151 | 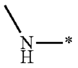 | H | H |
| C-152 | | o-Me | o-Me |
| C-153 | | m-Me | m-Me |
| C-154 | | p-Me | p-Me |
| C-155 | | o-OMe | o-OMe |
| C-156 | | m-OMe | m-OMe |
| C-157 | | p-OMe | p-OMe |
| C-158 | | p-t-Bu | p-t-Bu |
| C-159 | | m-Cl | m-Cl |
| C-160 | | m-F | m-F |
| C-161 | 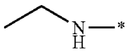 | H | H |
| C-162 | | o-Me | o-Me |
| C-163 | | m-Me | m-Me |
| C-164 | | p-Me | p-Me |
| C-165 | | o-OMe | o-OMe |
| C-166 | | m-OMe | m-OMe |
| C-167 | | p-OMe | p-OMe |
| C-168 | | p-t-Bu | p-t-Bu |
| C-169 | | m-Cl | m-Cl |
| C-170 | | m-F | m-F |
| C-171 | 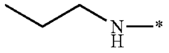 | H | H |
| C-172 | | o-Me | o-Me |
| C-173 | | m-Me | m-Me |
| C-174 | | p-Me | p-Me |
| C-175 | | o-OMe | o-OMe |
| C-176 | | m-OMe | m-OMe |
| C-177 | | p-OMe | p-OMe |
| C-178 | | p-t-Bu | p-t-Bu |
| C-179 | | m-Cl | m-Cl |
| C-180 | | m-F | m-F |

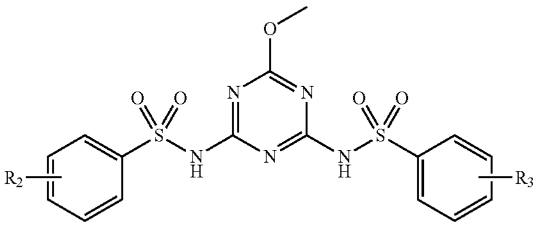

| Compound | R2 | R3 |
|---|---|---|
| C-181 | H | H |
| C-182 | o-Me | o-Me |
| C-183 | m-Me | m-Me |
| C-184 | p-Me | p-Me |
| C-185 | o-OMe | o-OMe |
| C-186 | m-OMe | m-OMe |

-continued

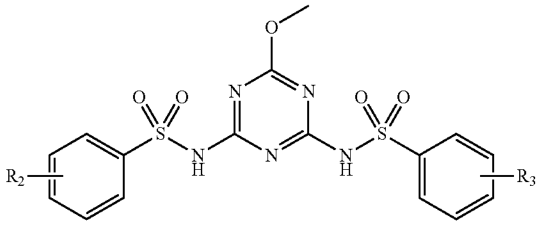

| Compound | R2 | R3 |
|---|---|---|
| C-187 | p-OMe | p-OMe |
| C-188 | p-t-Bu | p-t-Bu |
| C-189 | m-Cl | m-Cl |
| C-190 | m-F | m-F |

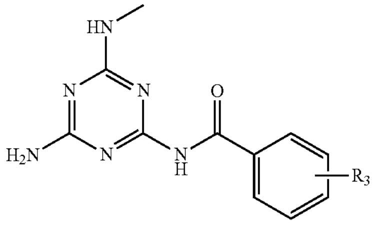

| Compound | R3 |
|---|---|
| D-101 | H |
| D-102 | o-Me |
| D-103 | m-Me |
| D-104 | p-Me |
| D-105 | o-OMe |
| D-106 | m-OMe |
| D-107 | p-OMe |
| D-108 | p-t-Bu |
| D-109 | m-Cl |
| D-110 | m-F |

(E) Compound of Formula (E-1)

Next described is the compound of the formula (E-1).

(E-1)

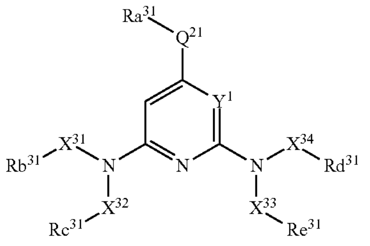

wherein $Y^1$ represents a methine group or —N—; $Ra^{31}$ represents an alkyl group, an alkenyl group, an alkynyl group, a heterocyclic group or an aryl group; $Rb^{31}$, $Rc^{31}$, $Rd^{31}$ and $Re^{31}$ each independently represent a hydrogen atom, an alkyl group, an alkenyl group, an alkynyl group, a heterocyclic group or an aryl group; $Q^{21}$ represents a single bond, —O—, —S— or —NRf-; Rf represents a hydrogen atom, an alkyl group, an alkenyl group, an alkynyl group, a heterocyclic group or an aryl group, and may be taken together with $Ra^{31}$ to form a ring; $X^{31}$, $X^{32}$ and $X^{33}$ each independently represent a single bond or a divalent linking group; and $X^{34}$ represents any one selected from the group of divalent linking groups of the following formula (Q):

(Q)

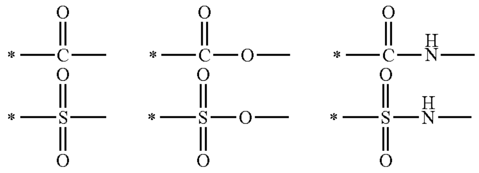

wherein the side * is the linking site to the N atom that bonds to the heterocyclic ring in the compound of the formula (E-1).

The compound of the formula (E-1) is particularly preferably represented by the following formula (E-2):

(E-2)

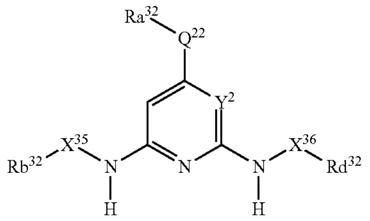

wherein $Y^2$ represents a methine group or —N—; $Ra^{32}$ represents an alkyl group, an alkenyl group, an alkynyl group, a heterocyclic group or an aryl group; $Rb^{32}$, $Rc^{32}$ and $Rd^{32}$ each independently represent a hydrogen atom, an alkyl group, an alkenyl group, an alkynyl group, a heterocyclic group or an aryl group; $Q^{22}$ represents a single bond, —O—, —S— or —NRf-; Rf represents a hydrogen atom, an alkyl group, an alkenyl group, an alkynyl group, a heterocyclic group or an aryl group, and may be taken together with $Ra^{32}$ to form a ring; $X^{35}$ represents a single bond or a divalent linking group; and $X^{36}$ represents a single bond or any one selected from the group of divalent linking groups of the formula (Q) described above.

The compound of the formula (E-1) is particularly preferably represented by the following formula (E-3):

(E-3)

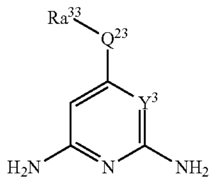

wherein $Y^3$ represents a methine group or —N—; $Ra^{33}$ represents an alkyl group, an alkenyl group, an alkynyl group, a heterocyclic group or an aryl group; and $Q^{23}$ represents a single bond, —O—, —S— or —NRf-; Rf represents a hydrogen atom, an alkyl group, an alkenyl group, an alkynyl group, a heterocyclic group or an aryl group, and may be taken together with $Ra^{33}$ to form a ring.

The compound of the formula (E-1) is particularly preferably represented by the following formula (E-4):

(E-4)

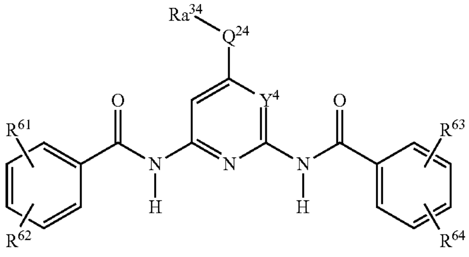

wherein $Y^4$ represents a methine group or —N—; $Ra^{34}$ represents an alkyl group, an alkenyl group, an alkynyl group, a heterocyclic group or an aryl group; $Q^{24}$ represents a single bond, —O—, —S— or —NRf-; Rf represents a hydrogen atom, an alkyl group, an alkenyl group, an alkynyl group, a heterocyclic group or an aryl group, and may be taken together with $Ra^{34}$ to form a ring; and $Ra^{61}$, $Ra^{62}$, $Ra^{63}$ and $Ra^{64}$ each independently represent a hydrogen atom, a halogen atom, a hydroxyl group, a carbamoyl group, a sulfamoyl group, an alkyl group having from 1 to 8 carbon atoms, an alkoxy group having from 1 to 8 carbon atoms, an alkylamino group having from 1 to 8 carbon atoms, a dialkylamino group having from 1 to 8 carbon atoms.

The compound of the formula (E-1) is particularly preferably represented by the following formula (E-5):

(E-5)

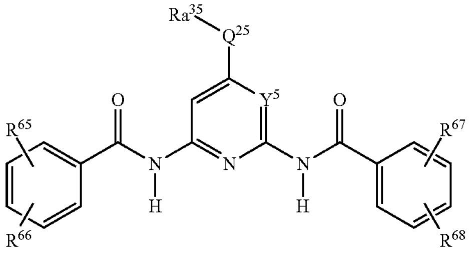

wherein $R^{65}$, $R^{66}$, $R^{67}$ and $R^{68}$ each independently represent a hydrogen atom, a halogen atom, a hydroxyl group, a carbamoyl group, a sulfamoyl group, an alkyl group having from 1 to 8 carbon atoms, an alkoxy group having from 1 to 8 carbon atoms, an alkylamino group having from 1 to 8 carbon atoms, a dialkylamino group having from 1 to 8 carbon atoms; $Ra^{35}$ represents an alkyl group, an alkenyl group, an alkynyl group, a heterocyclic group or an aryl group; $Q^{25}$ represents a single bond, —O—, —S— or —NRf-; and Rf represents a hydrogen atom, an alkyl group, an alkenyl group, an alkynyl group, a heterocyclic group or an aryl group, and may be taken together with $Ra^{35}$ to form a ring.

(F) Compound of Formula (F-1)

Next described is the compound of the formula (F-1).

(F-1)

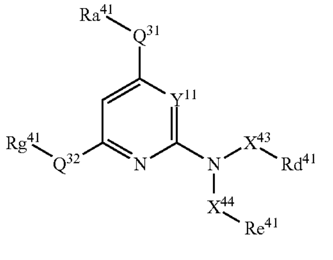

wherein $Y^{11}$ represents a methine group or —N—; $Ra^{41}$ and $Rg^{41}$ each independently represent an alkyl group, an alkenyl group, an alkynyl group, a heterocyclic group or an aryl group; $Rd^{41}$ and $Re^{41}$ each independently represent a hydrogen atom, an alkyl group, an alkenyl group, an alkynyl group, a heterocyclic group or an aryl group; $Q^{31}$ represents —O—, —S— or —NRf-; Rf represents a hydrogen atom, an alkyl group, an alkenyl group, an alkynyl group, a heterocyclic group or an aryl group, and may be taken together with $Ra^{41}$ to form a ring; $Q^{32}$ represents —O—, —S— or —NRh-; Rh represents a hydrogen atom, an alkyl group, an alkenyl group, an alkynyl group, a heterocyclic group or an aryl group, and may be taken together with $Rg^{41}$ to form a ring; $X^{43}$ represents a single bond or a divalent linking group; and $X^{44}$ represents any one selected from the group of divalent linking groups of the formula (P) described above wherein the side * is the linking site to the N atom that bonds to the heterocyclic ring in the compound of the formula (F-1).

The compound of the formula (F-1) is particularly preferably represented by the following formula (F-2):

(F-2)

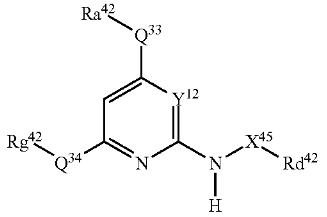

wherein $Y^{12}$ represents a methine group or —N—; $Ra^{42}$ and $Rg^{42}$ each independently represent an alkyl group, an alkenyl group, an alkynyl group, a heterocyclic group or an aryl group; $Rd^{42}$ represents a hydrogen atom, an alkyl group, an alkenyl group, an alkynyl group, a heterocyclic group or an aryl group; $Q^{33}$ represents —O—, —S— or —NRf-; Rf represents a hydrogen atom, an alkyl group, an alkenyl group, an alkynyl group, a heterocyclic group or an aryl group, and may be taken together with $Ra^{42}$ to form a ring; $Q^{34}$ represents —O—, —S— or —NRh-; Rh represents a hydrogen atom, an alkyl group, an alkenyl group, an alkynyl group, a heterocyclic group or an aryl group, and may be taken together with $Rg^{42}$ to form a ring; $X^{43}$ represents a single bond or a divalent linking group; and $X^{45}$ represents any one selected from the group of divalent linking groups of the formula (P) described above wherein the side * is the linking site to the N atom that bonds to the heterocyclic ring in the compound of the formula (F-2).

The compound of the formula (F-1) is particularly preferably represented by the following formula (F-3):

(F-3)

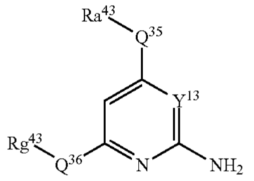

wherein $Y^{13}$ represents a methine group or —N—; $Ra^{43}$ and $Rg^{43}$ each independently represent an alkyl group, an alkenyl group, an alkynyl group, a heterocyclic group or an aryl group; $Q^{35}$ represents —O—, —S— or —NRf-; Rf represents a hydrogen atom, an alkyl group, an alkenyl group, an alkynyl group, a heterocyclic group or an aryl group, and may be taken together with $Ra^{43}$ to form a ring; $Q^{36}$ represents —O—, —S— or —NRh-; and Rh represents a hydrogen atom, an alkyl group, an alkenyl group, an alkynyl group, a heterocyclic group or an aryl group, and may be taken together with $Rg^{43}$ to form a ring.

The compound of the formula (F-1) is particularly preferably represented by the following formula (F-4):

(F-4)

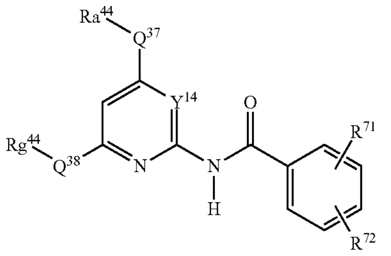

wherein $Y^{14}$ represents a methine group or —N—; $Ra^{44}$ and $Rg^{44}$ each independently represent an alkyl group, an alkenyl group, an alkynyl group, a heterocyclic group or an aryl group; $Q^{37}$ represents a single bond, —O—, —S— or —NRf-; Rf represents a hydrogen atom, an alkyl group, an alkenyl group, an alkynyl group, a heterocyclic group or an aryl group, and may be taken together with $Ra^{44}$ to form a ring; $Q^{38}$ represents a single bond, —O—, —S— or —NRf-; Rf represents a hydrogen atom, an alkyl group, an alkenyl group, an alkynyl group, a heterocyclic group or an aryl group, and may be taken together with $Rg^{44}$ to form a ring; and $R^{71}$ and $R^{72}$ each independently represent a hydrogen atom, a halogen atom, a hydroxyl group, a carbamoyl group, a sulfamoyl group, an alkyl group having from 1 to 8 carbon atoms, an alkoxy group having from 1 to 8 carbon atoms, an alkylamino group having from 1 to 8 carbon atoms, a dialkylamino group having from 1 to 8 carbon atoms.

The compound of the formula (F-1) is particularly preferably represented by the following formula (F-5):

(F-5)

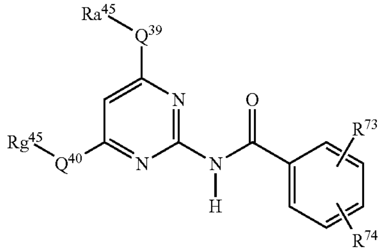

wherein $Ra^{45}$ and $Rg^{45}$ each independently represent an alkyl group, an alkenyl group, an alkynyl group, a heterocyclic group or an aryl group; $Q^{39}$ represents a single bond, —O—, —S— or —NRf-; Rf represents a hydrogen atom, an alkyl group, an alkenyl group, an alkynyl group, a heterocyclic group or an aryl group, and may be taken together with $Ra^{45}$ to form a ring; $Q^{40}$ represents a single bond, —O—, —S— or —NRf-; Rf represents a hydrogen atom, an alkyl group, an alkenyl group, an alkynyl group, a heterocyclic group or an aryl group, and may be taken together with $Rg^{45}$ to form a ring; and $R^{73}$ and $R^{74}$ each independently represent a hydrogen atom, a halogen atom, a hydroxyl group, a carbamoyl group, a sulfamoyl group, an alkyl group having from 1 to 8 carbon atoms, an alkoxy group having from 1 to 8 carbon atoms, an alkylamino group having from 1 to 8 carbon atoms, a dialkylamino group having from 1 to 8 carbon atoms.

Specific examples of the compounds of the formula (E-1) or (F-1) are mentioned below, to which, however, the invention should not be limited.

E-101

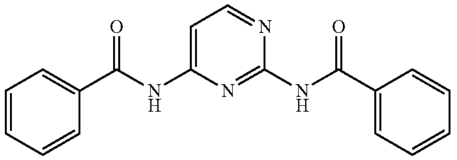

E-102

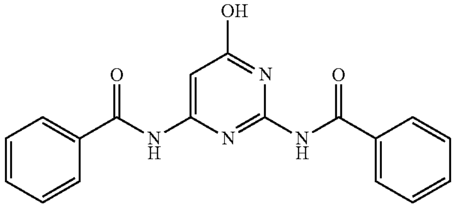

E-103

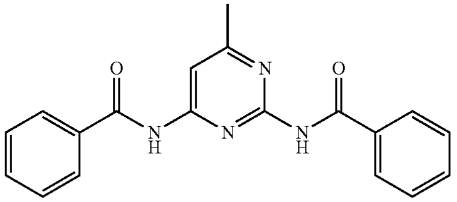

E-104

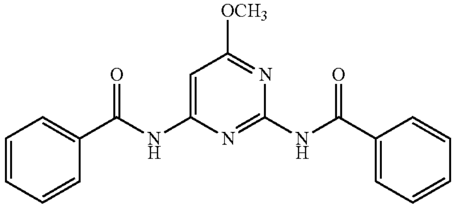

E-105

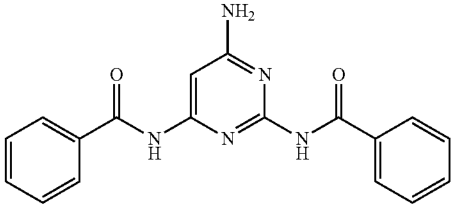

E-106

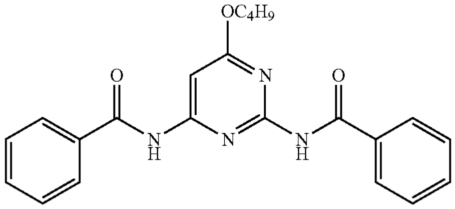

-continued
E-107
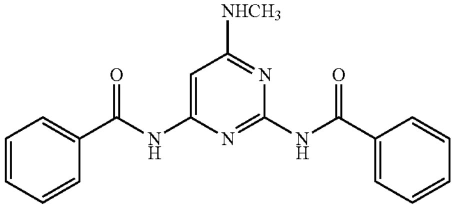
E-108
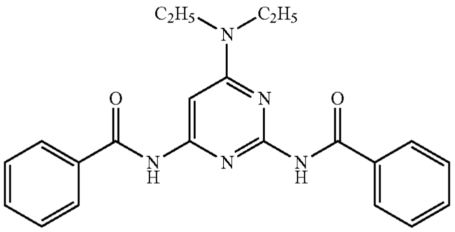
E-109
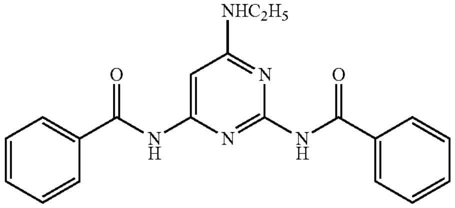
E-110
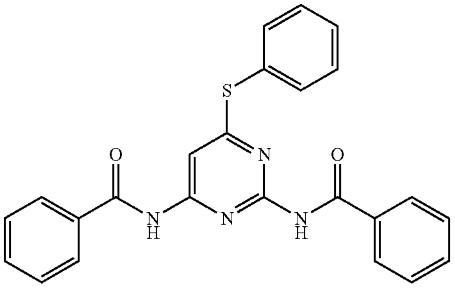
E-111
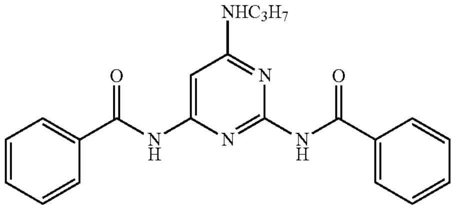
E-112
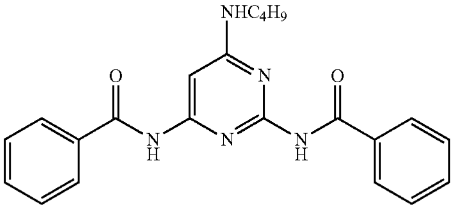
E-113
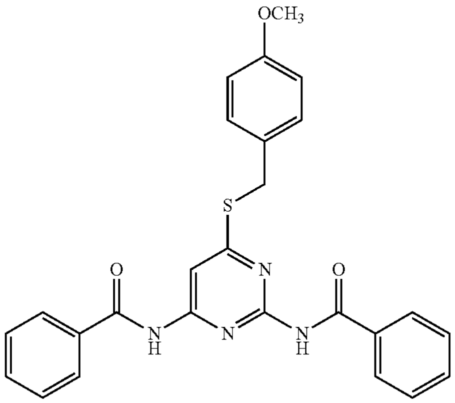
E-201
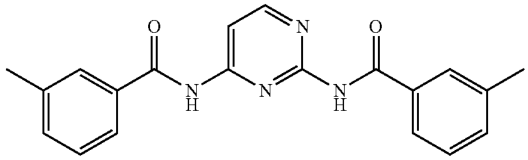
E-202
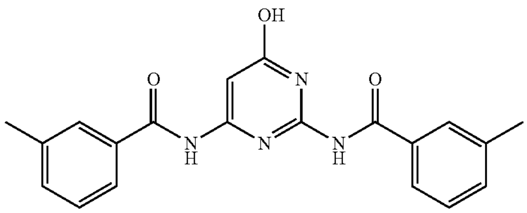
E-203
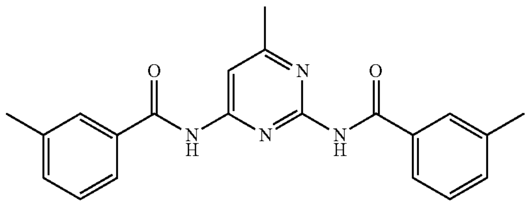
E-204
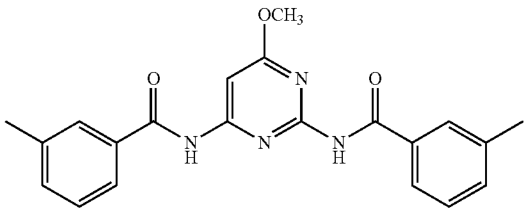
E-205
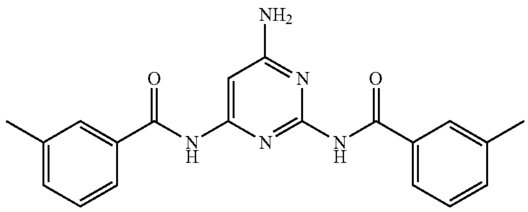

-continued
E-206
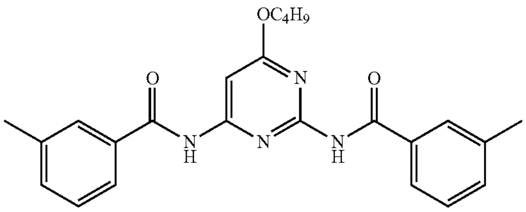
E-207
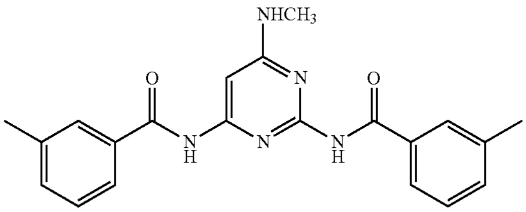
E-208
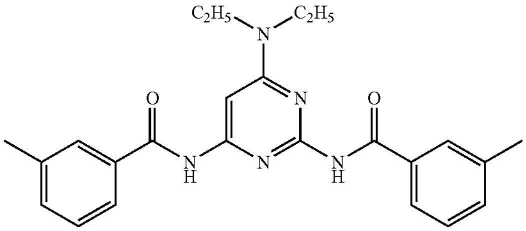
E-209
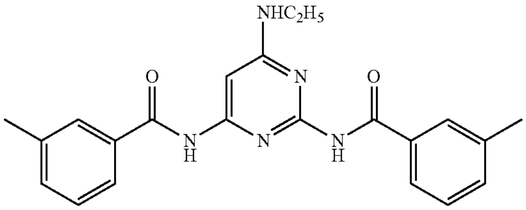
E-210
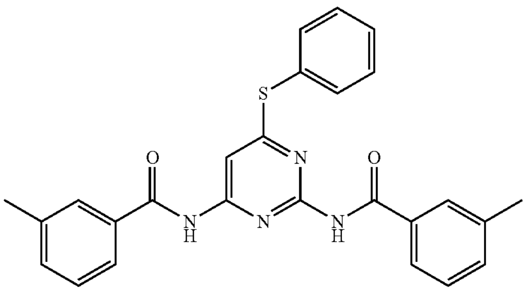
E-211
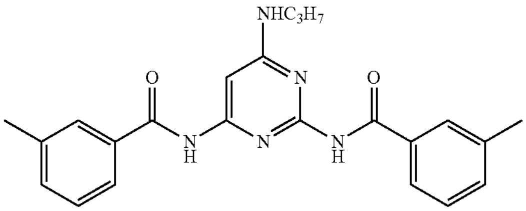
E-212
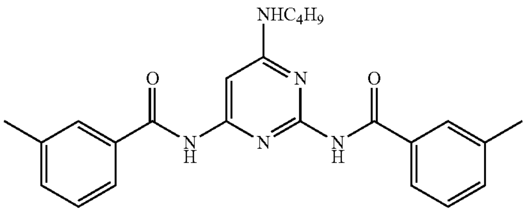
E-213
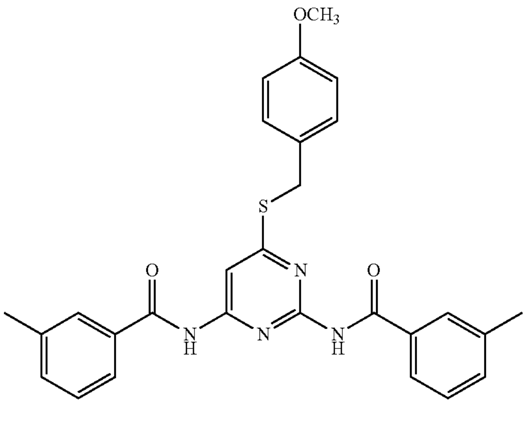
E-301
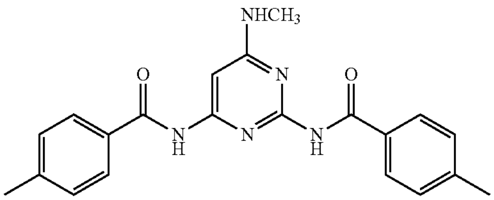
E-302
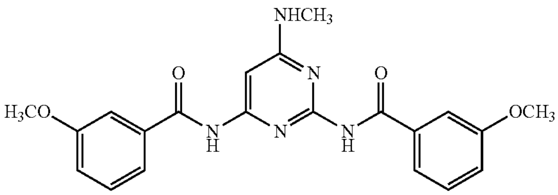

-continued
E-303
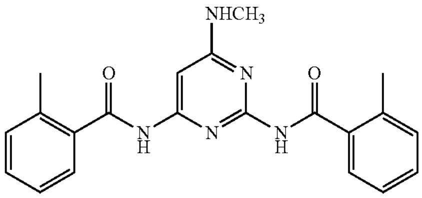
E-304
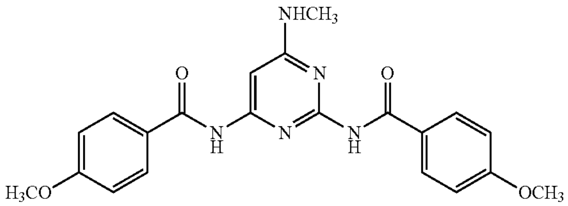
E-305
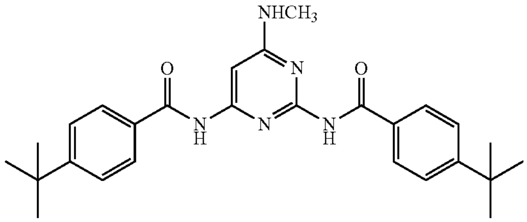
E-306
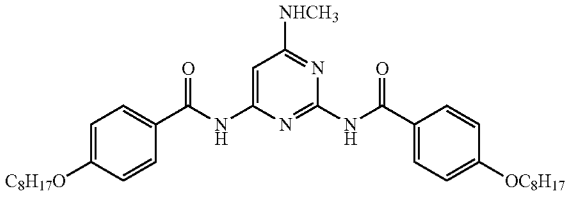
E-307
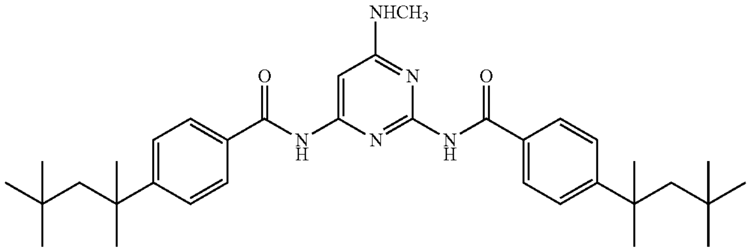
E-308
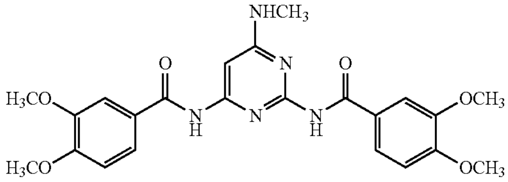
E-309
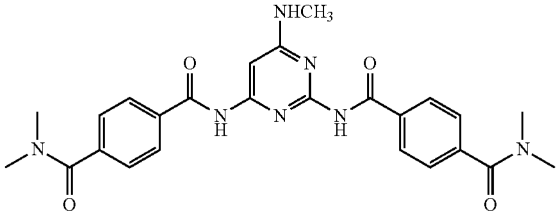
E-310
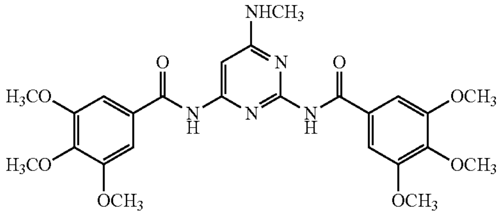
E-311
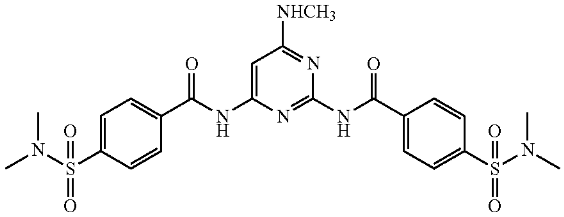
E-401
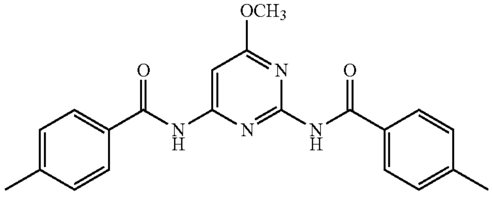
E-402
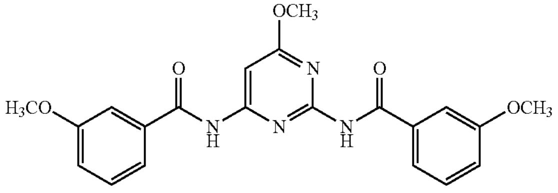

-continued
E-403
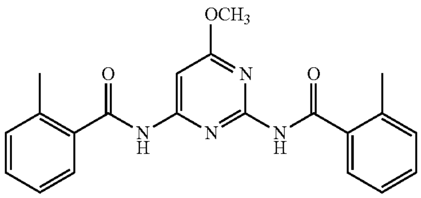
E-404
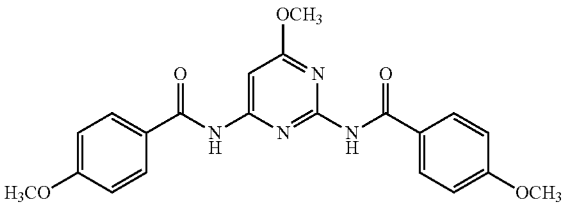
E-405
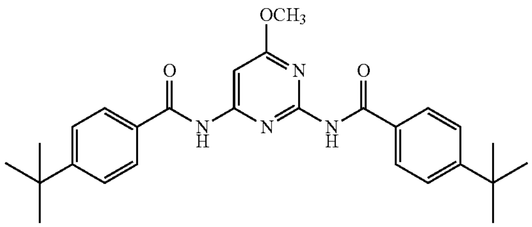
E-406
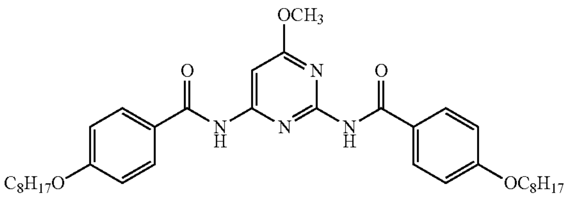
E-407
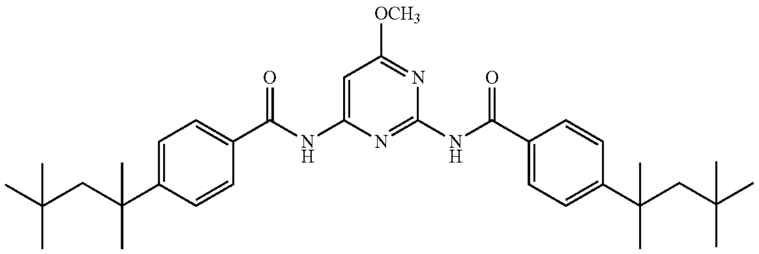
E-408
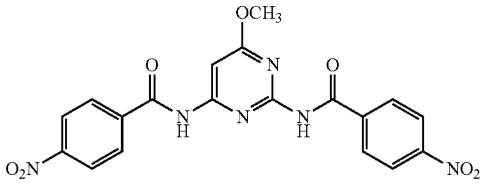
E-409
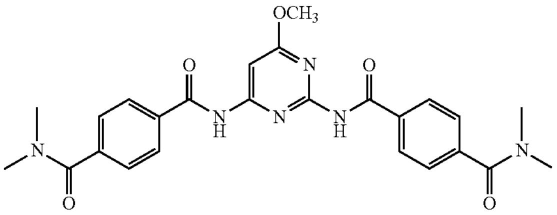
E-410
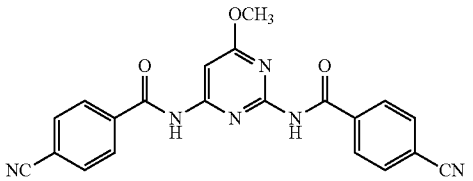
E-411
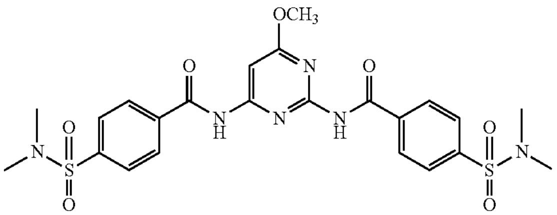
E-412
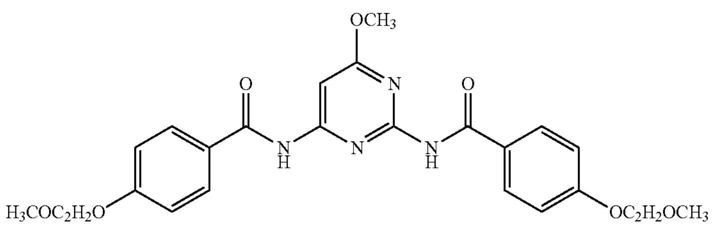

-continued
E-501
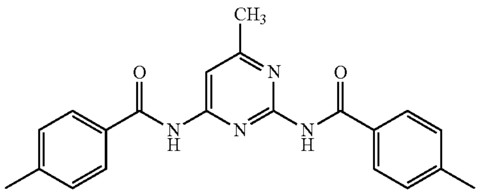
E-502
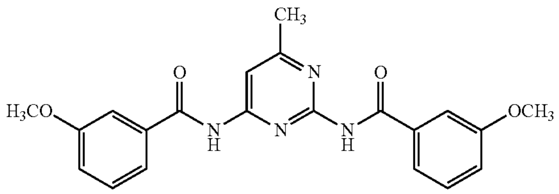
E-503
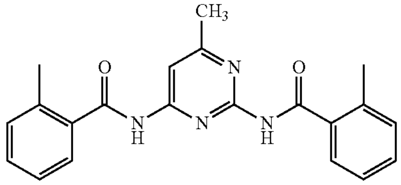
E-504
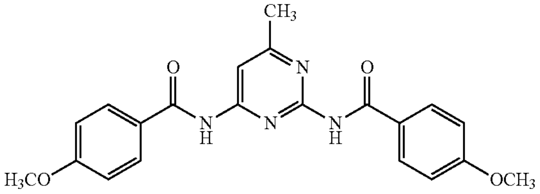
E-505
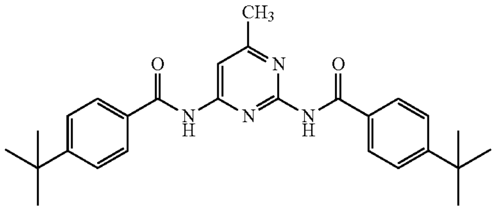
E-506
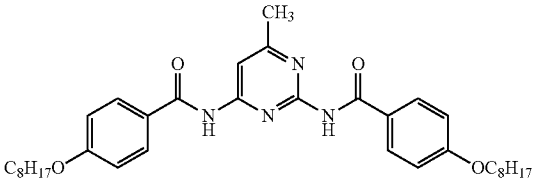
E-507
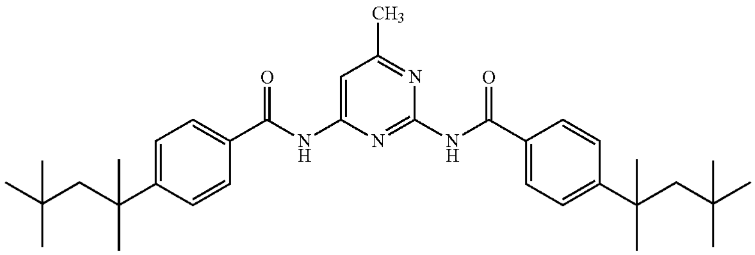
E-508
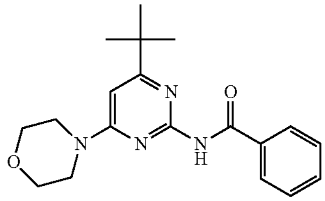
E-509
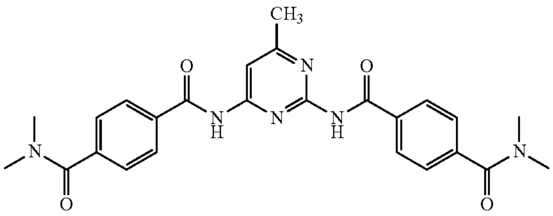
E-510
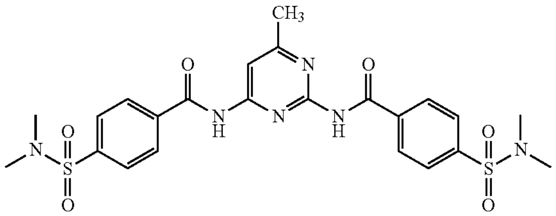
E-601
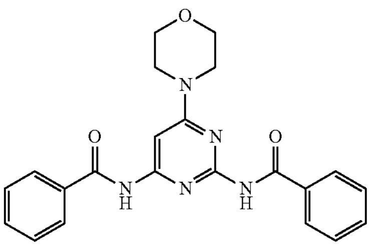

-continued
E-602
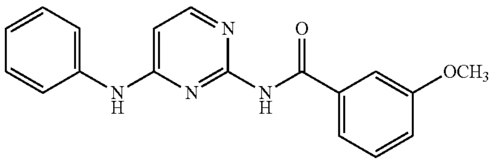
E-603
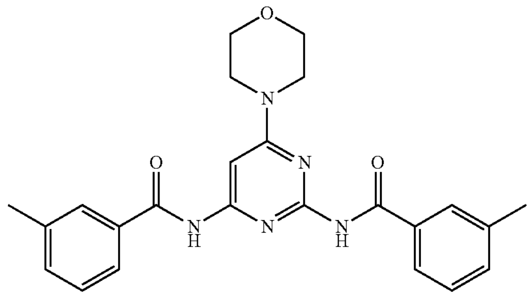
E-604
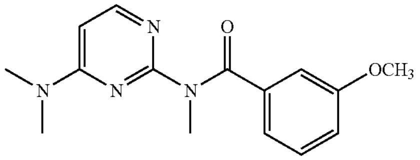
E-605
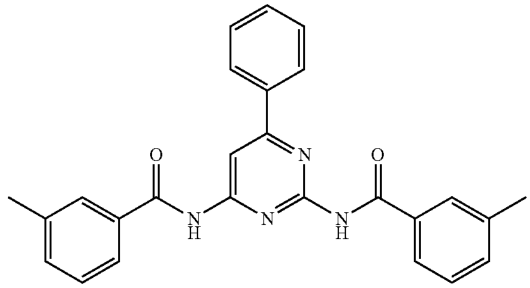
E-606
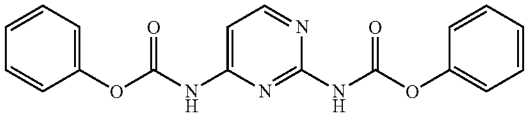
E-607
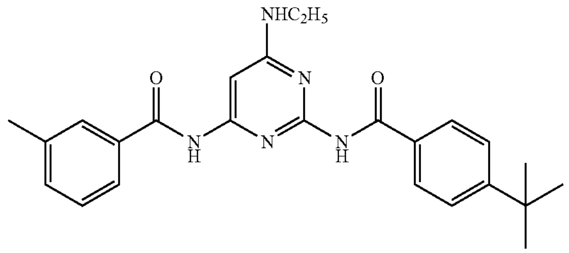
E-608
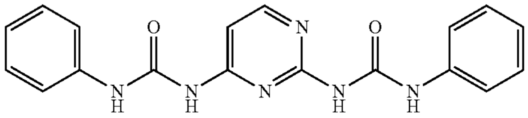
E-609
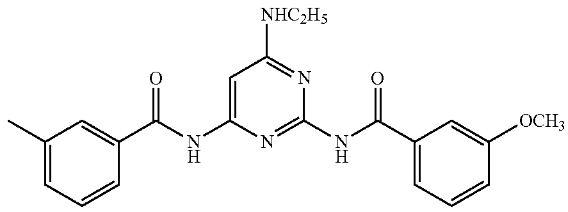
E-610
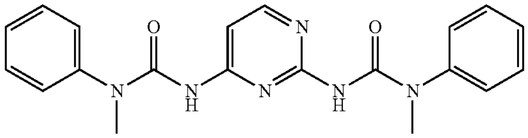
E-611
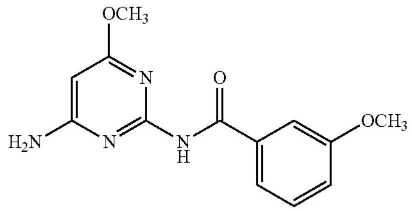
E-612
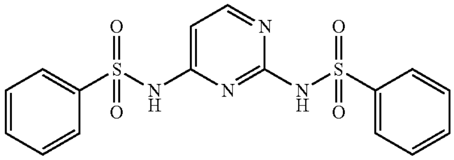
E-701
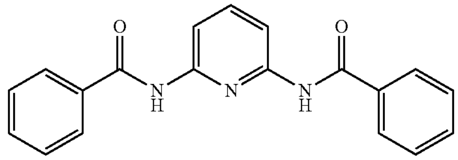

-continued
E-701
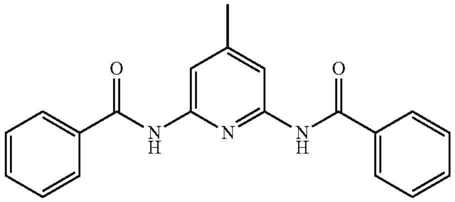
E-702
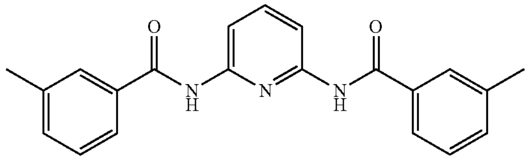
E-703
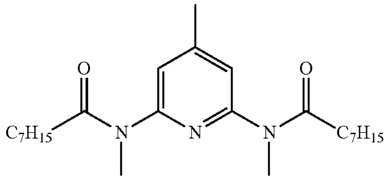
E-704
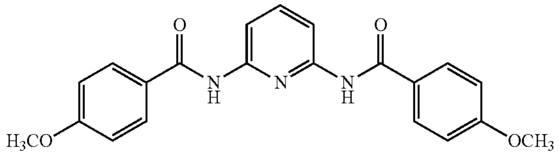
E-705
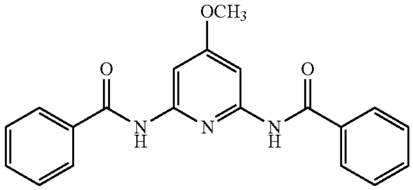
E-706
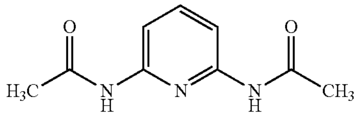
E-707
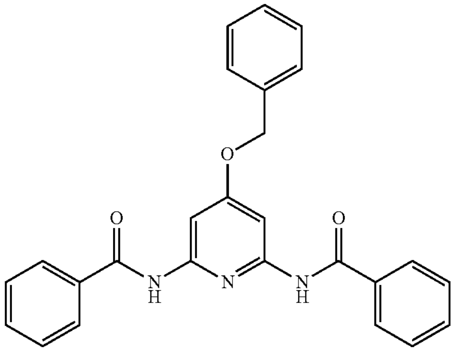
E-708
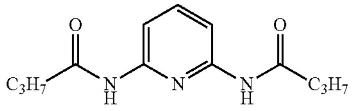
E-709
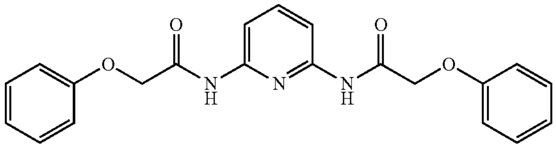
(F-101)
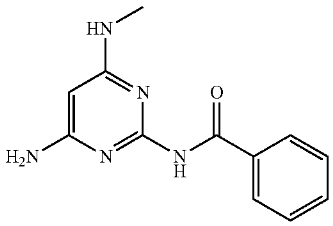
(F-102)
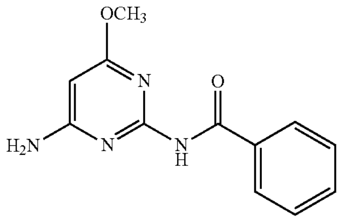
(F-103)
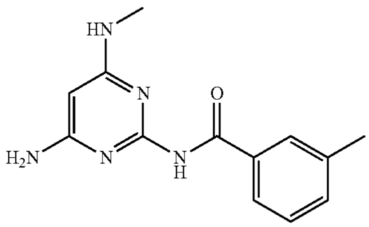
(F-104)
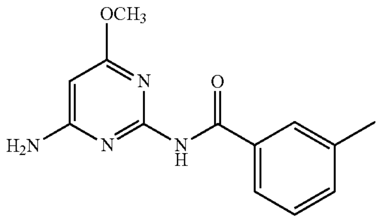

-continued
(F-105)
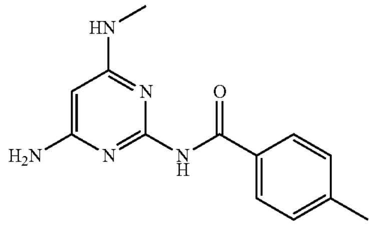
(F-106)
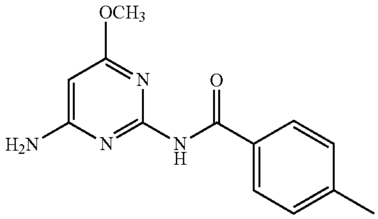
(F-107)
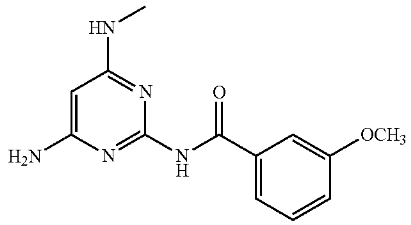
(F-108)
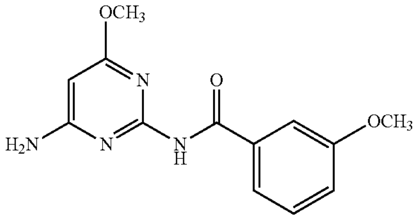
(F-109)
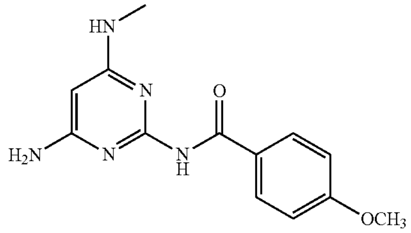
(F-110)
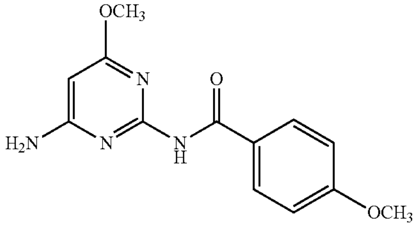
(F-111)
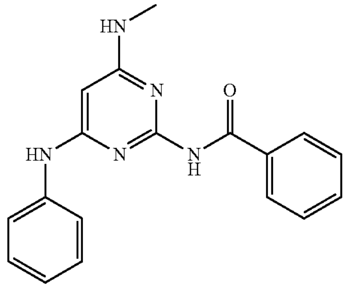
(F-112)
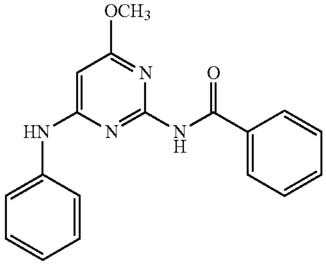
(F-113)
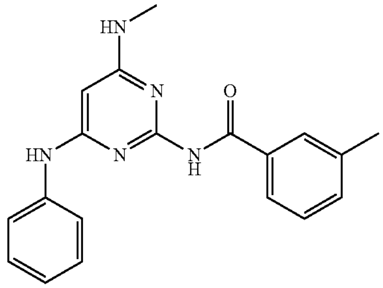
(F-114)
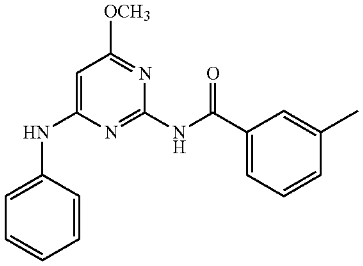
(F-115)
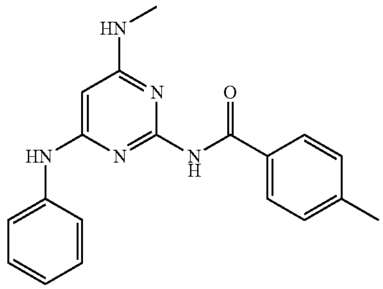
(F-116)
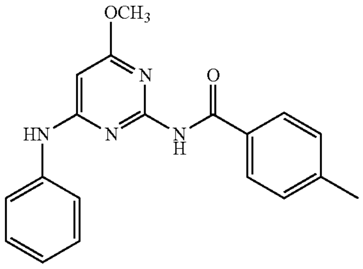

-continued (F-117)

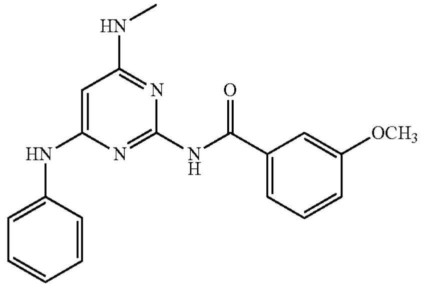

(F-118)

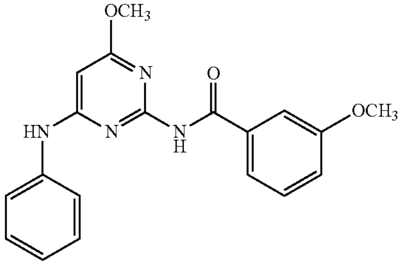

(F-119)

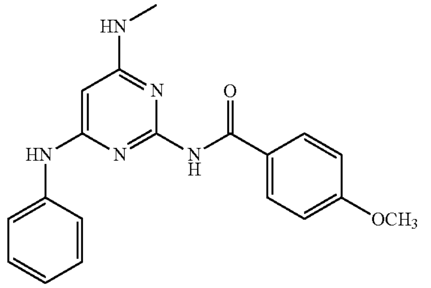

(F-120)

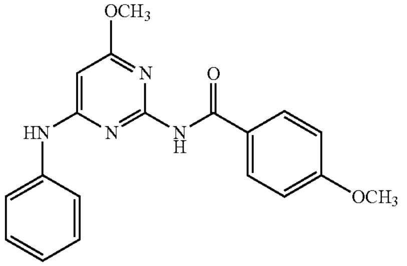

The compound of the formula (E-1) can be synthesized by for example the method of the scheme 1 below. That is, the compound of the formula (E-1) can be synthesized by the reaction of a compound of the formula (E-1a) with a compound of the formula (E-1b) in the presence of a base in an organic solvent. Commercially available products and materials synthesized by known synthetic methods can be used as the compound of the formula (E-1a) and the compound of the formula (E-1b). Examples of the organic solvent used in the reaction include an alcohol (for example methanol and ethanol), an ester (for example ethyl acetate), a hydrocarbon (for example toluene), an ether (for example tetrahydrofuran), an amide (for example dimethylformamide, demethylacetoamide, N-methylpyrrolidone, N-ethylpyrrolidone), a halogenated hydrocarbon (for example dichloromethane), a nitrile (for example acetonitrile), and a mixed solvent thereof. Preferred are an alcohol and an amide and particularly preferred are methanol, ethanol, N-methylpyrrolidone and N-ethylpyrrolidone. A mixed solution of methanol, ethanol, N-methylpyrrolidone and N-ethylpyrrolidone is also particularly preferred.

As the base, any of an inorganic base (for example potassium carbonate) and an organic base (for example triethylamine, sodium methoxide and sodium ethoxide) can be used. An organic base is preferred and sodium ethoxide is particularly preferred. The base is preferably used in an amount of from 0.5 to 10 equivalents, particularly preferably from 1 to 3 equivalents relative to the content of the compound of the formula (E-1b).

The reaction temperature is generally from −20° C. to the boiling point of the solvent used in the reaction, preferably from a room temperature to the boiling point of the solvent. The reaction time is generally from 10 minutes to 3 days, preferably from 1 hour to 1 day. The reaction can be conducted in a nitrogen atmosphere or under a reduced pressure. Particularly, in the case where the leaving group Z is an alkoxy group or an aryl group, the reaction under a reduced pressure is also preferable.

Scheme 1

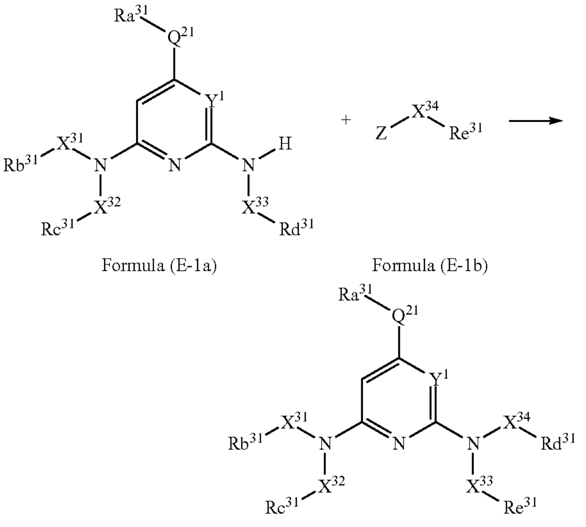

wherein Z represents a leaving group, preferably a halogen atom, an alkoxy group or an aryloxy group.

The compound of the formula (E-2) used in the invention can be synthesized by the method of the scheme 2 below. That is, the compound of the formula (E-2) can be synthesized by the reaction of a compound of the formula (E-2a), a compound of the formula (E-2b) and a compound of the formula (E-2c) in the presence of a base in an organic solvent. Commercially available products and materials synthesized by known synthetic methods can be used as the compound of the formula (E-2a) the compound of the formula (E-2b) and a compound of the formula (E-2c). Preferable examples of the organic solvent used in the reaction are the same as above. Preferable examples of the base used in the reaction are the same as above. The base is preferably used in an amount of from 0.5 to 10 equivalents, particularly preferably from 1 to 3 equivalents relative to the total content of the compound of the formula (E-2b) and the compound of the formula (E-2c). Preferable reaction temperature and preferable reaction time are the same as above.

Scheme 2

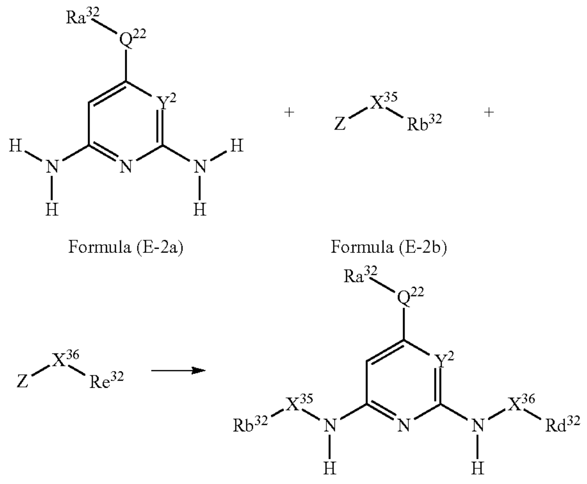

Formula (E-2a) Formula (E-2b)

Formula (E-2o) Formula (E-2)

(G) Compound of Formula (G-1)

Next described is the compound of the formula (G-1).

(G-1)

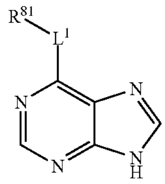

wherein $L^1$ represents a single bond or a divalent linking group having a hetero atom, preferably a divalent linking group having a hetero atom. The divalent linking group having a hetero atom represented by $L^1$ is preferably a linking group in which a single atom has the two bond for linkage of the group. Examples of such linking group include —O—, —N($R^{82}$)—, —C(═O)—, —S—, —S(═O)$_2$ and a combination thereof. The definition of $R^{82}$ is the same as $R^3$ described above. $R^{82}$ is preferably a hydrogen atom, an alkyl group having from 1 to 15 carbon atoms (more preferably from 1 to 10 carbon atoms, particularly preferably from 1 to 5 carbon atoms, more particularly preferably a methyl group).

Among them, a linking group consisting of —O—, —NH—, —N($CH_3$)—, —C(═O)— and a combination thereof are preferable, and —O—, —NH—C(═O)— and —N($CH_3$)— are more preferable.

$R^{81}$ in the formula (C-1) represents a hydrogen atom, an alkyl group having from 1 to 20 carbon atoms, an alkenyl group having from 2 to 20 carbon atoms, an alkynyl group having from 2 to 20 carbon atoms, a heteroaryl group having from 5 to 20 carbon atoms or an aryl group having from 6 to 20 carbon atoms.

When $R^{81}$ is an alkyl group, preferably, it has from 1 to 15 carbon atoms, more preferably from 1 to 10 carbon atoms, even more preferably from 1 to 5 carbon atoms.

When $R^{81}$ is an alkenyl group, preferably, it has from 2 to 15 carbon atoms, more preferably from 2 to 10 carbon atoms, even more preferably from 2 to 5 carbon atoms.

When $R^{81}$ is an alkynyl group, preferably, it has from 2 to 15 carbon atoms, more preferably from 2 to 10 carbon atoms, even more preferably from 2 to 5 carbon atoms.

When $R^{81}$ is an alkyl group, an alkenyl group or an alkynyl group, it may be cyclic, linear or branched, preferably linear or branched, more preferably linear.

When $R^{81}$ is a heteroaryl group, preferably, it has from to 18 carbon atoms, more preferably from 5 to 12 carbon atoms.

When $R^{81}$ is an aryl group, preferably, it has from 6 to 18 carbon atoms, more preferably from 6 to 12 carbon atoms.

When $R^{81}$ is an arylalkyl group, preferably, it has from 7 to 18 carbon atoms, more preferably from 7 to 12 carbon atoms.

$R^{81}$ may have a substituent or may be unsubstituted. Substituents are not particularly limited so long as the gist of the invention is not deteriorated. Preferable substituents are a halogen atom, an alkyl group having from 1 to 20 carbon atoms, an alkenyl group having from 1 to 20 carbon atoms, an alkynyl group having from 2 to 20 carbon atoms, a heteroaryl group having from 5 to 20 carbon atoms, and an aryl group having from 6 or 20 carbon atoms. More preferable substituent is an aryl group having from 6 or 20 carbon atoms. Particularly in the case where $R^{81}$ is a substituted alkyl group, the substituent is preferably a phenyl group.

Preferable combinations of $L^1$ and $R^{81}$ are as follows.

In the case where $L^1$ is —O—, $R^{81}$ is an alkyl group having from 1 to 15 carbon atoms or an arylalkyl group, more preferably an arylalkyl group.

In the case where $L^1$ is —NH—, $R^{81}$ is an alkyl group having from 1 to 15 carbon atoms or an arylalkyl group, more preferably an arylalkyl group.

In the case where $L^1$ is —NH—C(═O)—, $R^{81}$ is an alkyl group having from 1 to 15 carbon atoms or an aryl group, more preferably an alkyl group.

In the case where $L^1$ is —N($CH_3$)—, $R^{81}$ is an alkyl group having from 1 to 15 carbon atoms or an alkyl group, more preferably an alkyl group.

From the viewpoint of retard the fluctuation of retardation in humidity change in the environment, $R^{81}$ is preferably a hydrogen atom or an alkyl group having from 1 to 20 carbon atoms.

Among the compounds of the formula (G-1), the compound of capable of forming a hydrogen bond is preferably a compound in which the number of amino group in purine base skeleton (substituents are uncounted) is preferably 0 or 1.

The compound of capable of forming a hydrogen bond is preferably a compound of the formula (G-1) in which $R^{81}$ is not a hydrogen atom. That is, the compound of capable of forming a hydrogen bond having the nucleic acid base skeleton is preferably represented by the following formula (G-2).

(G-2)

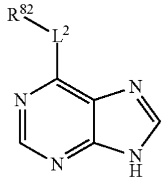

wherein $L^2$ represents a single bond or a divalent linking group having a hetero atom; and $R^{82}$ represents a hydrogen atom, an alkyl group having from 1 to 20 carbon atoms, an alkenyl group having from 2 to 20 carbon atoms, an alkynyl group having from 2 to 20 carbon atoms, an aryl group having from 6 to 20 carbon atoms or an arylalkyl group having from 7 to 20 carbon atoms.

The preferable range of $L^2$ in the formula (G-2) is the same as that of $L^1$ in the formula (G-1).

$R^{82}$ represents a hydrogen atom, an alkyl group having from 1 to 20 carbon atoms, an alkenyl group having from 2 to 20 carbon atoms, an alkynyl group having from 2 to 20 carbon atoms, an aryl group having from 6 to 20 carbon atoms or an arylalkyl group having from 7 to 20 carbon atoms. The preferable number of the carbon atom in each group is the same as that in $R^{81}$.

$R^{82}$ is more preferably a methyl group, a phenyl group or a benzyl group.

Preferable combinations of $L^2$ and $R^{82}$ are the same as those of $L^1$ and $R^{81}$ in the formula (G-1).

The compound capable of forming a hydrogen bond preferably control the interaction between the compound having a nucleic acid base skeleton and cellulose acylate to prevent generation of haze in the cellulose acylate film and prevent breeding out and evaporation from the film.

Preferable structural moieties of the compound having a nucleic acid base skeleton which can interact with cellulose acylate through a hydrogen bond or others are a purine base skeleton, an ether bond structure, an ester bond structure, an amido bond structure, —NH— linking group structure, etc.

Specific examples of the compounds of the formula (G-1) having a nucleic acid base skeleton are mentioned below, to which, however, the compounds of the formula (G-1) having a nucleic acid base skeleton which can be used as the compound capable of forming a hydrogen bond should not be limited.

(G-101)

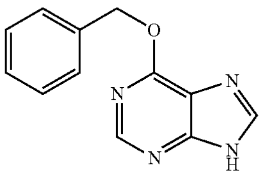

(G-102)

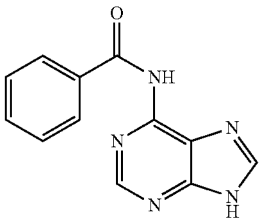

(G-103)

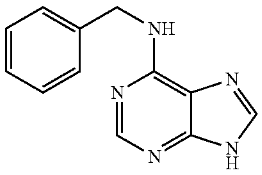

(G-104)

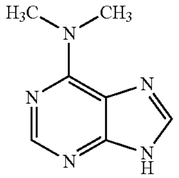

-continued (G-106)

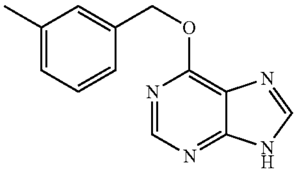

(G-107)

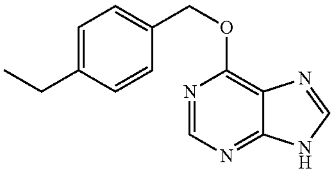

(G-108)

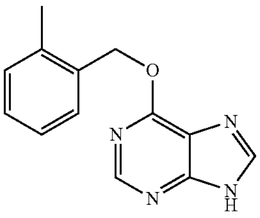

(G-109)

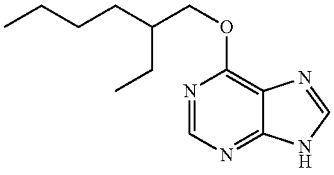

(G-110)

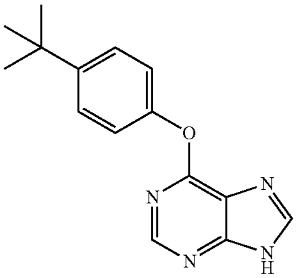

(G-111)

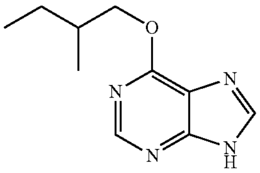

(G-112)

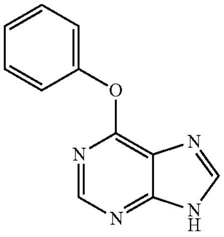

-continued (G-113)

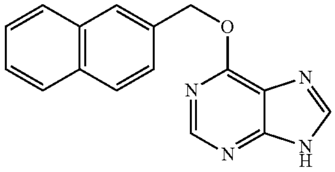

(G-114)

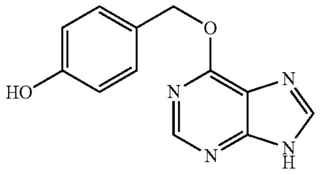

(G-115)

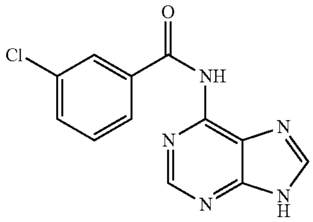

(G-116)

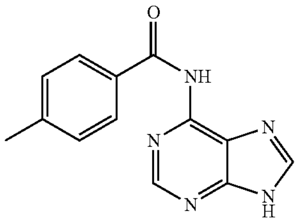

(G-117)

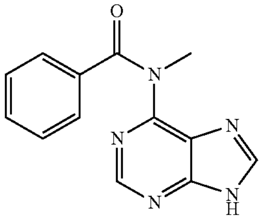

(G-118)

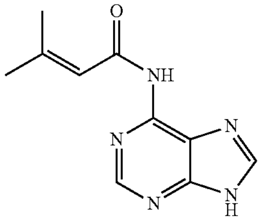

(G-119)

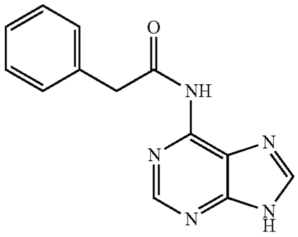

-continued (G-120)

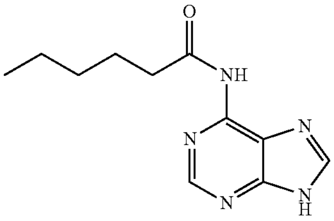

(G-121)

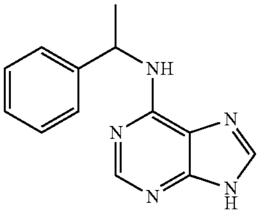

(G-122)

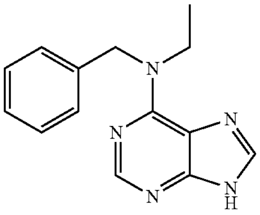

(G-123)

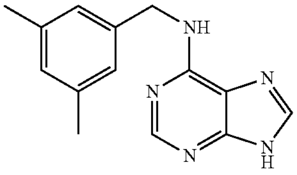

(G-124)

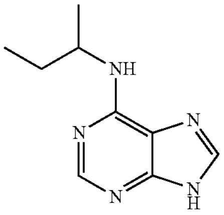

(H) Compound of Formula (H-1)

Next described is the compound of the formula (H-1).

(H-1)

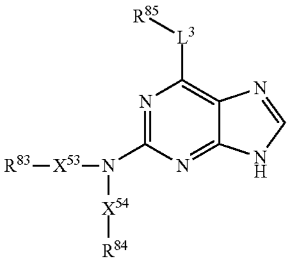

wherein $L^3$ represents a single bond or a divalent linking group having a hetero atom; and $R^{85}$ represents an alkyl group having from 1 to 20 carbon atoms, an alkenyl group having from 2 to 20 carbon atoms, an alkynyl group having from 2 to 20 carbon atoms, an aryl group having from 6 to 20 carbon atoms or an arylalkyl group having from 7 to 20 carbon atoms;

$R^{83}$ and $R^{84}$ each independently represent a hydrogen atom, an alkyl group, an alkenyl group, an alkynyl group, a heterocyclic group or an aryl group; and $X^{53}$ and $X^{54}$ each independently represent any one selected from the group of divalent linking groups of the following formula (P) described above wherein the side * is the linking site to the N atom that bonds to the heterocyclic ring in the compound of the formula (H-1).

Preferable examples of the compounds of the formula (H-1) are mentioned below.

(H-101)

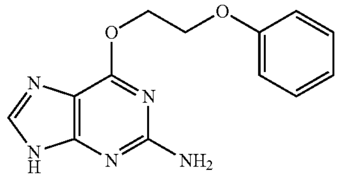

(H-102)

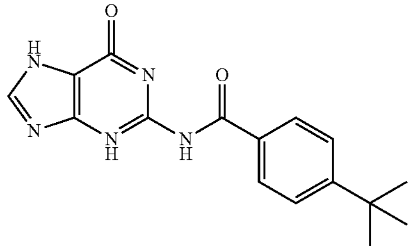

(H-103)

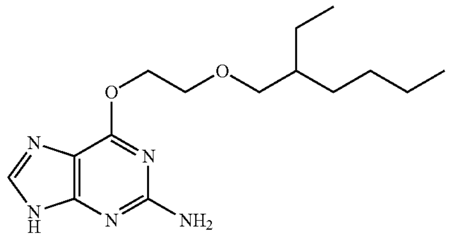

(H-104)

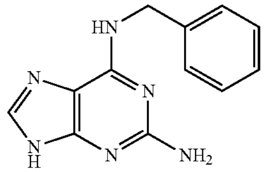

(H-105)

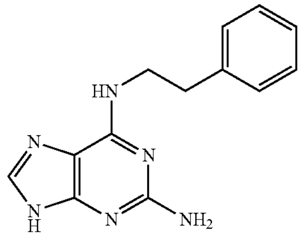

(H-106)

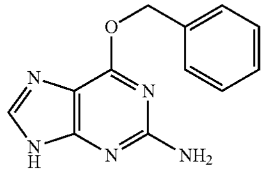

-continued (H-107)

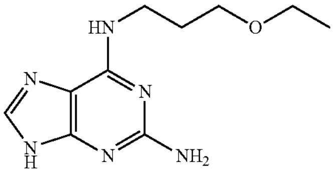

(H-108)

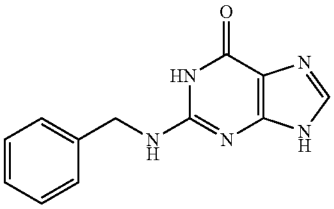

(H-109)

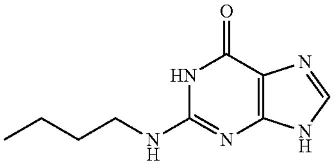

(H-110)

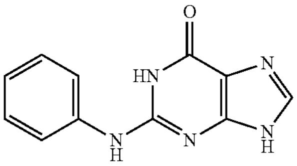

(H-111)

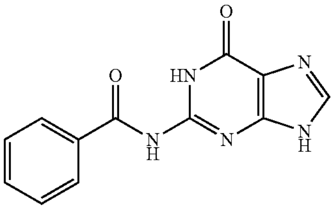

(H-112)

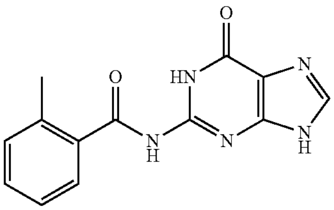

(H-113)

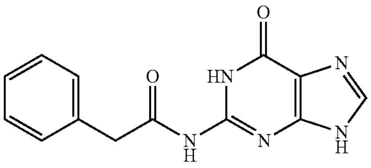

(Physical Properties)

Preferably, the compounds of the formulae (A-1) to (H-1) have a molecular weight of from 100 to 1000, more preferably from 150 to 700, most preferably from 150 to 450.

(Amount to be Added)

The amount of the compounds of the formulae (A-1) to (H-1) to be added to the film of the invention is preferably at most 30 parts by mass relative to 100 parts by mass of the cellulose acylate resin therein, more preferably from 1 to 30 parts by mass, even more preferably from 2 to 20 parts by mass, still more preferably from 3 to 15 parts by mass.

Also preferably, the total content of the compound capable of forming a hydrogen bond in the film of the invention is at most 35 parts by mass relative to 100 parts by mass of the cellulose acylate resin therein, more preferably at most 30 parts by mass, even more preferably at most 20 parts by mass. The compound capable of forming a hydrogen bond is not limited to the compounds of the formulae (A-1) to (H-1).

(1-3) Other Additives:

The cellulose acylate film of the invention may contain any other additive than the compounds of the formulae (A-1) to (H-1) for various purposes. When the cellulose acylate film is produced according to a solvent-casting method, the additive may be added to a cellulose acylate dope. The timing of addition is not specifically defined. The additive is selected from those miscible with cellulose acylate, and soluble in a cellulose acylate dope in a solvent-casting method. The additive is added for the purpose of regulating the optical properties of the cellulose acylate film and for regulating other properties thereof.

(Plasticizer)

The cellulose acylate film of the invention preferably contains a plasticizer for enhancing the film formability thereof. As the plasticizer, preferred are saccharide-type plasticizers selected from a group of compounds of saccharides and their derivatives, or oligomer-type plasticizers selected from oligomers of polycondensate esters of dicarboxylic acids and dials and their derivatives, as enhancing the environmental humidity resistance of the cellulose acylate film. Concretely, the plasticizer of the type can reduce humidity-dependent Rth fluctuation of film. When both such a saccharide-type plasticizer and an oligomer-type plasticizer are used simultaneously, the effect thereof for reducing the humidity-dependent Rth fluctuation of film could be high.

(Saccharide-Type Plasticizer)

As described in the above, the cellulose acylate film of the invention preferably contains at least one compound selected from a group consisting of saccharides and their derivatives. Above all, compounds selected from a group of monomeric to 10-meric saccharides and their derivatives are especially preferred for the plasticizer. Their examples include saccharide derivatives in which a part or all of the hydrogen atoms of OH's in saccharides such as glucose or the like are substituted with acyl groups, as described in WO2007/125764, [0042]-[0065]. The amount of the saccharide-type plasticizer to be added is preferably from 0.1% by mass to less than 20% by mass relative to the main ingredient, cellulose acylate, more preferably from 0.1% by mass to less than 10% by mass, even more preferably from 0.1% by mass to less than 7% by mass.

(Oligomer-Type Plasticizer)

As describe in the above, the cellulose acylate film of the invention preferably contains an oligomer-type plasticizer selected from oligomers. Preferred examples of the oligomer-type plasticizer include polycondensates of a diol component and a dicarboxylic acid component and their derivatives (hereinafter this may be referred to as "polycondensate ester-type plasticizer"), as well as oligomers of methyl acrylate (MA) and their derivatives (hereinafter this may be referred to as "MA oligomer-type plasticizer").

The polycondensate ester is an polycondensate ester of a dicarboxylic acid component and a diol component. The dicarboxylic acid component may be only one type of a dicarboxylic acid or may be a mixture of two or more different types of dicarboxylic acids. Above all, as the dicarboxylic acid component, preferred is a dicarboxylic acid component containing at least one aromatic dicarboxylic acid and at least one aliphatic dicarboxylic acid. On the other hand, the diol component may be only one type of a diol component or may be a mixture of two or more different types of diols. Above all, the diol component is preferably ethylene glycol and/or an aliphatic diol having a mean carbon number of from more than 2.0 to 3.0.

Regarding the ratio of the aromatic dicarboxylic acid to the aliphatic dicarboxylic acid in the dicarboxylic acid component, the proportion of the aromatic dicarboxylic acid therein is preferably from 5 to 70 mol %. Within the range, the plasticizer is effective for reducing the environmental humidity dependence of the optical properties of film and the plasticizer could be prevented from bleeding out during film formation. The proportion of the aromatic dicarboxylic acid in the dicarboxylic acid component is more preferably from 10 to 60 mol %, even more preferably from 20 to 50 mol %.

Examples of the aromatic dicarboxylic acid include phthalic acid, terephthalic acid, isophthalic acid, 1,5-naphthalenedicarboxylic acid, 1,4-naphthalenedicarboxylic acid, 1,8-naphthalenedicarboxylic acid, 2,8-naphthalenedicarboxylic acid, 2,6-naphthalenedicarboxylic acid, etc.; and preferred are phthalic acid and terephthalic acid. Examples of the aliphatic dicarboxylic acid include oxalic acid, malonic acid, succinic acid, maleic acid, fumaric acid, glutaric acid, adipic acid, pimelic acid, suberic acid, azelaic acid, sebacic acid, dodecanedicarboxylic acid, 1,4-cyclohexanedicarboxylic acid, etc.; and above all, preferred are succinic acid and adipic acid.

The diol component is preferably ethylene glycol and/or a diol having a mean carbon number of from more than 2.0 to 3.0. In the diol component, the proportion of ethylene glycol is preferably at least 50 mol %, more preferably at least 75 mol %. The aliphatic diol may be an alkyl diol or an alicyclic diol, including, for example, ethylene glycol, 1,2-propanediol, 1,3-propanediol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylolheptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, diethylene glycol, etc; and preferably, these are used as a mixture of one or more of them with ethylene glycol.

For the diol component, preferred are ethylene glycol, 1,2-propanediol and 1,3-propanediol; and more preferred are ethylene glycol and 1,2-propanediol.

The polycondensate ester-type plasticizer is preferably a derivative of a polycondensate ester in which the terminal OH forms an ester with a monocarboxylic acid. The monocarboxylic acid for terminating the terminal OH groups of the ester is preferably an aliphatic monocarboxylic acid, more preferably acetic acid, propionic acid, butanoic acid, benzoic acid or their derivative, even more preferably acetic acid or propionic acid, most preferably acetic acid. When the carbon number of the monocarboxylic acid for use to terminate the polycondensate ester is at most 3, then the loss on heat of the compound is not large and the surface defect of the film may be reduced. Two or more different types of monocarboxylic acids may be used as a mixture for the termination. Preferably, the terminals of the polycondensate ester are terminated with acetic acid or propionic acid; and more preferably, the terminals of the polycondensate ester derivative are both acetyl ester residues formed through termination with acetic acid.

Preferably, the polycondensate ester and its derivative are oligomers having a number-average molecular weight of from 700 to 2000 or so, more preferably from 800 to 1500 or so, even more preferably from 900 to 1200 or so. The number-average molecular weight of the polycondensate ester may be measured and evaluated through gel permeation chromatography.

Table 5 below shows specific examples of polycondensate ester-type plasticizers, to which, however, the invention should not be limited.

TABLE 5

| | Dicarboxylic Acid*1) | | | Diol | | | | |
|---|---|---|---|---|---|---|---|---|
| | Aromatic Dicarboxylic Acid | Aliphatic Dicarboxylic Acid | Dicarboxylic Acid Ratio (mol %) | Aliphatic Diol | Diol Ratio (mol %) | Mean Carbon Number of Aliphatic Diol | Both Terminals | Number-Average Molecular Weight |
| P-1 | PA | AA | 10/90 | ethylene glycol | 100 | 2.0 | acetyl ester residue | 1000 |
| P-2 | PA | AA | 25/75 | ethylene glycol | 100 | 2.0 | acetyl ester residue | 1000 |
| P-3 | PA | AA | 50/50 | ethylene glycol | 100 | 2.0 | acetyl ester residue | 1000 |
| P-4 | PA | SA | 5/95 | ethylene glycol | 100 | 2.0 | acetyl ester residue | 1000 |
| P-5 | PA | SA | 20/80 | ethylene glycol | 100 | 2.0 | acetyl ester residue | 1000 |
| P-6 | TPA | AA | 15/85 | ethylene glycol | 100 | 2.0 | acetyl ester residue | 1000 |
| P-7 | TPA | AA | 50/50 | ethylene glycol | 100 | 2.0 | acetyl ester residue | 1000 |
| P-8 | TPA | SA | 5/95 | ethylene glycol | 100 | 2.0 | acetyl ester residue | 1000 |
| P-9 | TPA | SA | 10/90 | ethylene glycol | 100 | 2.0 | acetyl ester residue | 1000 |
| P-10 | TPA | SA | 15/85 | ethylene glycol | 100 | 2.0 | acetyl ester residue | 1000 |
| P-11 | TPA | SA | 50/50 | ethylene glycol | 100 | 2.0 | acetyl ester residue | 1000 |
| P-12 | TPA | SA | 70/30 | ethylene glycol | 100 | 2.0 | acetyl ester residue | 1000 |
| P-13 | TPA/PA | AA | 10/10/80 | ethylene glycol | 100 | 2.0 | acetyl ester residue | 1000 |
| P-14 | TPA/PA | AA | 20/20/60 | ethylene glycol | 100 | 2.0 | acetyl ester residue | 1000 |
| P-15 | TPA/PA | AA/SA | 10/10/40/40 | ethylene glycol | 100 | 2.0 | acetyl ester residue | 1000 |
| P-16 | TPA | AA/SA | 10/30/60 | ethylene glycol | 100 | 2.0 | acetyl ester residue | 1000 |
| P-17 | TPA | AA/SA | 10/30/60 | ethylene glycol/ 1,2-propanediol | 50/50 | 2.5 | acetyl ester residue | 1000 |
| P-18 | TPA | AA/SA | 10/30/60 | 1,2-propanediol | 100 | 3.0 | acetyl ester residue | 1000 |
| P-19 | TPA | AA/SA | 10/30/60 | ethylene glycol | 100 | 2.0 | acetyl ester residue | 700 |
| P-20 | TPA | AA/SA | 10/30/60 | ethylene glycol | 100 | 2.0 | acetyl ester residue | 850 |
| P-21 | TPA | AA/SA | 10/30/60 | ethylene glycol | 100 | 2.0 | acetyl ester residue | 1200 |
| P-22 | TPA | AA/SA | 10/30/60 | ethylene glycol | 100 | 2.0 | acetyl ester residue | 1600 |
| P-23 | TPA | AA/SA | 10/30/60 | ethylene glycol | 100 | 2.0 | acetyl ester residue | 2000 |
| P-24 | TPA | AA/SA | 10/30/60 | ethylene glycol | 100 | 2.0 | propionyl ester residue | 1000 |
| P-25 | TPA | AA/SA | 10/30/60 | ethylene glycol | 100 | 2.0 | butanoyl ester residue | 1000 |
| P-26 | TPA | AA/SA | 10/30/60 | ethylene glycol | 100 | 2.0 | benzoyl ester residue | 1000 |
| P-27 | IPA | AA/SA | 20/40/40 | ethylene glycol | 100 | 2.0 | acetyl ester residue | 1000 |
| P-28 | 2.6-NPA | AA/SA | 20/40/40 | ethylene glycol | 100 | 2.0 | acetyl ester residue | 1200 |
| P-29 | 1.5-NPA | AA/SA | 20/40/40 | ethylene glycol | 100 | 2.0 | acetyl ester residue | 1200 |
| P-30 | 1.4-NPA | AA/SA | 20/40/40 | ethylene glycol | 100 | 2.0 | acetyl ester residue | 1200 |
| P-31 | 1.8-NPA | AA/SA | 20/40/40 | ethylene glycol | 100 | 2.0 | acetyl ester residue | 1200 |
| P-32 | 2.8-NPA | AA/SA | 20/40/40 | ethylene glycol | 100 | 2.0 | acetyl ester residue | 1200 |

*1)PA: phthalic acid, TPA: terephthalic acid, IPA: isophthalic acid, AA: adipic acid, SA: succinic acid, 2,6-NPA: 2,6-naphthalenedicarboxylic acid, 2,8-NPA: 2,8-naphthalenedicarboxylic acid, 1,5-NPA: 1,5-naphthalenedicarboxylic acid, 1,4-NPA: 1,4-naphthalenedicarboxylic acid, 1,8-NPA: 1,8-naphthalenedicarboxylic acid The polycondensate ester can be produced with ease according to any conventional method, for example, according to a polyesterification, interesterification or thermal-fusing condensation method of a dicarboxylic acid component and a diol component, or an interfacial condensation method of an acid chloride of a dicarboxylic acid component and a glycol. Polycondensate esters usable in the invention are described in detail in Koichi Murai, "Plasticizers and their Theory and Applications" (by Miyuki Shobo, 1st Ed., issued on Mar. 1, 1973). In addition, also usable herein are materials described JP-A 5-155809, 5-155810, 5-197073, 2006-259494, 7-330670, 2006-342227, 2007-003679.

The amount of the polycondensate ester-type plasticizer to be added is preferably from 0.1 to 25% by mass of the amount of the main ingredient, cellulose acylate, more preferably from 1 to 20% by mass, even more preferably from 3 to 15% by mass.

The content of the starting materials and the side products in the polycondensate ester-type plasticizer, concretely aliphatic diols, dicarboxylates, diol esters and others, that may be in the film is preferably less than 1%, more preferably less than 0.5%. The dicarboxylate includes dimethyl phthalate, di(hydroxyethyl)phthalate, dimethyl terephthalate, di(hydroxyethyl)terephthalate, di(hydroxyethyl)adipate, di(hydroxyethyl)succinate, etc. The diol ester includes ethylene diacetate, propylene diacetate, etc.

As the plasticizer for use in the cellulose acylate film of the invention, also preferred is a methyl methacrylate (MA) oligomer-type plasticizer. Combination of the MA oligomer-type plasticizer and the above-mentioned saccharide-type plasticizer is also preferred. In the mode of combination use, the ratio by mass of the MA oligomer-type Plasticizer to the saccharide-type plasticizer is preferably from 1/2 to 1/5, more preferably from 1/3 to 1/4. One example of the MA oligomer-type plasticizer is an oligomer containing the following recurring unit:

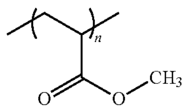

The weight-average molecular weight is preferably from 500 to 2000 or so, more preferably from 700 to 1500 or so, even more preferably from 800 to 1200 or so.

The MA oligomer-type plasticizer may be an MA homo-oligomer as well as an oligomer comprising the above-mentioned recurring unit derived from MA and at least one other recurring unit derived from any other monomer. Examples of the other monomer include ethyl acrylate, propyl (i-, n-) acrylate, butyl (n-, s-, t-) acrylate, pentyl (n-, s-) acrylate, hexyl (n-, i-) acrylate, heptyl (n-, i-) acrylate, octyl (n-, i-) acrylate, nonyl (n-, i-) acrylate, myristyl (n-, i-) acrylate, (2-ethylhexyl)acrylate, (ε-caprolactone) acrylate, (2-hydroxyethyl)acrylate, (2-hydroxypropyl)acrylate, (3-hydroxypropyl)acrylate, (4-hydroxybutyl)acrylate, (2-hydroxybutyl)acrylate, (2-methoxyethyl)acrylate, (2-ethoxyethyl) acrylate, and corresponding methacrylate monomers. In addition, also usable are aromatic ring-having monomers such as styrene, methylstyrene, hydroxystyrene, etc. As the other monomer, preferred are non-aromatic acrylate monomers and methacrylate monomers.

In the case where the MA oligomer-type plasticizer is an oligomer having two or more different types of recurring units, the oligomer preferably comprises X (hydrophilic group-having monomer component) and Y (hydrophilic group-free monomer component), in which the ratio (by mol) of X/Y is from 1/1 to 1/99.

The MA oligomer may be produced with reference to the method described in JP-A 2003-12859.

(Polymer Plasticizer)

The cellulose acylate film of the invention may contain any other polymer plasticizer along with or in place of any one of the above-mentioned saccharide-type plasticizer, polycondensate ester-type plasticizer and MMA oligomer-type plasticizer. The other polymer plasticizer includes polyester-polyurethane plasticizers, aliphatic hydrocarbon polymers, alicyclic hydrocarbon polymers; vinylic polymers such as polyvinyl isobutyl ether, poly-N-vinylpyrrolidone, etc.; styrenic polymers such as polystyrene, poly-4-hydroxystyrene, etc.; polyethers such as polyethylene oxide, polypropylene oxide, etc.; polyamides, polyurethanes, polyureas, phenol-formaldehyde condensates, urea-formaldehyde condensates, polyvinyl acetate, etc.

(Compound Having at Least Two Aromatic Rings)

The cellulose acylate film of the invention may contain a compound having at least two aromatic rings, not contradictory to the scope and the sprit of the invention. The compound has an effect of regulating the optical properties of the cellulose acylate film. For example, when the cellulose acylate film of the invention is used as an optically-compensatory film, it is effectively stretched for regulating the optical properties, especially Re thereof to be on a desired level. For increasing Re thereof, the in-plane refractive anisotropy of the film must be increased, for which one method comprises regulating the main chain orientation by stretching. As combined with stretching, a compound having a large refractivity anisotropy may be added to the film for further increasing the refractive anisotropy of the film. For example, when the film to which a compound having at least two aromatic rings is added as an additive thereto is stretched, the main chain of the polymer constituting the film is oriented, and with that, the compound itself becomes well orientable and the film may be regulated to have desired optical properties with ease.

The compound having at least two aromatic rings includes, for example, triazine compounds as in JP-A 2003-344655, rod-shaped compounds as in JP-A 2002-363343, liquid crystalline compounds as in JP-A 2005-134884 and 2007-119737, etc. More preferred are triazine compounds and rod-shaped compounds. Two or more different types of compounds having at least two aromatic rings may be used, as combined. The molecular weight of the compound having at least two aromatic rings is preferably from 300 to 1200 or so, more preferably from 400 to 1000.

The amount of the compound having at least two aromatic rings to be added is preferably from 0.05% to 10% in terms of the ratio by mass to cellulose acylate resin, more preferably from 0.5% to 8%, even more preferably from 1% to 5%. The compound having two aromatic rings may serve also as the compound capable of forming a hydrogen bond for use in the invention. On the other hand, when the compound having two aromatic rings has a 1,3,5-triazine ring structure but does not satisfy any one of the formulae (A-1) to (H-1), then the amount of the compound having two aromatic rings to be added is preferably from 0.05% to 10% in terms of the ratio by mass to cellulose acylate resin, more preferably from 0.5% to 8%, even more preferably from 1% to 5% from the viewpoint of the humidity dependence improvability of the compound.

(Optical Anisotropy Regulator)

The cellulose acylate film of the invention may contain an optical anisotropy regulator. For example, examples of the regulator include "Rth-reducing compounds" described in JP-A 2006-30937, pp. 23-72.

(Matting Agent Particles)

A matting agent may be added to the cellulose acylate film. Particles usable as the matting agent include silicon dioxide, titanium dioxide, aluminium oxide, zirconium oxide, calcium carbonate, talc, clay, fired kaolin, fired calcium silicate, calcium silicate hydrate, aluminium silicate, magnesium silicate and calcium phosphate. As the particles, preferred are silicon-containing ones as lowering the turbidity of the film, and more preferred is silicon dioxide.

As silicon dioxide particles, for example, usable are commercial products such as Aerosil R972, R972V, R974, R812, 200, 200V, 300, R202, OX50, TT600 (all by Nippon Aerosil), etc. Zirconium oxide particles are commercially available, for example, as Aerosil R972 and R811 (both by Nippon Aerosil), and are usable herein.

In producing a cellulose acylate film containing particles having a small secondary mean particle size, usable is a dispersion of the particles. Some methods may be taken into consideration in preparing a dispersion of particles. For example, there is mentioned a method where a dispersion of particles is previously prepared by stirring and mixing a solvent and particles, and the particle dispersion is added to a small amount of a cellulose acylate solution separately prepared and dissolved therein with stirring, and then this is further mixed with a main cellulose acylate dope liquid. According to the method, the silicon dioxide particles are well dispersible and the dispersed silicon dioxide particles hardly reaggregate, and the method is a favorable method. Apart from this, there may be mentioned another method in which a small amount of cellulose acylate is added to a solvent and dissolved therein with stirring, and particles are added thereto and dispersed with a disperser to prepare a particles-added liquid, and the particles-added liquid is well mixed with a dope liquid using an in-line mixer. Any of those methods is employable herein, and the invention is not limited to these methods.

The solvent to be used in the above preparation methods may be a lower alcohol, preferably methyl alcohol, ethyl alcohol, propyl alcohol, isopropyl alcohol, butyl alcohol, etc. Not specifically defined, any other solvent than such a lower alcohol is also usable, for which preferred are solvents for use in cellulose acylate film formation.

(Low-Molecular Plasticizer, Degradation Inhibitor, Release Agent)

Various other additives than those mentioned above (e.g., low-molecular plasticizer, UV inhibitor, degradation inhibitor, release agent, IR absorbent, etc.) may be added to the cellulose acylate film in the process of producing the film, depending on the applications of the film. The additives may be solid or oily, or that is, they are not specifically defined in point of their melting point and boiling point thereof. For example, for the additive, UV absorbents at 20° C. or lower and at 20° C. or higher may be mixed, or plasticizers may also be mixed in the same manner. For example, these are described in JP-A 2001-151901. IR absorbent dyes are described in, for example, JP-A 2001-194522. The time at which the additive is added may be in any stage in the step of dope preparation; however, the additive may be added in the final stage of the dope preparation step. Not specifically defined, the amount of the material to be added may be any one capable expressing the function thereof. In the case where the cellulose acylate film is formed of plural layers, then the type and the amount of the additive to be added to the constitutive layers may differ. For example, as in JP-A 2001-151902, the related technique is known in the art. Regarding the details of the additives, the materials described in Hatsumei Kyokai Disclosure Bulletin No. 2001-1745, pp. 16-22, (published in Mar. 15, 2001 by Hatsumei Kyokai) are preferred for use in the invention.

(1-4) Production Method for Cellulose Acylate Film:

The cellulose acylate film of the invention is preferably produced according to a solution-casting method (solvent-casting method). According to a solvent-casting method, a cellulose acylate is dissolved in an organic solvent to prepare a dope, and the resulting dope is cast onto the surface of a support formed of a metal or the like, and dried into a film, and thereafter the film is peeled away from the support surface, and stretched.

For production examples for cellulose acylate film according to a solvent casting method, reference may be made to U.S. Pat. Nos. 2,336,310, 2,367,603, 2,492,078, 2,492,977, 2,492,978, 2,607,704, 2,739,069 and 2,739,070; British Patent 640731 and 736892; JP-B 45-4554 and 49-5614; JP-A 60-176834, 60-203430 and 62-115035, etc. The cellulose acylate film may be stretched. Regarding the method and the condition for the stretching treatment, for example, reference may be made to the examples described in JP-A 62-115035, 4-152125, 4-284211, 4-298310, 11-48271, etc.

(1-5) Characteristics of Cellulose Acylate Film: (Re and Rth)

The preferred range of the optical characteristics of the cellulose acylate film of the invention may change depending on the use of the film.

In an embodiment where the film is used in a VA-mode liquid crystal display device, preferably, its Re(589) is from 30 nm to 200 nm, more preferably from 30 nm to 150 nm, even more preferably from 40 nm to 100 nm, and its Rth(589) is from 70 nm to 400 nm, more preferably from 100 nm to 300 nm, even more preferably from 100 nm to 250 nm.

In an embodiment where the film is used in a TN-mode liquid crystal display device, preferably, its Re(589) is from 0 nm to 100 nm, more preferably from 20 nm to 90 nm, even more preferably from 50 nm to 80 nm, and its Rth(589) is from 20 nm to 200 nm, more preferably from 30 nm to 150 nm, even more preferably from 40 nm to 120 nm.

(Humidity Dependence of Re and Humidity Dependence of Rth)

Regarding the cellulose acylate film of the invention, the fluctuation between its Re and Rth when the film is conditioned at 25° C. and at a relative humidity of 10% for 12 hours (hereinafter these may be referred to as Re(10%) and Rth(10%)) and its Re and Rth conditioned at 25° C. and a relative humidity of 80% for 12 hours (hereinafter these may be referred to as Re(80%) and Rth(80%)) is small. When the humidity dependence of the optical characteristic of the film is enhanced in that manner, then Re and Rth fluctuation of the film under the condition under which the humidity of the usage environment varies can be prevented and the film can exhibit the retardation falling within the above-mentioned preferred range. Accordingly, the invention can provide a cellulose acylate film favorable for use under the condition under which the humidity of the usage environment varies.

Preferably, the cellulose acylate film of the invention has an Re humidity dependence (ΔRe=Re(10%)−Re(80%)) of less than 10 nm, more preferably at most 8 nm, even more preferably at most 5 nm.

Preferably, the cellulose acylate film of the invention has an Rth humidity dependence (ΔRth=Rth(10%)−Rth(80%)) of at most 20.5 nm, more preferably at most 18.5 nm, even more preferably at most 14.5 nm.

(Film Thickness)

In an embodiment where the cellulose acylate film of the invention is used as a part in a device that is desired to have a thinned body, for example, as a part of a liquid crystal display device or the like, the film is preferably thinner. However, if too thin, the film could not exhibit the optical characteristics necessary for the use. In an embodiment where the film of the invention is used as an optical compensatory film in a liquid crystal display device, or as a protective film for a polarizer, the film thickness is preferably from 20 to 80 μm or so, more preferably from 25 to 70 μm or so, even more preferably from 30 to 60 μm or so.

(Haze)

The cellulose acylate film of the invention preferably has a low haze. The film having a low haze is favorable since it does not lower the contrast on the front (in the normal direction relative to the panel surface) of a liquid crystal display device comprising it.

(Axial Misalignment)

When a film having a slow axis in the direction perpendicular to the film-traveling direction, or that is, in the cross direction of the film is stretched with a tenter, then the slow axis of the film may be deviated (bowed) more on the outer side thereof, even though the slow axis thereof could be in that perpendicular direction in the center of the film. The width of the film produced according to a solvent casting method means the length of the film in the direction perpendicular to the dope-casting direction.

Preferably, the axial misalignment of the slow axis of the cellulose acylate film of the invention is as small as possible in the entire width of the film.

The slow axis of the film may be determined simultaneously with determination of the in-plane retardation thereof. Concretely, a small test piece is cut out of the film, completely in parallel to the end thereof in the film-traveling direction, and this is analyzed with KOBRA 21ADH or WR for in-plane retardation measurement, and at the same time, the slow axis of the film may be determined.

2. Use of Cellulose Acylate Film:

The cellulose acylate film of the invention has many applications. For example, it may be used as a retardation film (hereinafter this may be referred to as optical compensatory film) in liquid crystal display devices, as a protective film of polarizers, etc.

(Retardation Film)

The cellulose acylate film of the invention may be used as a retardation film. "Retardation film or optical compensatory film" means an optical material having optical anisotropy generally for use in display devices such as liquid crystal display devices, etc., and this has the same meaning as that of an optical compensatory sheet or the like. In a liquid crystal display device, such an optical compensatory film is used for the purpose of enhancing the contrast of the display panel, for enlarging the viewing angle and for solving a problem of color shift.

Plural cellulose acylate films of the invention may be laminated, or the cellulose acylate film of the invention may be laminated with any other film than the film of the invention, thereby suitably regulating Re and Rth of the resulting laminate to be an optical compensatory film. The film lamination may be attained with a sticking paste or an adhesive.

(Polarizer)

The cellulose acylate film of the invention may be used as a protective film for polarizers, and the invention provides a polarizer comprising the film. One example of the polarizer of the invention comprises a polarizing film and two protective films (transparent films) for protecting both surfaces of the polarizing film, in which the cellulose acylate film of the invention is used as at least one of the polarizer-protective films. In an embodiment where the cellulose acylate film of the invention is used as a support and an optically-anisotropic layer of a liquid crystal composition is formed on the surface of the support, and where the cellulose acylate film is used as a protective film for a polarizer, it is desirable that the back side (on which the optically-anisotropic layer is not formed) of the cellulose acylate film of the invention serving as a support is stuck to the surface of the polarizing film.

In the case where the cellulose acylate film of the invention is used as a protective film for the polarizer, the cellulose acylate film of the invention is preferably hydrophilicated through the above-mentioned surface-treatment (e.g., as described in JP-A 6-94915 and 6-118232), and for example, the film is preferably processed for glow discharge treatment, corona discharge treatment, or alkali saponification. In particular, the surface treatment of the film is most preferably alkali saponification.

As the polarizing film, for example, usable is a film produced by dipping a polyvinyl alcohol film in an iodine solution and stretching it. In the case where the polarizing film produced by dipping a polyvinyl alcohol film in an iodine solution and stretching it is used, the surface-treated surface of the cellulose acylate film of the invention may be directly stuck to both surfaces of the polarizing film with an adhesive. In the production method of the invention, it is desirable that the cellulose acylate film is directly stuck to the polarizing film in the manner as above. As the adhesive, usable is an aqueous solution of polyvinyl alcohol or polyvinyl acetal (e.g., polyvinyl butyral) or a latex of a vinylic polymer (e.g., polybutyl acrylate). Especially preferred as the adhesive is an aqueous solution of a completely-saponified polyvinyl alcohol.

In general, in a liquid crystal display device, a liquid crystal cell is disposed between two polarizers. Therefore, the device has four polarizer-protective films. The cellulose acylate film of the invention may be used as any of those four polarizer-protective films, but the cellulose acylate film of the invention is especially useful as the protective film to be disposed between the polarizing film and the liquid crystal layer (liquid crystal cell) in the liquid crystal display device. As the protective film to be disposed on the side of the polarizing film opposite to the side of the cellulose acylate film of the invention, a transparent hard coat layer, an antiglare layer, an antireflection layer or the like may be disposed, and in particular, the film of the invention is favorable as the polarizer-protective film to be disposed as the outermost surface layer on the display panel side of the liquid crystal display device.

(Liquid Crystal Display Device)

The cellulose acylate film of the invention and the optically-compensatory film and the polarizer comprising the film can be used in various display modes of liquid crystal display devices. Various liquid crystal modes where the film of the invention can be used are described. Above all, the cellulose acylate film of the invention and the optically-compensatory film and the polarizer comprising the film are favorably used in VA-mode liquid crystal display devices. The liquid crystal display devices may be any of transmission-mode, reflection-mode or semitransmission-mode devices.

FIG. 1 shows a schematic cross-sectional view of one example of a liquid crystal display device of the invention. In FIG. 1, the upper side is a viewers' side (panel side), and the lower side is a backlight side.

The VA-mode liquid crystal display device of in FIG. 1 comprises a liquid crystal cell LC (comprising an upper substrate 1, a lower substrate 3 and a liquid crystal layer 5), and a pair of an upper polarizer P1 and a lower polarizer P2 disposed to sandwich the liquid crystal cell LC therebetween. In general, polarizing films are incorporated into the liquid crystal display device as polarizers having a protective film on both surfaces thereof; however, in FIG. 1, the outer protective film of the polarizing film is omitted. The polarizers P1 and P2 each have a polarizing film 8*a* and 8*b*, respectively; and they are so disposed that the absorption axes 9*a* and 9*b* thereof are perpendicular to each other. The liquid crystal cell LC is a VA-mode liquid crystal cell, and at the time of black level of display, the liquid crystal layer 5 is in homeotropic alignment as in FIG. 1. The upper substrate 1 and the lower substrate 3 each have an alignment film (not shown) and an electrode layer (not shown) on the inner surface thereof; and the substrate 1 has a color filter layer (not shown) on the viewers side inner surface thereof.

Between the upper substrate 1 and the upper polarizing film 8*a*, and between the lower substrate 3 and the lower polarizing film 8*b*, disposed are retardation films 10*a* and 10*b*, respectively. The retardation films 10*a* and 10*b* are cellulose acylate films of the invention. The retardation films 10*a* and 10*b* are so disposed that the in-plane slow axes 11*a* and 11*b* thereof could be perpendicular to the absorption axes 9*a* and 9*b* of the upper polarizing film 8*a* and the lower polarizing film 8*b*, respectively. Specifically, the retardation films 10*a* and 10*b* are so disposed that their slow axes are perpendicular to each other. The retardations films 10*a* and 10*b* each comprising the cellulose acylate film of the invention contribute toward reducing the light leakage and the color shift that may occur in oblique directions at the time of black level of display.

(Hard Coat Film, Antiglare Film, Antireflection Film)

The cellulose acylate film of the invention may be applied to a hard coat film, an antiglare film, or an antireflection film, as the case may be. For the purpose of enhancing the visibility of flat panel displays such as LCD, PDP, CRT, EL and the like, any or all of a hard coat layer, an antiglare layer and an antireflection layer may be given to one or both surfaces of the cellulose acylate film of the invention. Preferred embodiments of such antiglare film and antireflection film are described in detail in Hatsumei Kyokai Disclosure Bulletin (No. 2001-1745, published on Mar. 15, 2001 by Hatsumei Kyokai), pp. 54-57, and are favorably applicable to the cellulose acylate film of the invention.

EXAMPLES

The characteristics of the invention are described more concretely with reference to the following Examples. In the following Examples, the material used, its amount and the ratio, the details of the treatment and the treatment process may be suitably modified or changed. Accordingly, the invention should not be limitatively interpreted by the Examples mentioned below.

1. Formation of Cellulose Acylate Film:

Cellulose acylate resin A (100 parts by mass) was mixed in a solvent of methylene chloride (410 parts by mass) and ethanol (45 parts by mass) to prepare a cellulose acylate (concretely, cellulose acetate propionate) solution. The solution was cast with a band caster, the resulting web was peeled away from the band, and thereafter this was stretched in TD (transverse direction of the film) by 35% at 145° C., then dried to give a cellulose acylate film (concretely, cellulose acetate propionate film) having a thickness of 50 μm. This is a film 101.

Films 115, 121, 127, 131 and 135 were produced in the same manner as that for the film 101, for which, however, the type of the cellulose acylate was changed from A to that in the Table 6 below.

(Evaluation of Optical Properties)

Thus prepared Films 101, 115, 121, 127, 131 and 135 containing no additives were sampled three times at three points in the cross direction (center, two edges (at the position of 5% of the overall width from each side)) at intervals of 10 m in the machine direction, thereby preparing 9 samples each having a size of 3 cm square. The samples were tested according to the method mentioned below, and the data were averaged.

The sample film was conditioned at 25° C. and a relative humidity of 60% for 24 hours, then using an automatic birefringence meter (KOBRA-21ADH by Oji Scientific Instruments), it was analyzed at 25° C. and a relative humidity of 60% for the retardation at a wavelength of 590 nm in the vertical direction to the film surface, and in oblique directions tilted from the film surface normal line at intervals of 10° within a range of +50° to −50°. The in-plane retardation (Re) and the thickness-direction retardation (Rth) of each film sample were thus computed.

The results are shown in Table 6 below.

The humidity-dependent change of the retardation of the film was determined as follows: The film was analyzed in the same manner as above except that the film was conditioned at 25° C. and at a relative humidity of 10% for 12 hours and Re and Rth of the film were measured (Re (10%) and Rth(10%)). The film was analyzed also in the same manner as above except that film was conditioned at 25° C. and at a relative humidity of 80% for 12 hours and Re and Rth of the film were measured (Re(80%) and Rth(80%)). More specifically, the Re humidity dependence ($\Delta Re_0$) and the Rth humidity dependence ($\Delta Rth_0$) of Films 101, 115, 121, 127, 131 and 135 containing no additives are obtained from the following formulae:

$$\Delta Re = Re(10\%) - Re(80\%)$$

$$\Delta Rth = Rth(10\%) - Rth(80\%)$$

The results are shown in Table 6 below.

Other films were produced in the manner mentioned below. Concretely, films 102 to 114 were produced in the same manner as that for the film 101, to which, however, the additive shown in Table 6 below was added in the amount shown therein. Similarly, films 116 to 120 were produced in the same manner as that for the film 115, to which, however, the additive shown in Table 6 below was added in the amount shown therein; films 122 to 126 were produced in the same manner as that for the film 121, to which, however, the additive shown in Table 6 below was added in the amount shown therein; films 128 to 130 were produced in the same manner as that for the film 127, to which, however, the additive shown in Table 6 below was added in the amount shown therein; films 132 to 134 were produced in the same manner as that for the film 131, to which, however, the additive shown in Table 6 below was added in the amount shown therein; and films 136 was produced in the same manner as that for the film 135, to which, however, the additive shown in Table 6 below was added in the amount shown therein. The structures of the compounds A-11 to A-16 and the comparative compounds T and U-1 to U-3 used as the additive are shown below.

(A-11)

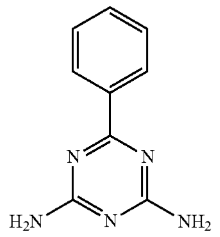

(A-12)

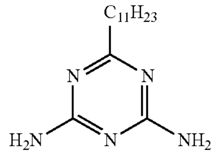

(A-13)

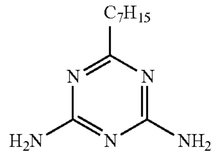

(A-14)

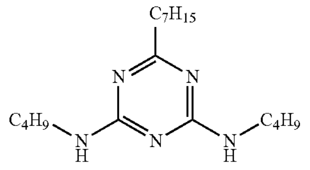

(A-15)

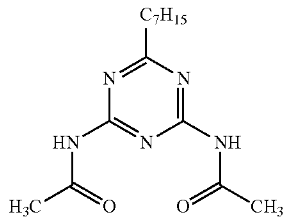

(A-16)

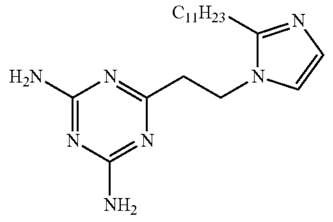

T

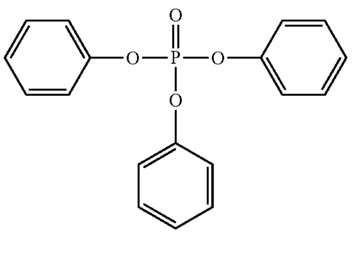

-continued

U-1

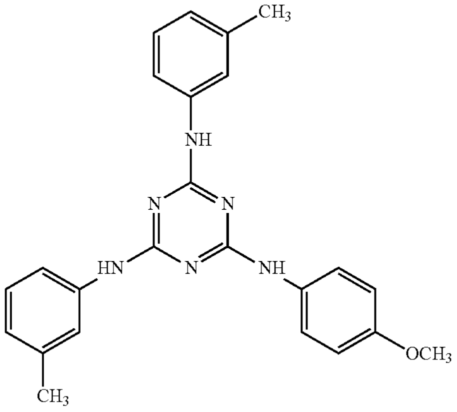

U-2

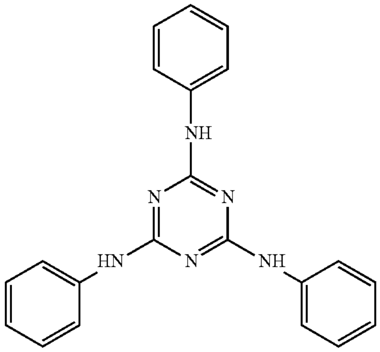

-continued

U-3

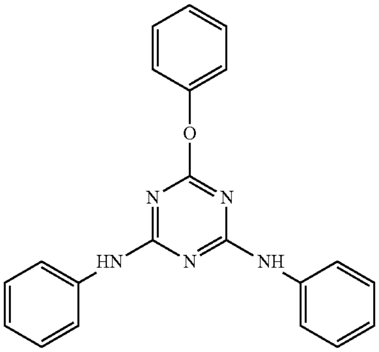

Thus produced, the additive-containing films of Examples and Comparative Examples were analyzed for the physical properties thereof, like the additive-free films (films 101, 115, 121, 127, 131 and 135). Of the additive-containing films of Examples and Comparative Examples, the humidity dependence of the retardation was computed as ΔRe={Re(10%) of film}−{Re(80%) of film} and ΔRth={Rth(10%) of film}−{Rth(80%) of film}.

From $\Delta Re_0$ of the additive-free film and ΔRe of the additive-containing films of Examples and Comparative Examples in the series of the samples formed of the same type of cellulose acylate resin, $\Delta Re_0-\Delta Re$ was computed. Similarly, $\Delta Rth_0-\Delta Rth$ was computed in the series of the samples formed of the same type of cellulose acylate resin.

These results are shown in Table 6 below.

TABLE 6

| | Additive | | Cellulose Acylate Resin | | | | | | | | | | |
|---|---|---|---|---|---|---|---|---|---|---|---|---|---|
| Film | Compound | Amount added [part by mass] | Type | Degree of acetyl substitution | Degree of propionyl substitution | Total degree of acyl substitution | Re [nm] | $\Delta Re_0$ or ΔRe [nm] | $\Delta Re_0$ − ΔRe [nm] | Rth [nm] | $\Delta Re_0$ or ΔRe [nm] | $\Delta Rth_0$ − ΔRth [nm] | Remarks |
| 101 | — | 0 | A | 1.9 | 0.6 | 2.5 | 32.1 | 13.3 | — | 108.4 | 32.0 | — | comparative example |
| 102 | 1 | 4 | A | 1.9 | 0.6 | 2.5 | 41.7 | 6.3 | 7.0 | 160.0 | 13.3 | 18.7 | example of the invention |
| 103 | 1 | 8 | A | 1.9 | 0.6 | 2.5 | 50.1 | 3.0 | 10.3 | 185.0 | 6.5 | 25.5 | example of the invention |
| 104 | 2 | 4 | A | 1.9 | 0.6 | 2.5 | 35.2 | 5.8 | 7.5 | 96.3 | 11.1 | 20.9 | example of the invention |
| 105 | 3 | 4 | A | 1.9 | 0.6 | 2.5 | 31.7 | 6.3 | 7.0 | 88.3 | 13.0 | 19.0 | example of the invention |
| 106 | 3 | 8 | A | 1.9 | 0.6 | 2.5 | 35.0 | 4.4 | 8.9 | 70.1 | 7.0 | 25.0 | example of the invention |
| 107 | 3 | 12 | A | 1.9 | 0.6 | 2.5 | 36.2 | 2.2 | 11.1 | 62.0 | 5.0 | 27.0 | example of the invention |
| 108 | 4 | 8 | A | 1.9 | 0.6 | 2.5 | 30.1 | 4.1 | 9.2 | 79.7 | 8.0 | 24.0 | example of the invention |
| 109 | 5 | 4 | A | 1.9 | 0.6 | 2.5 | 32.3 | 6.1 | 7.2 | 85.5 | 13.0 | 19.0 | example of the invention |
| 110 | 6 | 8 | A | 1.9 | 0.6 | 2.5 | 43.9 | 5.0 | 8.3 | 138.0 | 14.1 | 17.9 | example of the invention |
| 111 | 8 | 4 | A | 1.9 | 0.6 | 2.5 | 46.0 | 11.5 | 1.8 | 135.0. | 25.0 | 7.0 | comparative example |
| 112 | 9 | 4 | A | 1.9 | 0.6 | 2.5 | 64.2 | 10.3 | 3.0 | 175.6 | 23.2 | 8.8 | comparative example |
| 113 | 9 | 8 | A | 1.9 | 0.6 | 2.5 | 90.2 | 8.9 | 4.4 | 218.9 | 20.9 | 11.1 | comparative example |
| 114 | 11 | 4 | A | 1.9 | 0.6 | 2.5 | 48.8 | 11.2 | 2.1 | 141.3 | 23.9 | 8.1 | comparative example |
| 115 | — | 0 | B | 1.8 | 0.6 | 2.4 | 42.7 | 15.2 | — | 160.2 | 35.0 | — | comparative example |
| 116 | 6 | 4 | B | 1.8 | 0.6 | 2.4 | 38.0 | 8.2 | 7.0 | 195.4 | 16.8 | 18.2 | example of the invention |
| 117 | 6 | 8 | B | 1.8 | 0.6 | 2.4 | 49.9 | 4.8 | 10.4 | 212.7 | 12.0 | 23.0 | example of the invention |
| 118 | 7 | 4 | B | 1.8 | 0.6 | 2.4 | 32.0 | 9.0 | 6.2 | 100.8 | 14.1 | 20.9 | example of the invention |
| 119 | 7 | 8 | B | 1.8 | 0.6 | 2.4 | 31.3 | 4.5 | 10.7 | 92.4 | 7.4 | 27.7 | example of the invention |
| 120 | 10 | 4 | B | 1.8 | 0.6 | 2.4 | 79.1 | 11.8 | 3.4 | 240.9 | 28.5 | 6.5 | example of the invention |
| 121 | — | 0 | C | 1.6 | 0.7 | 2.3 | 49.8 | 17.3 | — | 194.1 | 35.2 | — | comparative example |
| 122 | 1 | 4 | C | 1.6 | 0.7 | 2.3 | 58.3 | 9.3 | 8.0 | 219.3 | 15.3 | 19.9 | example of the invention |
| 123 | 1 | 8 | C | 1.6 | 0.7 | 2.3 | 63.8 | 3.2 | 14.1 | 233.3 | 9.8 | 25.4 | example of the invention |
| 124 | 3 | 4 | C | 1.6 | 0.7 | 2.3 | 51.9 | 8.4 | 8.9 | 162.0 | 14.4 | 20.8 | example of the invention |
| 125 | 3 | 8 | C | 1.6 | 0.7 | 2.3 | 55.0 | 3.3 | 14.1 | 140.0 | 7.3 | 27.9 | example of the invention |
| 126 | 8 | 8 | C | 1.6 | 0.7 | 2.3 | 77.0 | 13.3 | 4.0 | 240.0 | 28.0 | 7.2 | comparative example |
| 127 | — | 0 | D | 1.5 | 0.7 | 2.2 | 52.3 | 17.0 | — | 219.1 | 38.3 | — | comparative example |
| 128 | 1 | 4 | D | 1.5 | 0.7 | 2.2 | 73.4 | 9.4 | 7.6 | 249.6 | 18.2 | 20.1 | example of the invention |
| 129 | 1 | 8 | D | 1.5 | 0.7 | 2.2 | 89.3 | 3.3 | 13.7 | 275.4 | 9.9 | 28.4 | example of the invention |
| 130 | 9 | 4 | D | 1.5 | 0.7 | 2.2 | 99.1 | 13.0 | 4.0 | 330.5 | 28.4 | 9.9 | comparative example |
| 131 | — | 0 | E | 2.1 | 0.6 | 2.7 | 20.7 | 9.8 | — | 96.0 | 24.2 | — | comparative example |
| 132 | 1 | 4 | E | 2.1 | 0.6 | 2.7 | 31.6 | 4.8 | 5.0 | 130.3 | 12.1 | 12.1 | example of the invention |

TABLE 6-continued

| | Additive | | Cellulose Acylate Resin | | | | | | | | | | |
|---|---|---|---|---|---|---|---|---|---|---|---|---|---|
| Film | Compound | Amount added [part by mass] | Type | Degree of acetyl substitution | Degree of propionyl substitution | Total degree of acyl substitution | Re [nm] | $\Delta Re_0$ or $\Delta Re$ [nm] | $\Delta Re_0 - \Delta Re$ [nm] | Rth [nm] | $\Delta Re_0$ or $\Delta Re$ [nm] | $\Delta Rth_0 - \Delta Rth$ [nm] | Remarks |
| 133 | 1 | 8 | E | 2.1 | 0.6 | 2.7 | 45.3 | 2.4 | 7.4 | 155.3 | 6.2 | 18.0 | example of the invention |
| 134 | 6 | 8 | E | 2.1 | 0.6 | 2.7 | 30.3 | 3.3 | 6.5 | 113.4 | 8.5 | 15.7 | example of the invention |
| 135 | — | 0 | F | 2.4 | 0.4 | 2.8 | 14.6 | 8.1 | — | 71.9 | 27.2 | — | comparative example |
| 136 | 1 | 4 | F | 2.4 | 0.4 | 2.8 | 24.0 | 3.2 | 4.9 | 82.6 | 13.9 | 13.3 | comparative example |

From the results in the above Table 6, it is known that the films of the invention, to which the compound capable of forming a hydrogen bond had been added, were all improved in point of the humidity dependence of retardation, as compared with the comparative films to which the compound capable of forming a hydrogen bond had not been added. In addition, it is also known that the comparative films of cellulose acylate resin to which any of the comparative compounds T and U-1 to U-3 had been added were still unsatisfactory in point of the humidity dependence improvement.

Synthesis Example

Synthesis of the Compound of the Formula (A-2)

The compounds of capable of forming a hydrogen bond having the following structures which are represented by the formula (A-2) and can be used in the invention.

(3-1)

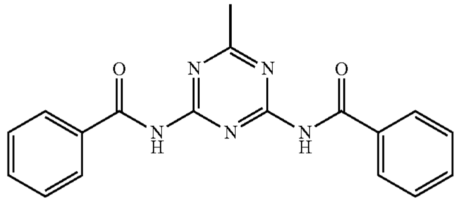

(3-2)

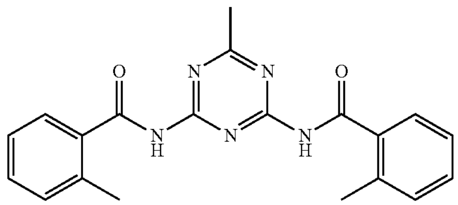

(3-3)

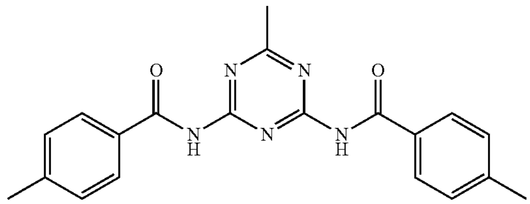

-continued (3-4)

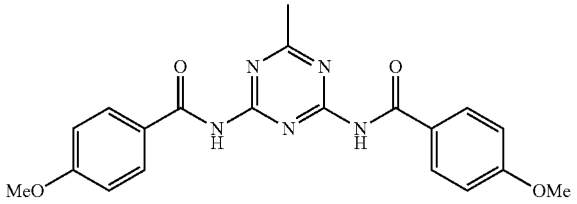

(3-5)

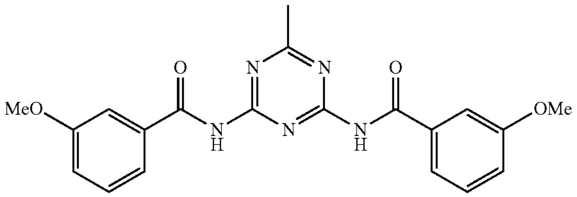

(3-6)

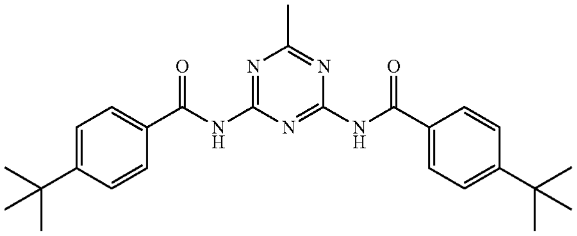

(3-7)

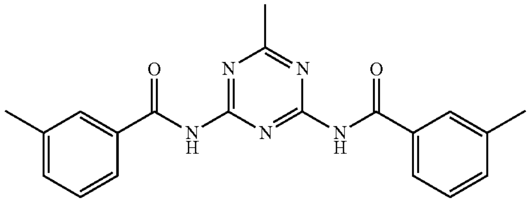

(3-8)

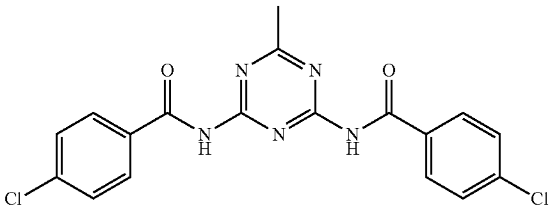

-continued (3-9)

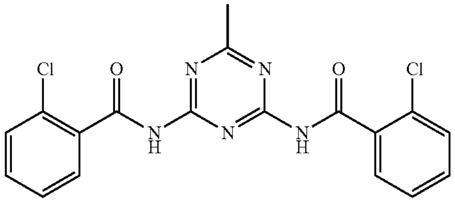

(3-10)

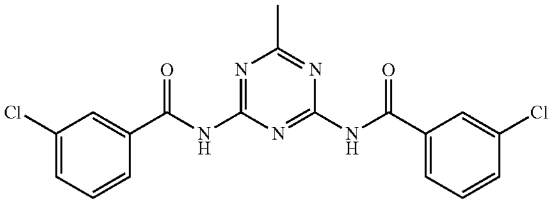

(3-11)

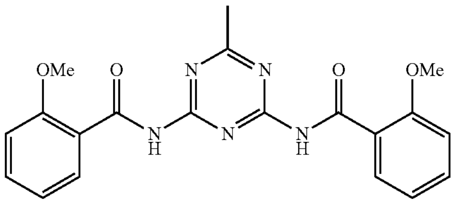

(3-12)

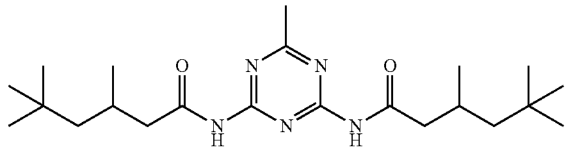

(3-13)

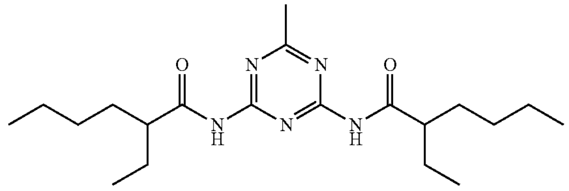

(3-14)

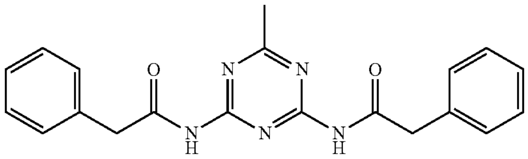

(3-15)

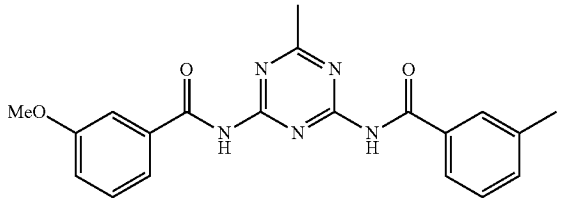

-continued (3-16)

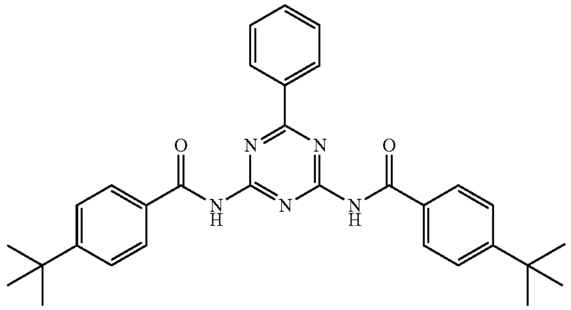

(3-17)

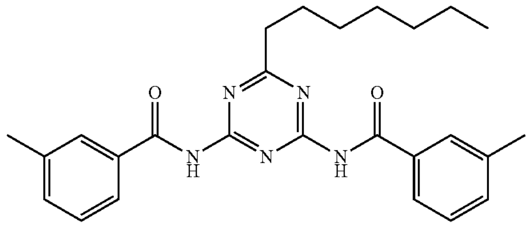

(3-18)

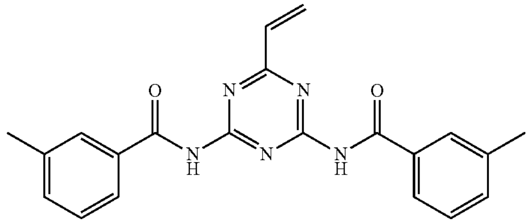

Synthesis of Compound (3-1):

Benzoyl chloride (9.9 g, 70 mmol) was added to a solution of acetoguanamine (10 g, 32 mmol) in pyridine (50 ml) and the mixture was heated for reflux for 8 hours. Temperature of the reaction mixture was dropped to a room temperature and ethyl acetate and water were added to separate phases. The organic phase was washed with 1N hydrochloric acid and then water. The organic phase was dried with magnesium sulfate and the solvent was distilled off under a reduced pressure. The resultant was purified by a column chromatography to obtain the compound (3-1).

The NMR spectrum data of the obtained Compound (3-1) were as follows:

$^1$H-NMR (solvent: DMSO-$d_6$, standard: tetramethylsilane) δ (ppm): 2.50 (3H, s), 7.45-7.55 (4H, m), 7.60-7.65 (2H, m), 7.90-8.00 (4H, m), 11.20 (2H, s)

Synthesis of Compound (3-2):

Compound (3-2) was synthesized by the synthetic process of Compound (3-1) except that the starting material was changed from benzoyl chloride to o-methylbenzoyl chloride.

The NMR spectrum data of the obtained Compound (3-2) were as follows:

$^1$H-NMR (solvent: CDCl, standard: tetramethylsilane) δ (ppm): 2.50 (6H, s), 2.60 (3H, s), 7.20-7.30 (4H, m), 7.35-7.45 (2H, m), 7.50-7.60 (2H, m), 8.55 (2H, s)

Synthesis of Compound (3-3):

Compound (3-3) was synthesized by the synthetic process of Compound (3-1) except that the starting material was changed from benzoyl chloride to p-methylbenzoyl chloride.

The NMR spectrum data of the obtained Compound (3-3) were as follows:

$^1$H-NMR (solvent: DMSO-$d_6$, standard: tetramethylsilane) δ (ppm): 2.35 (6H, s), 2.50 (3H, s), 7.30 (4H, d), 7.85 (4H, d), 11.10 (2H, s)

Synthesis of Compound (3-4):

Compound (3-4) was synthesized by the synthetic process of Compound (3-1) except that the starting material was changed from benzoyl chloride to p-methoxylbenzoyl chloride.

The NMR spectrum data of the obtained Compound (3-4) were as follows:

$^1$H-NMR (solvent: DMSO-$d_6$, standard: tetramethylsilane) δ (ppm): 2.50 (3H, s), 3.80 (6H, s), 7.00 (4H, d), 7.95 (4H, d), 11.00 (2H, s)

Synthesis of Compound (3-5):

Compound (3-5) was synthesized by the synthetic process of Compound (3-1) except that the starting material was changed from benzoyl chloride to m-methoxylbenzoyl chloride.

The NMR spectrum data of the obtained Compound (3-5) were as follows:

$^1$H-NMR (solvent: DMSO-$d_6$, standard: tetramethylsilane) δ (ppm): 2.50 (3H, s), 3.80 (6H, s), 7.10-7.20 (2H, m), 7.35-7.45 (2H, m), 7.50-7.60 (4H, m), 11.00 (2H, s)

Synthesis of Compound (3-6):

Compound (3-6) was synthesized by the synthetic process of Compound (3-1) except that the starting material was changed from benzoyl chloride to p-tert-butylbenzoyl chloride.

The NMR spectrum data of the obtained Compound (3-6) were as follows:

$^1$H-NMR (solvent: DMSO-$d_6$, standard: tetramethylsilane) δ (ppm): 1.30 (18H, s), 2.50 (3H, s), 7.55 (4H, d), 7.95 (4H, d), 11.00 (2H, s)

Synthesis of Compound (3-7):

Compound (3-7) was synthesized by the synthetic process of Compound (3-1) except that the starting material was changed from benzoyl chloride to m-methylbenzoyl chloride.

The NMR spectrum data of the obtained Compound (3-7) were as follows:

$^1$H-NMR (solvent: $CDCl_3$, standard: tetramethylsilane) δ (ppm): 2.40 (6H, s), 2.65 (3H, s), 7.35-7.45 (4H, m), 7.70-7.80 (4H, m), 8.80 (2H, s)

Synthesis of Compound (3-8):

Compound (3-8) was synthesized by the synthetic process of Compound (3-1) except that the starting material was changed from benzoyl chloride to p-chlorobenzoyl chloride.

The NMR spectrum data of the obtained Compound (3-8) were as follows:

$^1$H-NMR (solvent: $CDCl_3$, standard: tetramethylsilane) δ (ppm): 2.60 (3H, s), 7.40-7.50 (4H, m), 7.90-8.00 (4H, m), 9.10 (2H, s)

Synthesis of Compound (3-9):

Compound (3-9) was synthesized by the synthetic process of Compound (3-1) except that the starting material was changed from benzoyl chloride to o-chlorobenzoyl chloride.

The NMR spectrum data of the obtained Compound (3-9) were as follows:

$^1$H-NMR (solvent: $CDCl_3$, standard: tetramethylsilane) δ (ppm): 2.50 (3H, s), 7.30-7.50 (6H, m), 7.60-7.70 (2H, m), 8.95 (2H, s)

Synthesis of Compound (3-10):

Compound (3-10) was synthesized by the synthetic process of Compound (3-1) except that the starting material was changed from benzoyl chloride to m-chlorobenzoyl chloride.

The NMR spectrum data of the obtained Compound (3-10) were as follows:

$^1$H-NMR (solvent: $CDCl_3$, standard: tetramethylsilane) δ (ppm): 2.50 (3H, s), 7.55 (2H, m), 7.70 (2H, m), 7.90 (2H, m), 8.00 (2H, s), 11.35 (2H, s)

Synthesis of Compound (3-11):

Compound (3-11) was synthesized by the synthetic process of Compound (3-1) except that the starting material was changed from benzoyl chloride to o-methoxybenzoyl chloride.

The NMR spectrum data of the obtained Compound (3-11) were as follows:

$^1$H-NMR (solvent: DMSO-$d_6$, standard: tetramethylsilane) δ (ppm): 2.40 (3H, s), 3.80 (6H, s), 7.00-7.20 (4H, m), 7.55 (2H, m), 7.65 (2H, m), 10.70 (2H, s)

Synthesis of Compound (3-12):

Compound (3-12) was synthesized by the synthetic process of Compound (3-1) except that the starting material was changed. The structure of the obtained compound was confirmed through MS spectrometry.

Synthesis of Compound (3-13):

Compound (3-13) was synthesized by the synthetic process of Compound (3-1) except that the starting material was changed. The structure of the obtained compound was confirmed through MS spectrometry.

Synthesis of Compound (3-14):

Compound (3-14) was synthesized by the synthetic process of Compound (3-1) except that the starting material was changed.

The NMR spectrum data of the obtained Compound (3-14) were as follows:

$^1$H-NMR (solvent: DMSO-$d_6$, standard: tetramethylsilane) δ (ppm): 2.40 (3H, s), 4.00 (4H, s), 7.20-7.30 (10H, m), 10.90 (2H, s)

Synthesis of Compound (3-15):

Compound (3-15) was synthesized by the synthetic process of Compound (3-1) except that the starting material was changed. The NMR spectrum data of the obtained Compound (3-15) were as follows:

$^1$H-NMR (solvent: DMSO-$d_6$, standard: tetramethylsilane) δ (ppm): 2.40 (3H, s), 3.80 (3H, s), 7.15 (1H, m), 7.35-7.55 (5H, m), 7.75 (2H, m), 11.10 (1H, s), 11.20 (1H, s)

Synthesis of Compound (3-16):

Compound (3-16) was synthesized by the synthetic process of Compound (3-1) except that benzoguanamine and p-tert-butylbenzoyl chloride were used as starting materials.

The NMR spectrum data of the obtained Compound (3-16) were as follows:

$^1$H-NMR (solvent: DMSO-$d_6$, standard: tetramethylsilane) δ (ppm): 1.35 (18H, s), 7.50-7.60 (7H, m), 7.90-8.00 (4H, m), 7.30 (2H, m), 11.20 (2H, s)

Synthesis of Compound (3-17):

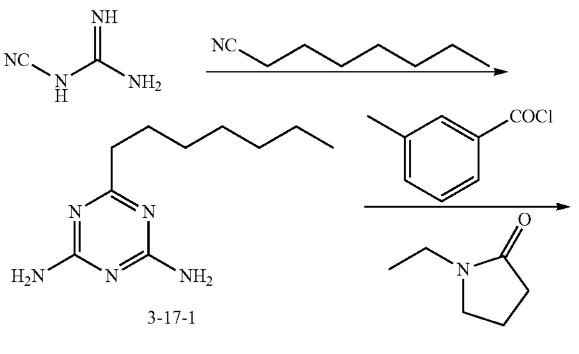

3-17-1

-continued

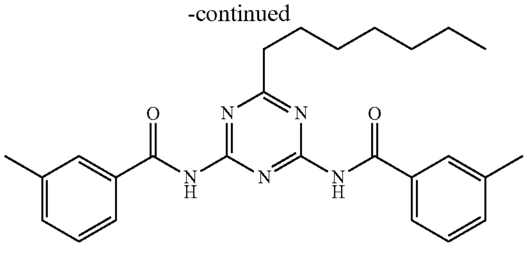

Intermediate Compound (3-17-1) was synthesized according to the method described in Chemistry—A Suropean Journal, 2005, vol. 11, #22 p. 6616-6628, and then Compound (3-17) was synthesized according to the synthetic process of Compound (3-7). The structure of the obtained compound was confirmed through MS spectrometry.

Synthesis of Compound (3-18):

Compound (3-18) was synthesized by a process similar to the synthetic process of Compound (3-17). The structure of the obtained compound was confirmed through MS spectrometry.

Synthesis of Compound (C-103):

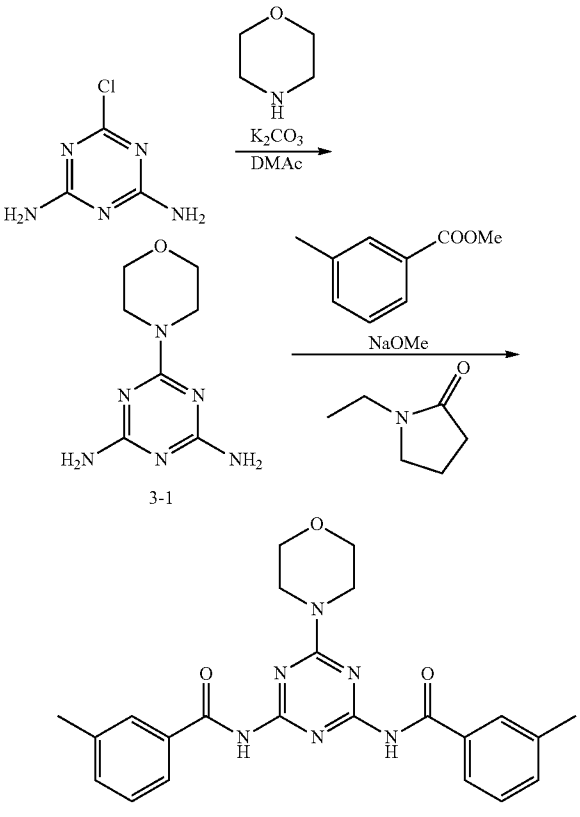

3-1

C-103

To dimethylacetoamide (300 ml) were added 2-chloro-4,6-diamino-1,3,5-triazine (50 g), morphorine (60 g) and potassium carbonate (95 g) and the mixture was stirred at 100° C. for 3 hours. The reaction mixture was cooled to a room temperature and a saline water (1 L) was added thereto. The mixture was cooled to 10° C. and the precipitated crystal was separated by filtration. The crystal was washed with water and acetonitrile and dried to obtain the Intermediate Compound (3-1) (55 g). The Intermediate Compound (3-1) (40 g), methyl 2-methylbenzoate (64 g), sodium methoxide (55 g) were added to N-ethylpyrrolidone (400 ml) and the mixture was stirred at 40° C. for 30 minutes. The mixture was cooled to a room temperature and 1N hydrochloric acid was added thereto. The precipitated crystal was separated by filtration and washed with water and dried. The dried crystal was stirred in a mixed solution of ethyl acetate, methanol and sodium bicarbonate to obtain a crystal by filtration. The crystal was washed with water and acetonitrile and dried to obtain Compound (C-103) (60 g).

Synthesis of Compound (C-153):

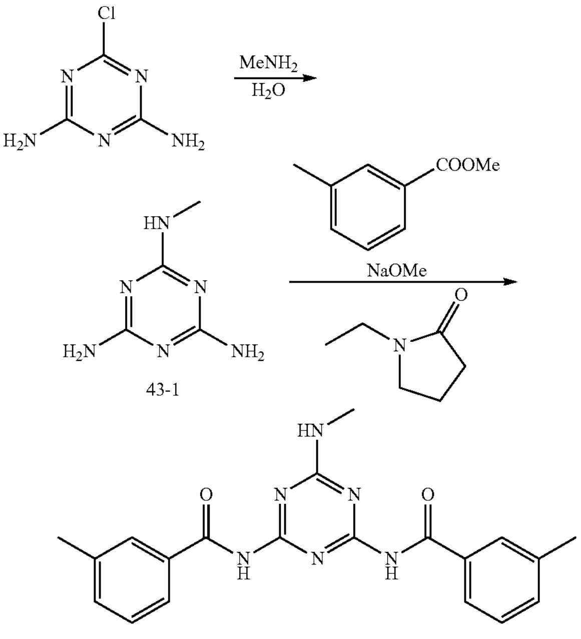

43-1

C-153

An aqueous solution of methylamine (40%, 60 ml) was added to 2-chloro-4,6-diamino-1,3,5-triazine (20 g) and the mixture was stirred at 70° C. for 2 hours. The mixture was cooled to a room temperature and water is added thereto. The crystal was separated by filtration and washed with isopropanol and hexane and dried to obtain the Intermediate Compound (43-1). The following process is the same as that in the synthesis of Compound (C-103) above to obtain Compound (C-153).

Synthesis of Compound (C-113):

Methanol (300 ml) and sodium hydroxide (16 g) were added to 2-chloro-4,6-diamino-1,3,5-triazine (27 g) and the mixture was heated for reflux for 5 hours. The mixture was cooled to a room temperature and water is added thereto. The crystal was separated by filtration and washed with water and dried to obtain an intermediate compound (17 g). The intermediate compound (17 g), methyl 2-methylbenzoate (38 g), sodium methoxide (33 g) were added to N-ethylpyrrolidone (200 ml) and the mixture was stirred at 40° C. for 8 hours. The mixture was cooled to a room temperature and 1N hydrochloric acid, ethyl acetate and hexane were added thereto. The precipitated crystal was separated by filtration and recrystallized from isopropanol and dried to obtain Compound (C-113) (20 g).

Example 301

Production of Protective Film for Polarizer (Preparation of Cellulose Acylate Solution)

The following composition was placed into a mixing tank and stirred to dissolve the components to obtain Cellulose Acylate Solution 301.

| Composition of Cellulose Acylate Solution 301 | |
|---|---|
| Cellulose acylate (degree of substitution with an acetyl group: 1.6, degree of a propionyl group: 0.8, polymerization degree: 350) | 100.0 parts by mass |
| Polycondensated polyester A (weight average molecular weight: 1100) | 10.0 parts by mass |
| Methylene chloride (first solution) | 402.0 parts by mass |
| Ethanol (second solution) | 60.0 parts by mass |

Polycondensation polyester A

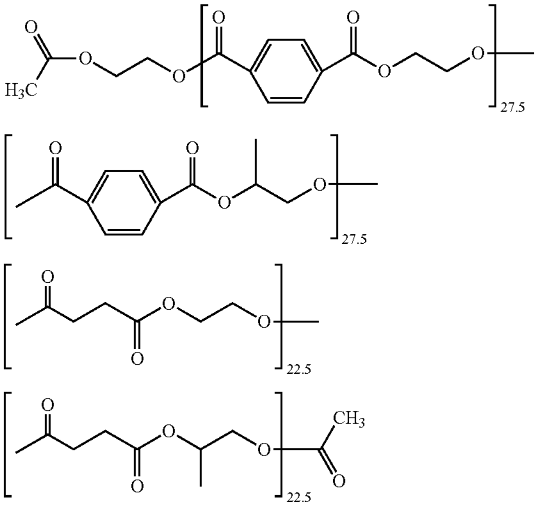

(Preparation of Matting Agent Solution 302)

The following composition was placed into a dispersion machine and stirred to dissolve the components to obtain Matting Agent Solution 302.
Agent Solution 302.

| Composition of Matting Agent Solution 302 | |
|---|---|
| Silica particles (average particle size: 20 nm, AEROSIL R972, manufactured by Nippon Aerosil) | 2.0 parts by mass |
| Methylene chloride (first solution) | 75.0 parts by mass |
| Ethanol (second solution) | 12.7 parts by mass |
| Cellulose Acylate Solution 301 | 10.3 parts by mass |

(Preparation of Solution of Compound Capable of Forming a Hydrogen Bond 303)

The following composition was placed into a mixing tank and stirred with heat to dissolve the components to obtain Solution of Compound capable of forming a Hydrogen Bond 303.

| Composition of Solution of Compound capable of forming a Hydrogen Bond 303 | |
|---|---|
| Compound capable of forming a hydrogen bond (A-35) | 10.0 parts by mass |
| Methylene chloride (first solution) | 67.2 parts by mass |
| Ethanol (second solution) | 10.0 parts by mass |
| Cellulose Acylate Solution 301 | 12.8 parts by mass |

Matting Agent Solution 302 (1.3 parts by mass) and Solution of Compound capable of forming a Hydrogen Bond 303 (6.7 parts by mass) were filtered and mixed with an inline mixer. Cellulose Acylate Solution 301 (92.0 parts by mass) was added and the composition was mixed with an inline mixer. The mixed solution was cast with a band caster and dried at 100° C. until the residual solvent is reduced to less than 40% and then the film was separated. The separated film was stretched with a tenter at an atmospheric temperature of 140° C. to the direction perpendicular to the travelling direction by 30% width expansion. The stretched film was dried at 140° C. for additional 20 minutes. The produced film has a thickness of 50 microns.

Examples 302 to 313 and Comparative Examples 401 to 405

Production of Protective Film for Polarizer

The protective films for polarizer of Examples 302 to 313 and Comparative Examples 401 to 405 were produced by the process in Example 301 except that the degree of substitution of the cellulose acylate, content of polycondensation polyester A, type and content of compound capable of forming a hydrogen bond and film thickness were changed as shown in the following Table 1.

(Evaluation of Optical Properties)

Cellulose Acylate Films 301 to 313 obtained in Examples 301 to 313 and Cellulose Acylate Films 401 to 405 obtained in the Comparative Examples 401 to 405 were evaluated in the optical properties and the change of retardation in humidity change in the same manner as Example 1.

These results are shown in Table 7 below.

TABLE 7

| | Additive | | | | | | | Cellulose acylate | |
|---|---|---|---|---|---|---|---|---|---|
| Film | Compound | Total numnber of Donor and Acceptor (D + A) | Molecular weight (M) | M/(D + A) | Nummber of Aromatic ring structure | ClogP | Added amount [parts by mass] | Degree of acetyl substitution | Degree of substitution with propionyl group |
| 401 | — | — | — | — | — | — | 0 | 0.8 | 1.6 |
| 402 | U-1 | 6 | 412 | 69 | 4 | 7.0 | 4 | 0.8 | 1.6 |
| 403 | U-4 | 4 | 264 | 66 | 1 | 6.3 | 4 | 0.8 | 1.6 |
| 404 | U-5 | 6 | 390 | 65 | 0 | −1.5 | 4 | 0.8 | 1.6 |

TABLE 7-continued

| | | | | | | | | | |
|---|---|---|---|---|---|---|---|---|---|
| 405 | U-6 | 5 | 135 | 27 | 1 | −0.5 | 4 | 0.8 | 1.6 |
| 301 | A-35 | 7 | 362 | 52 | 3 | 4.8 | 4 | 0.8 | 1.6 |
| 302 | C-116 | 8 | 409 | 51 | 3 | 3.0 | 4 | 0.8 | 1.6 |
| 303 | C-143 | 8 | 376 | 47 | 3 | 3.6 | 4 | 0.8 | 1.6 |
| 304 | D-103 | 7 | 258 | 37 | 2 | 1.8 | 4 | 0.8 | 1.6 |
| 305 | D-104 | 7 | 258 | 37 | 2 | 1.8 | 4 | 0.8 | 1.6 |
| 306 | E-203 | 6 | 362 | 60 | 3 | 4.6 | 4 | 0.8 | 1.6 |
| 307 | E-207 | 7 | 377 | 54 | 3 | 4.1 | 4 | 0.8 | 1.6 |
| 308 | F-111 | 7 | 320 | 46 | 2 | 3.5 | 4 | 0.8 | 1.6 |
| 309 | H-104 | 6 | 240 | 40 | 2 | 1.3 | 4 | 0.8 | 1.6 |
| 310 | A-13 | 5 | 209 | 42 | 1 | 3.2 | 4 | 0.8 | 1.6 |
| 406 | — | — | — | — | — | — | 0 | 0.2*) | 1.5*) |
| 407 | U-2 | 6 | 354 | 59 | 4 | 6.2 | 2 | 0.2*) | 1.5*) |
| 311 | A-35 | 7 | 362 | 52 | 3 | 4.8 | 2 | 0.2*) | 1.5*) |
| 408 | — | — | — | — | — | — | 0 | 0.1*) | 2.4*) |
| 409 | U-3 | 6 | 355 | 59 | 4 | 6.2 | 5 | 0.1*) | 2.4*) |
| 312 | A-35 | 7 | 362 | 52 | 3 | 4.8 | 5 | 0.1*) | 2.4*) |
| 410 | — | — | — | — | — | — | 0 | 0.1*) | 1.7*) |
| 411 | U-1 | 6 | 412 | 69 | 4 | 7.0 | 3 | 0.1*) | 1.7*) |
| 313 | A-35 | 7 | 362 | 52 | 3 | 6.2 | 3 | 0.1*) | 1.7*) |

| Film | Cellulose acylate Total degree of propionyl substitution | Film Thickness (μm) | Re [nm] | ΔRe [nm] | Rth [nm] | ΔRth [nm] | Remarks |
|---|---|---|---|---|---|---|---|
| 401 | 2.4 | 50 | 35 | 12 | 115 | 28 | comparative example |
| 402 | 2.4 | 50 | 71 | 10 | 192 | 22 | comparative example |
| 403 | 2.4 | 50 | 33 | 9.3 | 103 | 23 | comparative example |
| 404 | 2.4 | 50 | 30 | 11.0 | 100 | 26 | comparative example |
| 405 | 2.4 | Compound U-6 is insoluble in the solvent | | | | | comparative example |
| 301 | 2.4 | 50 | 55 | 6.2 | 140 | 15 | example of the invention |
| 302 | 2.4 | 50 | 54 | 5.8 | 140 | 14 | example of the invention |
| 303 | 2.4 | 50 | 57 | 5.9 | 143 | 13 | example of the invention |
| 304 | 2.4 | 50 | 53 | 6.0 | 138 | 13 | example of the invention |
| 305 | 2.4 | 50 | 50 | 6.2 | 137 | 14 | example of the invention |
| 306 | 2.4 | 50 | 62 | 5.6 | 155 | 14 | example of the invention |
| 307 | 2.4 | 50 | 64 | 5.5 | 157 | 13 | example of the invention |
| 308 | 2.4 | 50 | 54 | 6.2 | 142 | 14 | example of the invention |
| 309 | 2.4 | 50 | 67 | 5.0 | 171 | 13 | example of the invention |
| 310 | 2.4 | 50 | 31 | 8.0 | 101 | 19 | example of the invention |
| 406 | 1.7*) | 60 | 74 | 13 | 252 | 24 | comparative example |
| 407 | 1.7*) | 60 | 89 | 11 | 282 | 21 | comparative example |
| 311 | 1.7*) | 60 | 82 | 8.0 | 264 | 17 | example of the invention |
| 408 | 2.5*) | 50 | 30 | 7.0 | 87 | 19 | comparative example |
| 409 | 2.5*) | 50 | 46 | 6.0 | 132 | 16 | comparative example |
| 312 | 2.5*) | 50 | 40 | 3.0 | 114 | 8.0 | example of the invention |
| 410 | 1.8*) | 60 | 67 | 13 | 248 | 23 | comparative example |
| 411 | 1.8*) | 60 | 93 | 10 | 298 | 21 | comparative example |
| 313 | 1.8*) | 60 | 72 | 5.0 | 272 | 11 | example of the invention |

*)The cellulose acylate was prepared according to the method described in U.S. Patent Publication No. 2009/0096962.

U-4

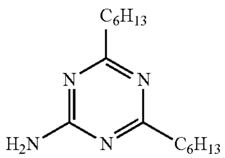

Compound U-5: penta-O-acetyl-β-D-galactopyranose manufactured by Tokyo Kasei.

U-6

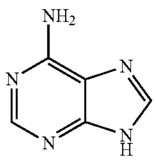

From the results in the above Table 6, it is known that the films of the invention, to which the compound capable of forming a hydrogen bond had been added, were all improved in point of the humidity dependence of retardation, as compared with the comparative films to which the compound capable of forming a hydrogen bond had not been added. In addition, it is also known that the comparative films of cellulose acylate resin to which any of the comparative compounds U-1 to U-6 had been added were still unsatisfactory in point of the humidity dependence improvement.

While the present invention has been described in detail and with reference to specific embodiments thereof, it will be apparent to one skilled in the art that various changes and modifications can be made therein without departing from the scope thereof.

The present disclosure relates to the subject matter contained in Japanese Patent Application No. 225478/2009, filed on Sep. 29, 2009 and Japanese Patent Application No. 207238/2010, filed on Sep. 15, 2010, the contents of which are herein incorporated by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A cellulose acylate film comprising a cellulose acylate resin having a degree of acyl substitution satisfying all the following formulae (i), (ii) and (iii) and a compound capable of forming a hydrogen bond satisfying all the following conditions (A), (B) and (C):

(A) the compound has both a hydrogen bond donor moiety and a hydrogen bond acceptor moiety in the molecule, (B) the value obtained by dividing the molecular weight of the compound by the total of the number of the hydrogen bond donor moiety and the number of the hydrogen bond acceptor moiety is from 30 to 65, (C) the number of aromatic ring structures is from 1 to 3, $$0.5 \leqq A+B \leqq 2.7, \quad \text{(i)}$$

$$0.0 \leqq A \leqq 2.5, \text{ and} \quad \text{(ii)}$$

$$0.1 \leqq B \leqq 2.0, \quad \text{(iii)}$$

where, in the formulae (i), (ii) and (iii), A means the degree of substitution with an acetyl group, and B means a total of the degree of substitution with a propionyl group and the degree of substitution with a butyryl group, wherein the compound capable of forming a hydrogen bond is represented by the following formula (E-1):

(E-1)

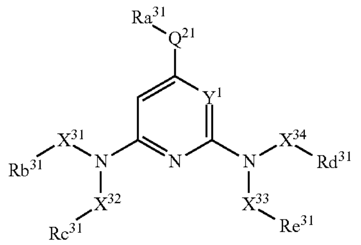

wherein $Y^1$ represents a methine group or —N—; $Ra^{31}$ represents an alkyl group, an alkenyl group, an alkynyl group, a heterocyclic group or an aryl group; $Rb^{31}$, $Rc^{31}$, $Rd^{31}$ and $Re^{31}$ each independently represent a hydrogen atom, an alkyl group, an alkenyl group, an alkynyl group, a heterocyclic group or an aryl group; $Q^{21}$ represents a single bond, —O—, —S— or —NRf-; Rf represents a hydrogen atom, an alkyl group, an alkenyl group, an alkynyl group, a heterocyclic group or an aryl group, and may be taken together with $Ra^{31}$ to form a ring; $X^{31}$, $X^{32}$ and $X^{33}$ each independently represent a single bond or a divalent linking group; and $X^{34}$ represents any one selected from the group of divalent linking groups of the following formula (Q):

(Q)

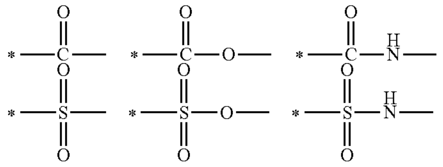

wherein the side * is the linking site to the N atom that bonds to the heterocyclic ring in the compound of the formula (E-1).

2. The cellulose acylate film according to claim 1, wherein the degree of substitution with an acyl group of the cellulose acylate satisfies all the following formulae (iv), (v) and (vi):

$$1.0 \leqq A+B \leqq 2.5, \quad \text{(iv)}$$

$$0.1 \leqq A \leqq 2.0, \text{ and} \quad \text{(v)}$$

$$0.1 \leqq B \leqq 1.8, \quad \text{(vi)}$$

where, in the formulae (iv), (v) and (vi), A means the degree of substitution with an acetyl group, and B means a total of the degree of substitution with a propionyl group and the degree of substitution with a butyryl group.

3. The cellulose acylate film according to claim 1, wherein the degree of substitution with an acyl group of the cellulose acylate satisfies all the following formulae (vii), (viii) and (ix):

$$1.2 \leqq A+B \leqq 2.5, \quad \text{(vii)}$$

$$0.1 \leqq A \leqq 1.9, \text{ and} \quad \text{(viii)}$$

$$0.5 \leqq B \leqq 1.8, \quad \text{(ix)}$$

where, in the formulae (vii), (viii) and (ix), A means the degree of substitution with an acetyl group, and B means a total of the degree of substitution with a propionyl group and the degree of substitution with a butyryl group.

4. The cellulose acylate film according to claim 1, wherein the cellulose acylate resin has a mass-average degree of polymerization of from 350 to 800.

5. The cellulose acylate film according to claim 1, wherein the hydrogen bond donor moiety is connected to the hydrogen bond acceptor moiety through from 0 to 3 atoms.

6. The cellulose acylate film according to claim 1, wherein the compound capable of forming a hydrogen bond has a molecular weight of from 100 to 1000.

7. The cellulose acylate film according to claim 1, wherein the content of the compound capable of forming a hydrogen bond is 30% by mass or less relative to the content of the cellulose acylate resin.

8. A retardation film comprising a cellulose acylate film, wherein the cellulose acylate film comprises a cellulose acylate resin having a degree of acyl substitution satisfying all the following formulae (i), (ii) and (iii) and a compound capable of forming a hydrogen bond satisfying all the following conditions (A), (B) and (C):

(A) the compound has both a hydrogen bond donor moiety and a hydrogen bond acceptor moiety in the molecule, (B) the value obtained by dividing the molecular weight of the compound by the total of the number of the hydrogen bond donor moiety and the number of the hydrogen bond acceptor moiety is from 30 to 65, (C) the number of aromatic ring structures is from 1 to 3, $$0.5 \leqq A+B \leqq 2.7, \quad \text{(i)}$$

$$0.0 \leqq A \leqq 2.5, \text{ and} \quad \text{(ii)}$$

$$0.1 \leqq B \leqq 2.0, \quad \text{(iii)}$$

where, in the formulae (i), (ii) and (iii), A means the degree of substitution with an acetyl group, and B means a total of the degree of substitution with a propionyl group and the degree of substitution with a butyryl group, wherein the compound capable of forming a hydrogen bond is represented by the following formula (E-1):

(E-1)

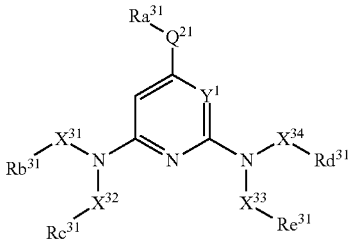

wherein $Y^1$ represents a methine group or —N—; $Ra^{31}$ represents an alkyl group, an alkenyl group, an alkynyl group, a heterocyclic group or an aryl group; $Rb^{31}$, $Rc^{31}$, $Rd^{31}$ and $Re^{31}$ each independently represent a hydrogen atom, an alkyl group, an alkenyl group, an alkynyl group, a heterocyclic group or an aryl group; $Q^{21}$ represents a single bond, —O—, —S— or —NRf-; Rf represents a hydrogen atom, an alkyl group, an alkenyl group, an alkynyl group, a heterocyclic group or an aryl group, and may be taken together with $Ra^{31}$ to form a ring; $X^{31}$, $X^{32}$ and $X^{33}$ each independently represent a single bond or a divalent linking group; and $X^{34}$ represents any one selected from the group of divalent linking groups of the following formula (Q):

(Q)

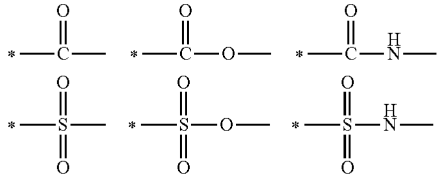

wherein the side * is the linking site to the N atom that bonds to the heterocyclic ring in the compound of the formula (E-1).

9. A polarizer comprising a cellulose acylate film, wherein the cellulose acylate film comprises a cellulose acylate resin having a degree of acyl substitution satisfying all the following formulae (i), (ii) and (iii) and a compound capable of forming a hydrogen bond satisfying all the following conditions (A), (B) and (C):

(A) the compound has both a hydrogen bond donor moiety and a hydrogen bond acceptor moiety in the molecule, (B) the value obtained by dividing the molecular weight of the compound by the total of the number of the hydrogen bond donor moiety and the number of the hydrogen bond acceptor moiety is from 30 to 65, (C) the number of aromatic ring structures is from 1 to 3, $$0.5 \leqq A+B \leqq 2.7, \quad \text{(i)}$$

$$0.0 \leqq A \leqq 2.5, \text{ and} \quad \text{(ii)}$$

$$0.1 \leqq B \leqq 2.0, \quad \text{(iii)}$$

where, in the formulae (i), (ii) and (iii), A means the degree of substitution with an acetyl group, and B means a total of the degree of substitution with a propionyl group and the degree of substitution with a butyryl group, wherein the compound capable of forming a hydrogen bond is represented by the following formula (E-1):

(E-1)

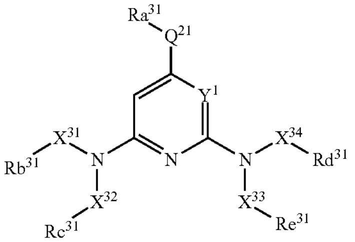

wherein $Y^1$ represents a methine group or —N—; $Ra^{31}$ represents an alkyl group, an alkenyl group, an alkynyl group, a heterocyclic group or an aryl group; $Rb^{31}$, $Rc^{31}$, $Rd^{31}$ and $Re^{31}$ each independently represent a hydrogen atom, an alkyl group, an alkenyl group, an alkynyl group, a heterocyclic group or an aryl group; $Q^{21}$ represents a single bond, —O—, —S— or —NRf-; Rf represents a hydrogen atom, an alkyl group, an alkenyl group, an alkynyl group, a heterocyclic group or an aryl group, and may be taken together with $Ra^{31}$ to form a ring; $X^{31}$, $X^{32}$ and $X^{33}$ each independently represent a single bond or a divalent linking group; and $X^{34}$ represents any one selected from the group of divalent linking groups of the following formula (Q):

(Q)

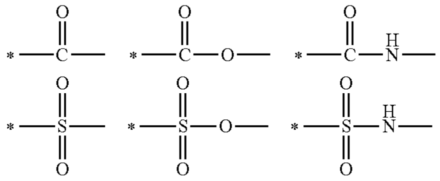

wherein the side * is the linking site to the N atom that bonds to the heterocyclic ring in the compound of the formula (E-1).

10. A liquid crystal display device comprising a cellulose acylate film, wherein the cellulose acylate film comprises a cellulose acylate resin having a degree of acyl substitution satisfying all the following formulae (i), (ii) and (iii) and a compound capable of forming a hydrogen bond satisfying all the following conditions (A), (B) and (C):

(A) the compound has both a hydrogen bond donor moiety and a hydrogen bond acceptor moiety in the molecule, (B) the value obtained by dividing the molecular weight of the compound by the total of the number of the hydrogen bond donor moiety and the number of the hydrogen bond acceptor moiety is from 30 to 65, (C) the number of aromatic ring structures is from 1 to 3, $$0.5 \leqq A+B \leqq 2.7, \quad \text{(i)}$$

$$0.0 \leqq A \leqq 2.5, \text{ and} \quad \text{(ii)}$$

$$0.1 \leqq B \leqq 2.0, \quad \text{(iii)}$$

where, in the formulae (i), (ii) and (iii), A means the degree of substitution with an acetyl group, and B means a total of the degree of substitution with a propionyl group and the degree of substitution with a butyryl group, wherein the compound capable of forming a hydrogen bond is represented by the following formula (E-1):

(E-1)

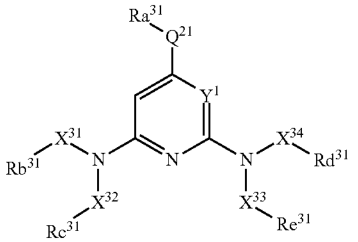

wherein $Y^1$ represents a methine group or —N—; $Ra^{31}$ represents an alkyl group, an alkenyl group, an alkynyl group, a heterocyclic group or an aryl group; $Rb^{31}$, $Rc^{31}$, $Rd^{31}$ and $Re^{31}$ each independently represent a hydrogen atom, an alkyl group, an alkenyl group, an alkynyl group, a heterocyclic group or an aryl group; $Q^{21}$ represents a single bond, —O—, —S— or —NRf-; Rf represents a hydrogen atom, an alkyl group, an alkenyl group, an alkynyl group, a heterocyclic group or an aryl group, and may be taken together with $Ra^{31}$ to form a ring; $X^{31}$, $X^{32}$ and $X^{33}$ each independently represent a single bond or a divalent linking group; and $X^{34}$ represents any one selected from the group of divalent linking groups of the following formula (Q):

(Q)

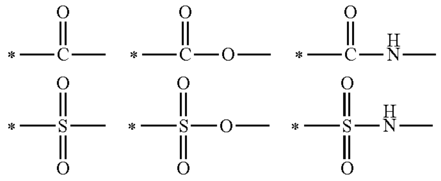

wherein the side * is the linking site to the N atom that bonds to the heterocyclic ring in the compound of the formula (E-1).

11. A cellulose acylate film comprising a cellulose acylate resin having a degree of acyl substitution satisfying all the following formulae (i), (ii) and (iii) and a compound capable of forming a hydrogen bond satisfying all the following conditions (A), (B) and (C):

(A) the compound has both a hydrogen bond donor moiety and a hydrogen bond acceptor moiety in the molecule, (B) the value obtained by dividing the molecular weight of the compound by the total of the number of the hydrogen bond donor moiety and the number of the hydrogen bond acceptor moiety is from 30 to 65, (C) the number of aromatic ring structures is from 1 to 3, $$0.5 \leqq A+B \leqq 2.7, \quad \text{(i)}$$

$$0.0 \leqq A \leqq 2.5, \text{ and} \quad \text{(ii)}$$

$$0.1 \leqq B \leqq 2.0, \quad \text{(iii)}$$

where, in the formulae (i), (ii) and (iii), A means the degree of substitution with an acetyl group, and B means a total of the degree of substitution with a propionyl group and the degree of substitution with a butyryl group, wherein the compound capable of forming a hydrogen bond is represented by the following formula (F-1):

(F-1)

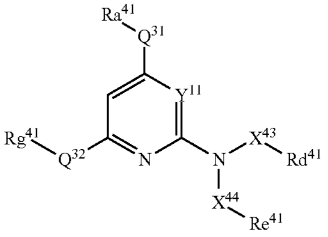

wherein $Y^{11}$ represents a methine group or —N—; $Ra^{41}$ and $Rg^{41}$ each independently represent an alkyl group, an alkenyl group, an alkynyl group, a heterocyclic group or an aryl group; $Rd^{41}$ and $Re^{41}$ each independently represent a hydrogen atom, an alkyl group, an alkenyl group, an alkynyl group, a heterocyclic group or an aryl group; $Q^{31}$ represents —O—, —S— or —NRf-; Rf represents a hydrogen atom, an alkyl group, an alkenyl group, an alkynyl group, a heterocyclic group or an aryl group, and may be taken together with $Ra^{41}$ to form a ring; $Q^{32}$ represents —O—, —S— or —NRh—; Rh represents a hydrogen atom, an alkyl group, an alkenyl group, an alkynyl group, a heterocyclic group or an aryl group, and may be taken together with $Rg^{41}$ to form a ring and when Rh represents a hydrogen atom, $Rg^{41}$ can also be a hydrogen atom; $X^{43}$ represents a single bond or a divalent linking group; and $X^{44}$ represents any one selected from the group of divalent linking groups of the following formula (P):

(P)

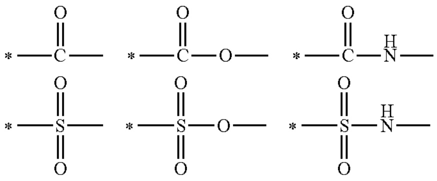

wherein the side * is the linking site to the N atom that bonds to the heterocyclic ring in the compound of the formula (F-1).

12. The cellulose acylate film according to claim 11, wherein the degree of substitution with an acyl group of the cellulose acylate satisfies all the following formulae (iv), (v) and (vi):

$$1.0 \leqq A+B \leqq 2.5, \quad \text{(iv)}$$

$$0.1 \leqq A \leqq 2.0, \text{ and} \quad \text{(v)}$$

$$0.1 \leqq B \leqq 1.8, \quad \text{(vi)}$$

where, in the formulae (iv), (v) and (vi), A means the degree of substitution with an acetyl group, and B means a total of the degree of substitution with a propionyl group and the degree of substitution with a butyryl group.

13. The cellulose acylate film according to claim 11, wherein the degree of substitution with an acyl group of the cellulose acylate satisfies all the following formulae (vii), (viii) and (ix):

$$1.2 \leqq A+B \leqq 2.5, \quad \text{(vii)}$$

$$0.1 \leqq A \leqq 1.9, \text{ and} \quad \text{(viii)}$$

$$0.5 \leqq B \leqq 1.8, \quad \text{(ix)}$$

where, in the formulae (vii), (viii) and (ix), A means the degree of substitution with an acetyl group, and B means a total of the degree of substitution with a propionyl group and the degree of substitution with a butyryl group.

14. The cellulose acylate film according to claim 11, wherein the cellulose acylate resin has a mass-average degree of polymerization of from 350 to 800.

15. The cellulose acylate film according to claim 11, wherein the hydrogen bond donor moiety is connected to the hydrogen bond acceptor moiety through from 0 to 3 atoms.

16. The cellulose acylate film according to claim 11, wherein the compound capable of forming a hydrogen bond has a molecular weight of from 100 to 1000.

17. The cellulose acylate film according to claim 11, wherein the content of the compound capable of forming a hydrogen bond is 30% by mass or less relative to the content of the cellulose acylate resin.

18. A retardation film comprising a cellulose acylate film, wherein the cellulose acylate film comprises a cellulose acylate resin having a degree of acyl substitution satisfying all the following formulae (i), (ii) and (iii) and a compound capable of forming a hydrogen bond satisfying all the following conditions (A), (B) and (C):

(A) the compound has both a hydrogen bond donor moiety and a hydrogen bond acceptor moiety in the molecule, (B) the value obtained by dividing the molecular weight of the compound by the total of the number of the hydrogen bond donor moiety and the number of the hydrogen bond acceptor moiety is from 30 to 65, (C) the number of aromatic ring structures is from 1 to 3, $$0.5 \leq A+B \leq 2.7, \quad (i)$$

$$0.0 \leq A \leq 2.5, \text{ and} \quad (ii)$$

$$0.1 \leq B \leq 2.0, \quad (iii)$$

where, in the formulae (i), (ii) and (iii), A means the degree of substitution with an acetyl group, and B means a total of the degree of substitution with a propionyl group and the degree of substitution with a butyryl group, wherein the compound capable of forming a hydrogen bond is represented by the following formula (F-1):

(F-1)

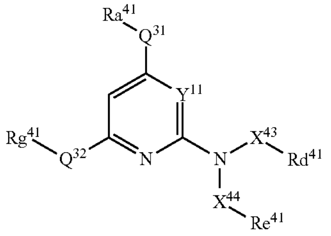

wherein $Y^{11}$ represents a methine group or —N—; $Ra^{41}$ and $Rg^{41}$ each independently represent an alkyl group, an alkenyl group, an alkynyl group, a heterocyclic group or an aryl group; $Rd^{41}$ and $Re^{41}$ each independently represent a hydrogen atom, an alkyl group, an alkenyl group, an alkynyl group, a heterocyclic group or an aryl group; $Q^{31}$ represents —O—, —S— or —NRf-; Rf represents a hydrogen atom, an alkyl group, an alkenyl group, an alkynyl group, a heterocyclic group or an aryl group, and may be taken together with $Ra^{41}$ to form a ring; $Q^{32}$ represents —O—, —S— or —NRh-; Rh represents a hydrogen atom, an alkyl group, an alkenyl group, an alkynyl group, a heterocyclic group or an aryl group, and may be taken together with $Rg^{41}$ to form a ring and when Rh represents a hydrogen atom, $Rg^{41}$ can also be a hydrogen atom; $X^{43}$ represents a single bond or a divalent linking group; and $X^{44}$ represents any one selected from the group of divalent linking groups of the following formula (P):

(P)

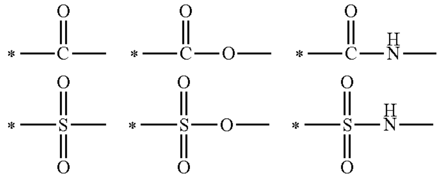

wherein the side * is the linking site to the N atom that bonds to the heterocyclic ring in the compound of the formula (F-1).

19. A polarizer comprising a cellulose acylate film, wherein the cellulose acylate film comprises a cellulose acylate resin having a degree of acyl substitution satisfying all the following formulae (i), (ii) and (iii) and a compound capable of forming a hydrogen bond satisfying all the following conditions (A), (B) and (C):

(A) the compound has both a hydrogen bond donor moiety and a hydrogen bond acceptor moiety in the molecule, (B) the value obtained by dividing the molecular weight of the compound by the total of the number of the hydrogen bond donor moiety and the number of the hydrogen bond acceptor moiety is from 30 to 65, (C) the number of aromatic ring structures is from 1 to 3, $$0.5 \leq A+B \leq 2.7, \quad (i)$$

$$0.0 \leq A \leq 2.5, \text{ and} \quad (ii)$$

$$0.1 \leq B \leq 2.0, \quad (iii)$$

where, in the formulae (i), (ii) and (iii), A means the degree of substitution with an acetyl group, and B means a total of the degree of substitution with a propionyl group and the degree of substitution with a butyryl group, wherein the compound capable of forming a hydrogen bond is represented by the following formula (F-1):

(F-1)

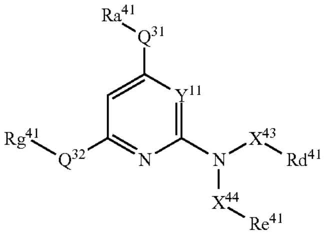

wherein $Y^{11}$ represents a methine group or —N—; $Ra^{41}$ and $Rg^{41}$ each independently represent an alkyl group, an alkenyl group, an alkynyl group, a heterocyclic group or an aryl group; $Rd^{41}$ and $Re^{41}$ each independently represent a hydrogen atom, an alkyl group, an alkenyl group, an alkynyl group, a heterocyclic group or an aryl group; $Q^{31}$ represents —O—, —S— or —NRf-; Rf represents a hydrogen atom, an alkyl group, an alkenyl group, an alkynyl group, a heterocyclic group or an aryl group, and may be taken together with $Ra^{41}$ to form a ring; $Q^{32}$ represents —O—, —S— or —NRh—; Rh represents a hydrogen atom, an alkyl group, an alkenyl group, an alkynyl group, a heterocyclic group or an aryl group, and may be taken together with $Rg^{41}$ to form a ring and when Rh represents a hydrogen atom, $Rg^{41}$ can also be a hydrogen atom; $X^{43}$ represents a single bond or a divalent linking group; and $X^{44}$ represents any one selected from the group of divalent linking groups of the following formula (P):

(P)

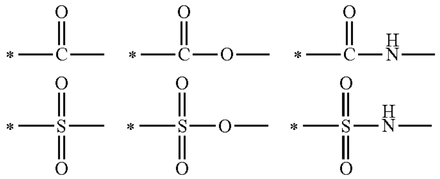

wherein the side * is the linking site to the N atom that bonds to the heterocyclic ring in the compound of the formula (F-1).

20. A liquid crystal display device comprising a cellulose acylate film, wherein the cellulose acylate film comprises a cellulose acylate resin having a degree of acyl substitution satisfying all the following formulae (i), (ii) and (iii) and a compound capable of forming a hydrogen bond satisfying all the following conditions (A), (B) and (C):

(A) the compound has both a hydrogen bond donor moiety and a hydrogen bond acceptor moiety in the molecule, (B) the value obtained by dividing the molecular weight of the compound by the total of the number of the hydrogen bond donor moiety and the number of the hydrogen bond acceptor moiety is from 30 to 65, (C) the number of aromatic ring structures is from 1 to 3, $$0.5 \leqq A+B \leqq 2.7, \quad \text{(i)}$$

$$0.0 \leqq A \leqq 2.5, \text{ and} \quad \text{(ii)}$$

$$0.1 \leqq B \leqq 2.0, \quad \text{(iii)}$$

where, in the formulae (i), (ii) and (iii), A means the degree of substitution with an acetyl group, and B means a total of the degree of substitution with a propionyl group and the degree of substitution with a butyryl group, wherein the compound capable of forming a hydrogen bond is represented by the following formula (F-1):

(F-1)

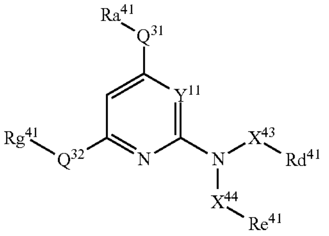

wherein $Y^{11}$ represents a methine group or —N—; $Ra^{41}$ and $Rg^{41}$ each independently represent an alkyl group, an alkenyl group, an alkynyl group, a heterocyclic group or an aryl group; $Rd^{41}$ and $Re^{41}$ each independently represent a hydrogen atom, an alkyl group, an alkenyl group, an alkynyl group, a heterocyclic group or an aryl group; $Q^{31}$ represents —O—, —S— or —NRf-; Rf represents a hydrogen atom, an alkyl group, an alkenyl group, an alkynyl group, a heterocyclic group or an aryl group, and may be taken together with $Ra^{41}$ to form a ring; $Q^{32}$ represents —O—, —S— or —NRh—; Rh represents a hydrogen atom, an alkyl group, an alkenyl group, an alkynyl group, a heterocyclic group or an aryl group, and may be taken together with $Rg^{41}$ to form a ring and when Rh represents a hydrogen atom, $Rg^{41}$ can also be a hydrogen atom; $X^{43}$ represents a single bond or a divalent linking group; and $X^{44}$ represents any one selected from the group of divalent linking groups of the following formula (P):

(P)

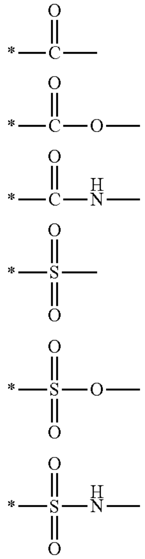

wherein the side * is the linking site to the N atom that bonds to the heterocyclic ring in the compound of the formula (F-1).

* * * * *

UNITED STATES PATENT AND TRADEMARK OFFICE

CERTIFICATE OF CORRECTION

PATENT NO. : 8,158,220 B2
APPLICATION NO. : 12/893378
DATED : April 17, 2012
INVENTOR(S) : Masato Nagura et al.

It is certified that error appears in the above-identified patent and that said Letters Patent is hereby corrected as shown below:

(75) on the Title page of the patent should read as follows:

--(75) Inventors: Masato Nagura, Minami-ashigara (JP);

Takayasu Yasuda, Minami-ashigara (JP);

Nobutaka Fukugawa, (JP)

Satoshi Tanaka, (JP)

Aiko Yamamoto, (JP)

Aiko Yoshida, (JP)

Akiko Watano, (JP)--.

Signed and Sealed this
Seventeenth Day of March, 2015

Michelle K. Lee
*Director of the United States Patent and Trademark Office*